(12) United States Patent
Namgoong et al.

(10) Patent No.: US 11,909,482 B2
(45) Date of Patent: Feb. 20, 2024

(54) FEDERATED LEARNING FOR CLIENT-SPECIFIC NEURAL NETWORK PARAMETER GENERATION FOR WIRELESS COMMUNICATION

(71) Applicant: QUALCOMM Incorporated, San Diego, CA (US)

(72) Inventors: June Namgoong, San Diego, CA (US); Taesang Yoo, San Diego, CA (US); Naga Bhushan, San Diego, CA (US); Jay Kumar Sundararajan, San Diego, CA (US); Pavan Kumar Vitthaladevuni, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/444,028

(22) Filed: Jul. 29, 2021

(65) Prior Publication Data
US 2022/0060235 A1    Feb. 24, 2022

Related U.S. Application Data

(60) Provisional application No. 62/706,605, filed on Aug. 27, 2020, provisional application No. 62/706,465, filed on Aug. 18, 2020.

(51) Int. Cl.
*H04B 7/06* (2006.01)
*G06N 3/045* (2023.01)

(52) U.S. Cl.
CPC ........... *H04B 7/0626* (2013.01); *G06N 3/045* (2023.01); *H04B 7/0663* (2013.01)

(58) Field of Classification Search
CPC ...... H04B 7/0626; H04B 7/06; H04B 7/0663; G06N 3/045; G06N 3/047; G06N 3/088
See application file for complete search history.

(56) References Cited

U.S. PATENT DOCUMENTS

| | | | | |
|---|---|---|---|---|
| 3,695,783 | A | * 10/1972 | Soyland | F04B 49/007 417/286 |
| 10,305,553 | B2 | * 5/2019 | O'Shea | G06N 3/08 |

(Continued)

FOREIGN PATENT DOCUMENTS

| | | | | |
|---|---|---|---|---|
| AU | 2018363296 A1 | * 7/2020 | | G05B 13/027 |
| AU | 2019253118 A1 | * 10/2020 | | G06K 9/6267 |

(Continued)

OTHER PUBLICATIONS

T. Korthals, D. Rudolph, J. Leitner, M. Hesse and U. Rückert, "Multi-Modal Generative Models for Learning Epistemic Active Sensing," 2019 International Conference on Robotics and Automation (ICRA), 2019, pp. 3319-3325, doi: 10.1109/ICRA.2019.8794458. (Year: 2019).*

(Continued)

*Primary Examiner* — Berhanu Tadese
(74) *Attorney, Agent, or Firm* — Harrity & Harrity, LLP

(57) ABSTRACT

Various aspects of the present disclosure generally relate to wireless communication. In some aspects, a client may determine, using a conditioning network and based at least in part on an observed environmental vector, a set of client-specific parameters. The client may determine a latent vector using a client autoencoder and based at least in part on the set of client-specific parameters and the set of shared parameters. The client may transmit the observed environmental vector and the latent vector to a server. Numerous other aspects are provided.

30 Claims, 21 Drawing Sheets

(56) References Cited

U.S. PATENT DOCUMENTS

| | | | |
|---|---|---|---|
| 10,461,421 B1* | 10/2019 | Tran | H01Q 3/44 |
| 10,498,029 B1* | 12/2019 | Tran | F21V 33/0052 |
| 10,552,727 B2* | 2/2020 | Caspi | H04L 43/045 |
| 10,572,830 B2* | 2/2020 | O'Shea | G06N 3/086 |
| 10,657,461 B2* | 5/2020 | McMahan | G06N 7/01 |
| 10,671,884 B2* | 6/2020 | Walters | G06F 8/71 |
| 10,671,920 B2* | 6/2020 | Zuev | G06N 3/047 |
| 10,700,427 B1* | 6/2020 | Tran | H01Q 3/20 |
| 10,707,578 B1* | 7/2020 | Tran | H01Q 21/28 |
| 10,762,398 B2* | 9/2020 | Sjölund | G06V 10/454 |
| 10,812,992 B1* | 10/2020 | Tran | H04B 17/12 |
| 10,846,589 B2* | 11/2020 | Patel | G06N 3/08 |
| 10,892,806 B1* | 1/2021 | O'Shea | H04B 7/0413 |
| 10,917,803 B2* | 2/2021 | Mota | H04W 24/02 |
| 11,030,275 B2* | 6/2021 | Meeds | G06N 3/084 |
| 11,068,741 B2* | 7/2021 | Wang | G06T 7/50 |
| 11,109,083 B2* | 8/2021 | Saini | H04N 21/23614 |
| 11,126,895 B2* | 9/2021 | Anirudh | G06F 18/214 |
| 11,152,702 B2* | 10/2021 | Tran | G10L 25/51 |
| 11,189,921 B1* | 11/2021 | Tran | G10L 25/51 |
| 11,205,028 B2* | 12/2021 | Albert | G06F 30/20 |
| 11,353,861 B2* | 6/2022 | Joshi | G06N 3/045 |
| 11,363,416 B2* | 6/2022 | Chen | G06F 18/2155 |
| 11,373,096 B2* | 6/2022 | Chidlovskii | G06F 18/24 |
| 11,374,952 B1* | 6/2022 | Coskun | G06N 3/045 |
| 11,375,256 B1* | 6/2022 | Dorner | G06N 3/04 |
| 11,403,513 B2* | 8/2022 | Hasenclever | G06N 3/063 |
| 11,410,050 B2* | 8/2022 | Baker | G06N 3/04 |
| 11,438,240 B2* | 9/2022 | Yelahanka Raghuprasad | H04L 41/5019 |
| 11,468,293 B2* | 10/2022 | Chudak | G06N 3/045 |
| 11,487,969 B2* | 11/2022 | Huth | G06F 18/28 |
| 11,501,429 B2* | 11/2022 | Stamatoyannopoulos | G06N 20/00 |
| 11,514,330 B2* | 11/2022 | Ma | G06N 3/047 |
| 11,532,086 B2* | 12/2022 | Kozloski | G16H 50/20 |
| 11,539,525 B2* | 12/2022 | Ortiz | H04L 9/0866 |
| 11,635,815 B2* | 4/2023 | Hewage | G06N 20/00 700/275 |
| 11,664,108 B2* | 5/2023 | Dalal | G16H 50/50 705/2 |
| 2018/0316502 A1* | 11/2018 | Nadeau | H04L 9/0891 |
| 2019/0244680 A1* | 8/2019 | Rolfe | G06N 3/045 |
| 2019/0268163 A1* | 8/2019 | Nadeau | G06N 20/00 |
| 2019/0279356 A1* | 9/2019 | Kuwertz | G06T 7/0004 |
| 2019/0287217 A1* | 9/2019 | Cooke | G06N 3/045 |
| 2019/0327124 A1* | 10/2019 | Lai | G01S 5/017 |
| 2019/0339684 A1* | 11/2019 | Cella | G06N 3/084 |
| 2019/0339685 A1* | 11/2019 | Cella | G06F 16/2477 |
| 2019/0339686 A1* | 11/2019 | Cella | G05B 23/0221 |
| 2019/0339687 A1* | 11/2019 | Cella | G06Q 30/02 |
| 2019/0339688 A1* | 11/2019 | Cella | H04L 1/18 |
| 2020/0017117 A1* | 1/2020 | Milton | G08G 1/0112 |
| 2020/0027019 A1* | 1/2020 | Yang | G07F 9/001 |
| 2020/0090029 A1* | 3/2020 | Suzuki | G06N 3/063 |
| 2020/0090042 A1* | 3/2020 | Wayne | G06N 3/006 |
| 2020/0103894 A1* | 4/2020 | Cella | G05B 23/0264 |
| 2020/0104685 A1* | 4/2020 | Hasenclever | G06N 3/084 |
| 2020/0104702 A1* | 4/2020 | Zhang | G06N 3/045 |
| 2020/0105381 A1* | 4/2020 | Zhang | G06F 17/18 |
| 2020/0125996 A1* | 4/2020 | Paparaju | G06N 3/047 |
| 2020/0133254 A1* | 4/2020 | Cella | G05B 13/028 |
| 2020/0133255 A1* | 4/2020 | Cella | H04L 67/12 |
| 2020/0133256 A1* | 4/2020 | Cella | G05B 23/0229 |
| 2020/0133257 A1* | 4/2020 | Cella | G05B 19/4183 |
| 2020/0150643 A1* | 5/2020 | Cella | G06N 3/047 |
| 2020/0150644 A1* | 5/2020 | Cella | G05B 23/0283 |
| 2020/0150645 A1* | 5/2020 | Cella | H04L 67/12 |
| 2020/0159206 A1* | 5/2020 | Cella | H04B 17/318 |
| 2020/0159207 A1* | 5/2020 | Cella | G05B 13/028 |
| 2020/0166922 A1* | 5/2020 | Cella | G05B 19/41845 |
| 2020/0166923 A1* | 5/2020 | Cella | G05B 23/0221 |
| 2020/0174463 A1* | 6/2020 | Cella | G05B 23/0229 |
| 2020/0174464 A1* | 6/2020 | Cella | G06F 16/24 |
| 2020/0175022 A1* | 6/2020 | Nowozin | G06N 3/047 |
| 2020/0193272 A1* | 6/2020 | Chudak | G06N 3/06 |
| 2020/0226475 A1* | 7/2020 | Ma | G06N 3/047 |
| 2020/0242514 A1* | 7/2020 | McMahan | G06F 17/18 |
| 2020/0245009 A1* | 7/2020 | Saini | H04N 21/23614 |
| 2020/0265338 A1* | 8/2020 | O'Shea | G06N 3/082 |
| 2020/0285939 A1* | 9/2020 | Baker | G06N 3/04 |
| 2020/0293427 A1* | 9/2020 | Walters | G06T 11/001 |
| 2020/0293887 A1* | 9/2020 | De Brouwer | G16H 50/20 |
| 2020/0327404 A1* | 10/2020 | Miotto | G06F 18/2415 |
| 2020/0334532 A1* | 10/2020 | Zuev | G06V 10/82 |
| 2020/0348662 A1* | 11/2020 | Cella | G05B 19/41865 |
| 2020/0361083 A1* | 11/2020 | Mousavian | B25J 9/1612 |
| 2020/0372369 A1* | 11/2020 | Gong | G06N 3/088 |
| 2020/0394512 A1* | 12/2020 | Zhang | G06N 7/023 |
| 2020/0394559 A1* | 12/2020 | Zhang | G06N 3/088 |
| 2020/0401916 A1* | 12/2020 | Rolfe | G06N 7/01 |
| 2021/0019541 A1* | 1/2021 | Wang | G06V 40/172 |
| 2021/0019619 A1* | 1/2021 | Bhattacharyya | G06N 3/047 |
| 2021/0027379 A1* | 1/2021 | Zhu | G06N 3/08 |
| 2021/0081805 A1* | 3/2021 | Kawachi | G06N 3/047 |
| 2021/0097387 A1* | 4/2021 | Chidlovskii | G06N 3/045 |
| 2021/0117780 A1* | 4/2021 | Malik | G06V 20/30 |
| 2021/0174171 A1* | 6/2021 | Pi | H04B 7/18582 |
| 2021/0174958 A1* | 6/2021 | Drake | G16H 50/20 |
| 2021/0227223 A1* | 7/2021 | Santamaria-Pang | H04N 19/136 |
| 2021/0263954 A1* | 8/2021 | Mizutani | G06N 3/04 |
| 2021/0281491 A1* | 9/2021 | Yelahanka Raghuprasad | G06N 3/045 |
| 2021/0306873 A1* | 9/2021 | Mokrushin | H04W 24/06 |
| 2021/0341911 A1* | 11/2021 | Joshi | G06N 3/045 |
| 2021/0358577 A1* | 11/2021 | Zhang | G16H 50/70 |
| 2021/0365965 A1* | 11/2021 | Shrivastava | G06N 3/088 |
| 2021/0398621 A1* | 12/2021 | Stojevic | G16C 20/30 |
| 2021/0406765 A1* | 12/2021 | Zhang | G06N 3/047 |
| 2022/0004875 A1* | 1/2022 | Koike-Akino | G06N 3/047 |
| 2022/0028139 A1* | 1/2022 | Mitra | G06V 40/175 |
| 2022/0060235 A1* | 2/2022 | Namgoong | H04B 7/0663 |
| 2022/0101130 A1* | 3/2022 | Taherzadeh Boroujeni | G06N 3/045 |
| 2022/0101204 A1* | 3/2022 | Ly | G06N 3/08 |
| 2022/0103221 A1* | 3/2022 | Taherzadeh Boroujeni | G06N 3/063 |
| 2022/0104033 A1* | 3/2022 | Ly | H04L 41/16 |
| 2022/0124518 A1* | 4/2022 | Pezeshki | G06N 3/08 |
| 2022/0124628 A1* | 4/2022 | Pezeshki | G06N 3/08 |
| 2022/0124779 A1* | 4/2022 | Pezeshki | G06N 20/20 |
| 2022/0180205 A1* | 6/2022 | Kolagunda | G06N 3/088 |
| 2022/0180251 A1* | 6/2022 | Pezeshki | G06N 20/20 |
| 2022/0182802 A1* | 6/2022 | Pezeshki | H04W 72/21 |
| 2022/0237507 A1* | 7/2022 | Bai | G06N 20/00 |
| 2022/0292423 A1* | 9/2022 | Ash | G06Q 30/01 |
| 2022/0292465 A1* | 9/2022 | Schnitt | G06N 3/08 |
| 2022/0292525 A1* | 9/2022 | Ash | G06Q 10/06315 |
| 2022/0293107 A1* | 9/2022 | Leaman | G06F 16/951 |
| 2022/0391778 A1* | 12/2022 | Green | G06N 20/20 |
| 2022/0400371 A1* | 12/2022 | Elshafie | H04W 8/24 |
| 2023/0012248 A1* | 1/2023 | Jawwad | H04L 41/0833 |
| 2023/0073361 A1* | 3/2023 | Hernandez Canseco | B61L 23/048 |
| 2023/0139567 A1* | 5/2023 | Jia | G16B 40/20 706/25 |

FOREIGN PATENT DOCUMENTS

| | | | | |
|---|---|---|---|---|
| CA | 3082656 A1 | * | 5/2019 | G05B 13/027 |
| CA | 3090759 A1 | * | 8/2019 | G06N 20/00 |
| CA | 3095056 A1 | * | 10/2019 | G06K 9/6267 |
| CA | 3050478 A1 | * | 1/2020 | G06F 18/251 |
| CA | 3081168 A1 | * | 11/2020 | G06N 3/045 |
| CN | 109948117 A | * | 6/2019 | G06N 3/0445 |
| CN | 110380917 A | * | 10/2019 | H04L 41/0654 |
| CN | 111222532 A | * | 6/2020 | |
| CN | 111291897 A | * | 6/2020 | G06N 20/00 |
| CN | 111382875 A | * | 7/2020 | G06N 20/00 |
| DE | 102021214737 A1 | * | 6/2022 | F04D 27/001 |
| EP | 3494522 B1 | * | 1/2020 | G06F 17/12 |
| EP | 3695783 A1 | * | 8/2020 | A61B 5/0022 |

(56) References Cited

FOREIGN PATENT DOCUMENTS

| | | | | |
|---|---|---|---|---|
| EP | 3767533 A1 | * | 1/2021 | ........... G06K 9/6256 |
| EP | 3767541 A1 | * | 1/2021 | ............. B60R 16/02 |
| EP | 3798918 A1 | * | 3/2021 | ........... G01C 21/206 |
| EP | 3905139 A4 | * | 11/2021 | ....... G06F 18/24317 |
| EP | 3944146 A1 | * | 1/2022 | ............. G06N 3/045 |
| GB | 2432933 A | * | 6/2007 | ........... G06F 21/566 |
| GB | 2432934 A | * | 6/2007 | ........... G06F 21/566 |
| GB | 2436161 A | * | 9/2007 | ........... G06F 21/566 |
| GB | 2556981 A | * | 6/2018 | ............. G06F 17/12 |
| GB | 2604227 A | * | 8/2022 | ........... F04D 27/001 |
| JP | 08174548 A | * | 7/1996 | |
| JP | 3695783 B2 | * | 9/2005 | |
| JP | 2019144623 A | * | 8/2019 | ........... G06N 3/0454 |
| JP | 2019220104 A | * | 12/2019 | ............ G06F 16/285 |
| JP | 2020192676 A | * | 12/2020 | .............. B25J 9/161 |
| JP | 2021135650 A | * | 9/2021 | ........ G06K 9/00791 |
| JP | 7056406 B2 | * | 4/2022 | ........... G06F 16/285 |
| JP | 2022105321 A | * | 7/2022 | ........... F04D 27/001 |
| JP | 7215690 B2 | * | 1/2023 | ........... G06F 17/2705 |
| KR | 2019103090 A | * | 9/2019 | ............. G06N 20/00 |
| TW | 202211651 A | * | 3/2022 | |
| WO | WO-2016145379 A1 | * | 9/2016 | ........... G06N 3/0472 |
| WO | WO-2017103917 A1 | * | 6/2017 | ............. G06N 20/00 |
| WO | WO-2017172629 A1 | * | 10/2017 | ............. G06K 9/6277 |
| WO | WO-2018057302 A1 | * | 3/2018 | ............. G06F 17/12 |
| WO | WO-2018236932 A1 | * | 12/2018 | ............. G06N 3/006 |
| WO | WO-2019067960 A1 | * | 4/2019 | ............. G06K 9/6267 |
| WO | WO-2019092456 A1 | * | 5/2019 | ............. G05B 13/027 |
| WO | WO-2019118644 A1 | * | 6/2019 | ......... G06F 18/2148 |
| WO | WO-2019133403 A1 | * | 7/2019 | ........ G06K 9/00248 |
| WO | WO-2019157228 A1 | * | 8/2019 | ............. G06N 20/00 |
| WO | WO-2019160003 A1 | * | 8/2019 | ........... G06N 3/0454 |
| WO | WO-2019177792 A1 | * | 9/2019 | ........... G06N 3/0454 |
| WO | WO-2019200410 A1 | * | 10/2019 | ............. G06K 9/6267 |
| WO | WO-2019211307 A1 | * | 11/2019 | ............. A61N 5/1039 |
| WO | WO-2019216975 A1 | * | 11/2019 | ......... B62D 15/0215 |
| WO | WO-2019244513 A1 | * | 12/2019 | ............. G06F 16/285 |
| WO | WO-2020018394 A1 | * | 1/2020 | ............. B60W 50/02 |
| WO | WO-2020029589 A1 | * | 2/2020 | ............. G06F 21/602 |
| WO | WO-2020065001 A1 | * | 4/2020 | ............. G06F 17/18 |
| WO | WO-2020068203 A1 | * | 4/2020 | ........ G06F 16/90332 |
| WO | WO-2020068348 A1 | * | 4/2020 | ............. G06F 16/3329 |
| WO | WO-2020111424 A1 | * | 6/2020 | ........... G06N 3/0454 |
| WO | WO-2020112580 A1 | * | 6/2020 | ....... G06F 16/24578 |
| WO | WO-2020115273 A1 | * | 6/2020 | ........... G06K 9/6257 |
| WO | WO-2020149992 A1 | * | 7/2020 | ............. G06F 17/13 |
| WO | WO-2020159439 A1 | * | 8/2020 | |
| WO | WO-2020177392 A1 | * | 9/2020 | ......... G06F 21/6254 |
| WO | WO-2020181962 A1 | * | 9/2020 | ........... G06N 3/0455 |
| WO | WO-2020185973 A1 | * | 9/2020 | ......... G06K 9/00979 |
| WO | WO-2020251680 A1 | * | 12/2020 | ............. G06N 20/00 |
| WO | WO-2020251681 A1 | * | 12/2020 | ............. G06N 3/04 |
| WO | WO-2021032498 A1 | * | 2/2021 | ............. G06N 20/00 |
| WO | WO-2021036014 A1 | * | 3/2021 | ............. G06N 20/00 |
| WO | WO-2021080577 A1 | * | 4/2021 | ......... G06F 21/6254 |
| WO | WO-2021126019 A1 | * | 6/2021 | ............. G06N 20/00 |
| WO | WO-2021155950 A1 | * | 8/2021 | .............. B61L 25/04 |
| WO | WO-2021174934 A1 | * | 9/2021 | ............. G06N 20/00 |
| WO | WO-2021183408 A1 | * | 9/2021 | ............... G06N 3/09 |
| WO | WO-2021189904 A1 | * | 9/2021 | ......... G06F 11/3452 |
| WO | WO-2021228404 A1 | * | 11/2021 | ......... G06F 21/6254 |
| WO | WO-2021261611 A1 | * | 12/2021 | |
| WO | WO-2022040655 A1 | * | 2/2022 | |
| WO | WO-2022040656 A1 | * | 2/2022 | ........... G06N 3/0454 |
| WO | WO-2022040678 A1 | * | 2/2022 | ........... G06N 3/0455 |
| WO | WO-2022056502 A1 | * | 3/2022 | ........... G06N 3/0455 |
| WO | WO-2022056503 A1 | * | 3/2022 | |
| WO | WO-2022067329 A1 | * | 3/2022 | ........... G06K 9/6267 |
| WO | WO-2022072979 A1 | * | 4/2022 | ............... G06N 3/08 |
| WO | WO-2022072980 A1 | * | 4/2022 | ........... H04B 7/0634 |
| WO | WO-2022156181 A1 | * | 7/2022 | |
| WO | WO-2022164599 A1 | * | 8/2022 | ............. G06N 20/00 |
| WO | WO-2022212253 A1 | * | 10/2022 | |
| WO | WO-2022261598 A1 | * | 12/2022 | ............. G06N 20/00 |

OTHER PUBLICATIONS

Henter et al., Deep Encoder-Decoder Models for Unsupervised Learning of Controllable Speech Synthesis, arXiv.org, Sep. 2018 (Year: 2018).*

Jakub Konecny, H. Brendan McMahan, and Daniel Ramage "Federated Optimization: Distributed Machine Learning for On-Device Intelligence", arXiv, Oct. 2016, University of Edinburgh, UK (Year: 2016).*

McMahan et al. Communication-Efficient Learning of Deep Networks from Decentralized Data, Google Artificial Intelligence & Statistics (AISTATS) Apr. 2017 (Year: 2017).*

International Search Report and Written Opinion - PCT/US2021/071074 - ISA/EPO - 2021-12-03 (207763WO).

Wu H., et al., "Deep Learning-Driven Wireless Communication for Edge-Cloud Computing: Opportunities and Challenges", Journal of Cloud Computing, Biomed Central LTD, London, UK, vol. 9. no. 1, Apr. 10, 2020 (2020-04-10), pp. 1-14, XP021275237, Doi: 10.1186/S13677-020- 00168-9, the Whole Document.

Xu J., et al., "Performance Evaluation of Autoencoder for Coding and Modulation in Wireless Communications", 2019 11TH International Conference on Wireless Communications and Signal Processing (Wcsp), IEEE, Oct. 23, 2019 (2019-10-23), pp. 1-6, XP033671848, Doi: 10.1109/WCSP.2019.8928071 [retrieved on 2019-12-06] Abstract, sections Iii, Iv, figures 1. 3.

Ye H., et al., "Deep Learning-Based End-to-End Wireless Communication Systems with Conditional GANs as Unknown Channels", IEEE Transactions On Wireless Communications, IEEE Service Center Piscataway, Nj. US. vol. 19. no. 5.Feb. 6, 2020 (2020-02-06), pp. 3133-3143. XP011787200, Issn: 1536-1276, DOI:10.1109/TWC.2020.2970707 [retrieved on 2020-05-07] abstract, sections Ii, Iii, figure 1.

* cited by examiner

FEDERATED LEARNING FOR CLIENT-SPECIFIC NEURAL NETWORK PARAMETER GENERATION FOR WIRELESS COMMUNICATION

CROSS-REFERENCE TO RELATED APPLICATIONS

This patent application claims priority to U.S. Provisional Patent Application No. 62/706,465, filed on Aug. 18, 2020, entitled "FEDERATED LEARNING FOR CLIENT-SPECIFIC NEURAL NETWORK PARAMETER GENERATION FOR WIRELESS COMMUNICATION," and to U.S. Provisional Patent Application No. 62/706,605, filed on Aug. 27, 2020, entitled "FEDERATED LEARNING FOR CLIENT-SPECIFIC NEURAL NETWORK PARAMETER GENERATION FOR WIRELESS COMMUNICATION," each of which is assigned to the assignee hereof. The disclosures of the prior applications are considered part of and are incorporated by reference into this patent application.

INTRODUCTION

Aspects of the present disclosure generally relate to wireless communication and to techniques and apparatuses for neural networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication is performed by a client and includes determining, using a conditioning network, a set of client-specific encoder parameters based at least in part on an observed environmental vector. The method may include determining a latent vector using an autoencoder and based at least in part on the set of client-specific encoder parameters. The method also may include transmitting the observed environmental vector and the latent vector.

In some aspects, a method of wireless communication performed by a server includes receiving, from a client, an observed environmental vector associated with one or more features associated with an environment of the client. The method also may include receiving, from the client, a latent vector that is based at least in part on a set of client-specific encoder parameters. The method may include determining an observed wireless communication vector based at least in part on the latent vector and the observed environmental vector. The method also may include performing a wireless communication action based at least in part on determining the observed wireless communication vector.

In some aspects, a client for wireless communication includes a memory and one or more processors coupled to the memory. The memory and the one or more processors may be configured to determine, using a conditioning network, a set of client-specific encoder parameters based at least in part on an observed environmental vector. The memory and the one or more processors may further be configured to determine a latent vector using an autoencoder and based at least in part on the set of client-specific encoder parameters. The memory and the one or more processors also may be configured to transmit the observed environmental vector and the latent vector.

In some aspects, a server for wireless communication includes a memory and one or more processors coupled to the memory. The memory and the one or more processors may be configured to receive, from a client, an observed environmental vector associated with one or more features associated with an environment of the client. The memory and the one or more processors may be further configured to receive, from the client, a latent vector that is based at least in part on a set of client-specific encoder parameters. The memory and the one or more processors may also be configured to determine an observed wireless communication vector based at least in part on the latent vector and the observed environmental vector. The memory and the one or more processors may be configured to perform a wireless communication action based at least in part on determining the observed wireless communication vector.

In some aspects, a non-transitory computer-readable medium storing a set of instructions for wireless communication includes one or more instructions that, when executed by one or more processors of a client, cause the client to determine, using a conditioning network, a set of client-specific encoder parameters based at least in part on an observed environmental vector. The one or more instructions also may cause the client to determine a latent vector using an autoencoder and based at least in part on the set of client-specific encoder parameters. The one or more instructions also may cause the client to transmit the observed environmental vector and the latent vector.

In some aspects, a non-transitory computer-readable medium storing a set of instructions for wireless communication includes one or more instructions that, when executed by one or more processors of a server, cause the server to receive, from a client, an observed environmental vector associated with one or more features associated with an environment of the client. The one or more instructions may cause the server to receive, from the client, a latent vector that is based at least in part on a set of client-specific encoder parameters. The one or more instructions may cause the server to determine an observed wireless communication vector based at least in part on the latent vector and the observed environmental vector. The one or more instructions also may perform a wireless communication action based at least in part on determining the observed wireless communication vector.

In some aspects, an apparatus for wireless communication includes means for determining, using a conditioning network, a set of client-specific encoder parameters based at least in part on an observed environmental vector. The apparatus also may include means for determining a latent vector using an autoencoder and based at least in part on the set of client-specific encoder parameters. The apparatus may include means for transmitting the observed environmental vector and the latent vector.

In some aspects, an apparatus for wireless communication includes means for receiving, from a client, an observed environmental vector associated with one or more features associated with an environment of the client. The apparatus also may include means for receiving, from the client, a latent vector that is based at least in part on a set of client-specific encoder parameters. The apparatus also may include means for determining an observed wireless communication vector based at least in part on the latent vector and the observed environmental vector. The apparatus also may include means for performing a wireless communication action based at least in part on determining the observed wireless communication vector.

Aspects generally include a method, apparatus, system, computer program product, non-transitory computer-readable medium, client, server, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
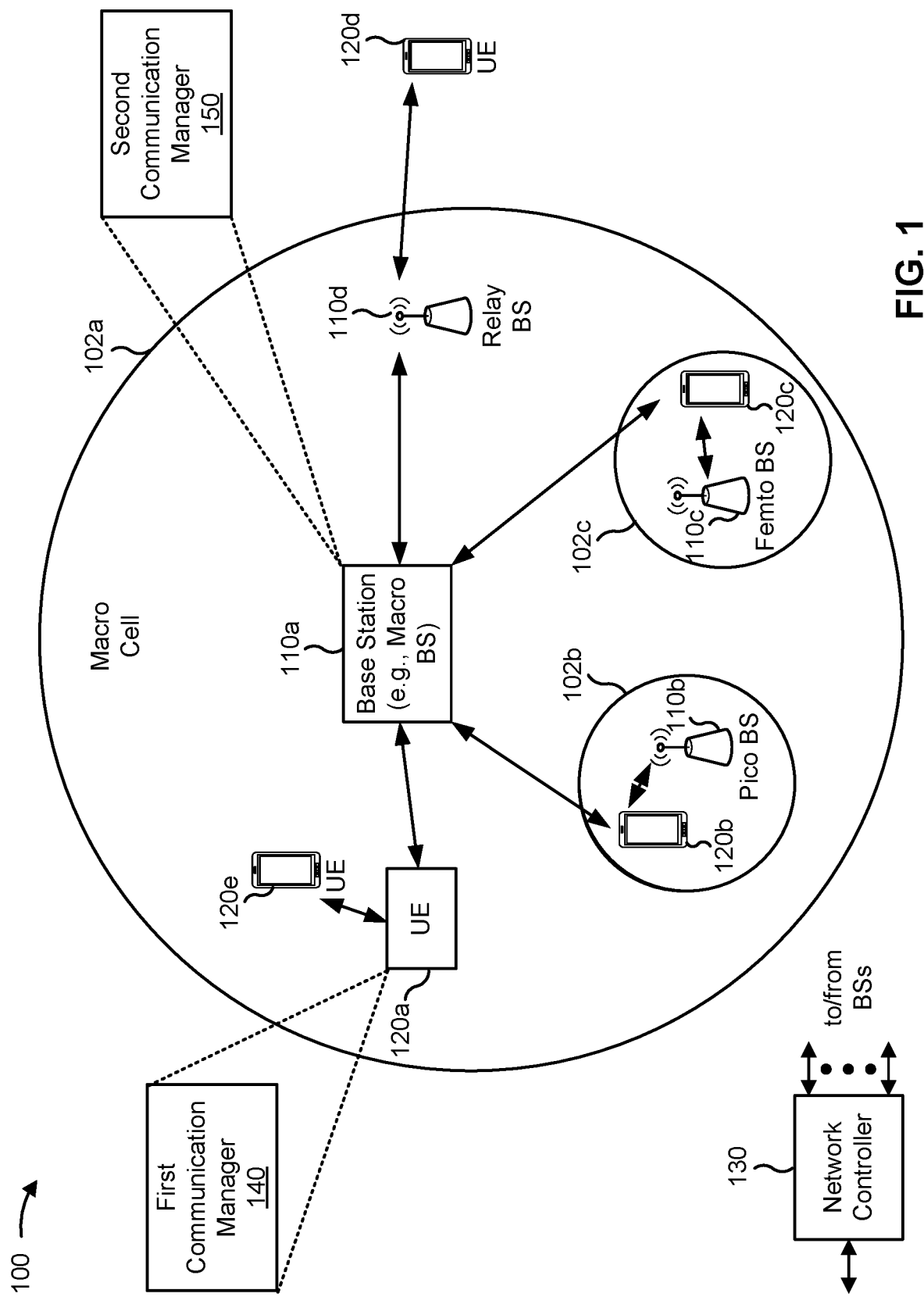
FIG. 1 is a diagram illustrating an example of a wireless network, in accordance with the present disclosure.

A client operating in a network may measure reference signals and/or the like to report to a server. For example, the client may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the server may consume communication and/or network resources.

In some aspects described herein, a client (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may use one or more neural networks that may be trained to learn dependence of measured qualities on individual parameters, isolate the measured qualities through various layers of the one or more neural networks (also referred to as "operations"), and compress measurements in a way that limits compression loss. The client may transmit the compressed measurements to the server (e.g., a TRP, another UE, a base station, and/or the like).

The server may decode the compressed measurements using one or more decompression operations and reconstruction operations associated with one or more neural networks. The one or more decompression and reconstruction operations may be based at least in part on a set of features of the compressed data set to produce reconstructed measurements. The server may perform a wireless communication action based at least in part on the reconstructed measurements.

In some aspects, the client and server may use a conditioning network and an autoencoder for compressing and reconstructing information. In some cases, conditioning networks and autoencoders may be trained using federated learning. Federated learning is a machine learning technique that enables multiple clients to collaboratively learn neural network models, while the server does not collect the data from the clients. In a typical case, federated learning techniques involve a single global neural network model trained from the data stored on multiple clients. For example, in a Federated Averaging algorithm, the server sends the neural network model to the clients. Each client trains the received neural network model using its own data and sends back an updated neural network model to the server. The server averages the updated neural network models from the clients to obtain a new neural network model.

However, in some cases, some clients may be operating in different environments than other clients (e.g. indoor/outdoor, stationary in a coffee shop/mobile on a highway, and/or the like). In some cases, different clients may be subject to different implementation aspects (e.g. different form factors, different RF impairments, and/or the like). As a result, it may be difficult to find a single neural network model that works well on all the devices in terms of physical layer link performance.

According to aspects of the techniques and apparatuses described herein, partial federated learning and/or fully federated learning techniques may be used to provide and train the autoencoder and the conditioning network. A set of autoencoder parameters may include the set of client-specific parameters and a set of shared parameters. The conditioning network computes the client-specific parameters of the autoencoder adapted for respective clients. In this way, aspects may facilitate better physical layer link performance.

According to aspects of the techniques and apparatuses described herein, partial federated learning and/or fully federated learning techniques may be used to train conditioning networks and autoencoders. In this way, aspects may facilitate better physical layer link performance. In some aspects, a client may determine, using a conditioning network and based at least in part on an observed environmental vector, a set of client-specific parameters, and/or the like. The client may determine a latent vector using a client autoencoder and based at least in part on the set of client-specific parameters and the set of shared parameters. The client may transmit the observed environmental vector and the latent vector to a server. The server may use a conditioning network to determine client-specific parameters based at least in part on the observed environmental vector, and use a decoder corresponding to the autoencoder to recover the observed wireless communication vector based at least in part on the client-specific parameters, the shared parameters, and the latent vector. Aspects of the techniques described herein may be used for any number of cross-node machine learning challenges including, for example, facilitating channel state feedback, facilitating positioning of a client, learning of modulation and/or waveforms for wireless communication, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may determine, using a conditioning network, a set of client-specific encoder parameters based at least in part on an observed environmental vector; determine a latent vector using an autoencoder and based at least in part on the set of client-specific encoder parameters; and transmit the observed environmental vector and the latent vector. Additionally, or alternatively, the first communication manager 140 may perform one or more other operations described herein.

In some aspects, the base station 110 may include a second communication manager 150. As described in more detail elsewhere herein, the second communication manager 150 may receive, from a client, an observed environmental vector associated with one or more features associated with an environment of the client; receive, from the client, a latent vector that is based at least in part on a set of client-specific encoder parameters; determine an observed wireless communication vector based at least in part on the latent vector and the observed environmental vector; and perform a wireless communication action based at least in part on determining the observed wireless communication vector. Additionally, or alternatively, the second communication manager 150 may perform one or more other operations described herein.

As indicated above, FIG. 1 is provided merely as an example. Other examples may differ from what is described with regard to FIG. 1.

Figure 2:
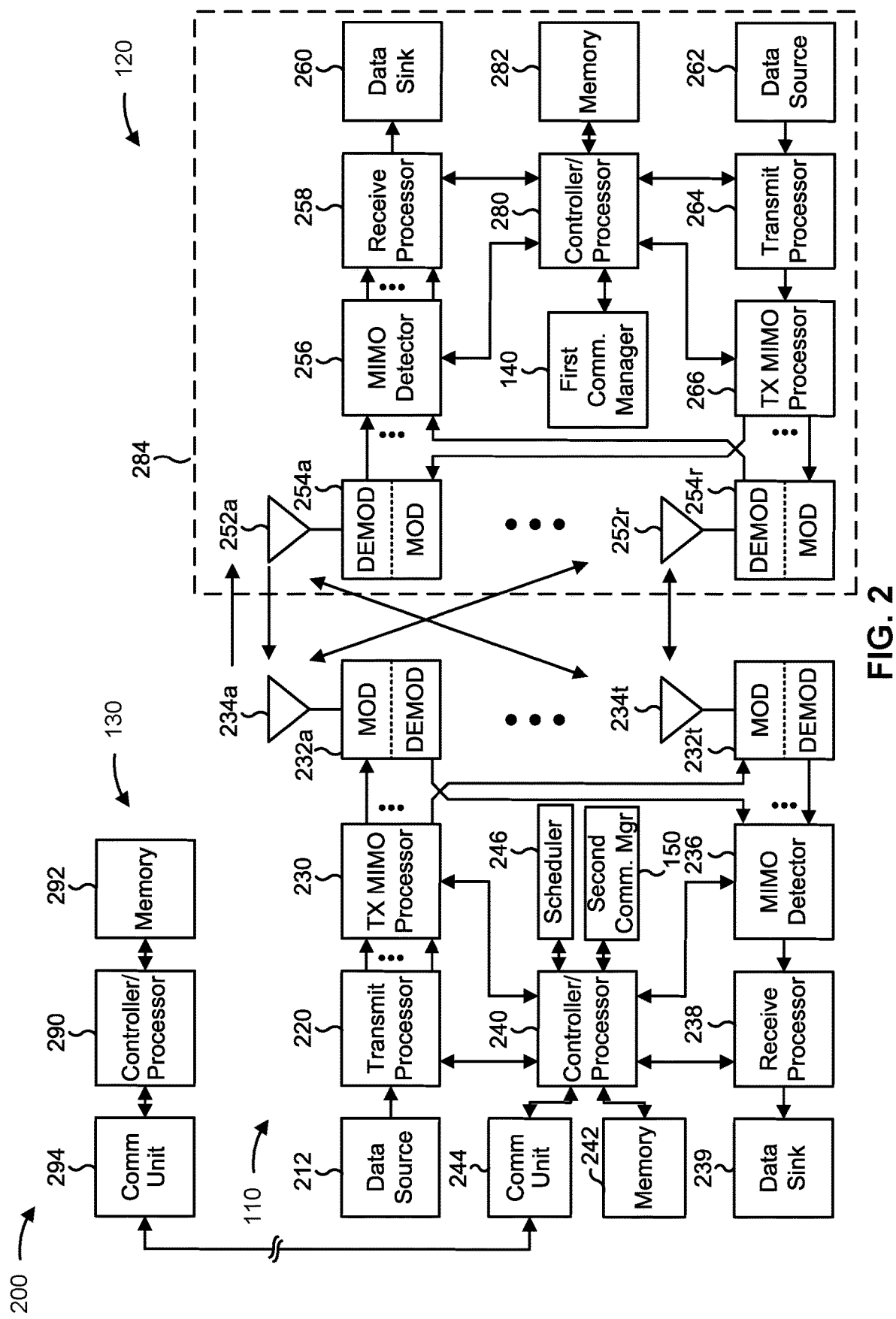
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with aspects of processes associated with federated learning for client-specific neural network parameter generation for wireless communication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, a client (e.g., the UE 120) may include means for determining, using a conditioning network, a set of client-specific encoder parameters based at least in part on an observed environmental vector, means for determining a latent vector using an autoencoder and based at least in part on the set of client-specific encoder parameters, means for transmitting the observed environmental vector and the latent vector, and/or the like. Additionally, or alternatively, the client may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a server (e.g., the base station 110) may include means for receiving, from a client, an observed environmental vector associated with one or more features associated with an environment of the client, means for receiving, from the client, a latent vector that is based at least in part on a set of client-specific encoder parameters, determining an observed wireless communication vector based at least in part on the latent vector and the observed environmental vector, means for performing a wireless communication action based at least in part on determining the observed wireless communication vector, and/or the like. Additionally, or alternatively, the server may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

As indicated above, a client operating in a network may measure reference signals and/or the like to report to a server. However, reporting this information to the server may consume communication and/or network resources. In some aspects described herein, a client may use one or more neural networks that may be trained to learn dependence of measured qualities on individual parameters, isolate the measured qualities through various layers of the one or more neural networks, and compress measurements in a way that limits compression loss. The client may transmit the compressed measurements to the server.

The server may decode the compressed measurements using one or more decompression operations and reconstruction operations associated with one or more neural networks. The one or more decompression and reconstruction operations may be based at least in part on a set of features of the compressed data set to produce reconstructed measurements. The server may perform a wireless communication action based at least in part on the reconstructed measurements.

In some aspects, the client and server may use a conditioning network and an autoencoder for compressing and reconstructing information. In some cases, conditioning networks and autoencoders may be trained using federated learning. In a typical case, federated learning techniques involve a single global neural network model trained from the data stored on multiple clients. For example, in a Federated Averaging algorithm, the server sends the neural network model to the clients. Each client trains the received neural network model using its own data and sends back an updated neural network model to the server. The server averages the updated neural network models from the clients to obtain a new neural network model.

However, in some cases, some clients may be operating in different environments than other clients. In some cases, different clients may be subject to different implementation aspects. As a result, it may be difficult to find a single neural network model that works well on all the devices in terms of physical layer link performance. According to aspects of the techniques and apparatuses described herein, federated learning techniques may be used to provide and train the autoencoder and the conditioning network that computes the client-specific parameters of the autoencoder adapted for respective clients. In this way, aspects may facilitate better physical layer link performance.

According to aspects of the techniques and apparatuses described herein, federated learning techniques may be used to train conditioning networks and autoencoders. In this way, aspects may facilitate better physical layer link performance. In some aspects, a client may determine, using a conditioning network and based at least in part on an observed environmental vector, a set of client-specific parameters, and/or the like. The client may determine a latent vector using a client autoencoder and based at least in part on the set of client-specific parameters and the set of shared parameters. The client may transmit the observed environmental vector and the latent vector to a server. The server may use a conditioning network to determine client-specific parameters based at least in part on the observed environmental vector, and use a decoder corresponding to the autoencoder to recover the observed wireless communication vector based at least in part on the client-specific parameters, the shared parameters, and the latent vector. Aspects of the techniques described herein may be used for any number of cross-node machine learning challenges including, for example, facilitating channel state feedback, facilitating positioning of a client, learning of modulation and/or waveforms for wireless communication, and/or the like.

Figure 3:
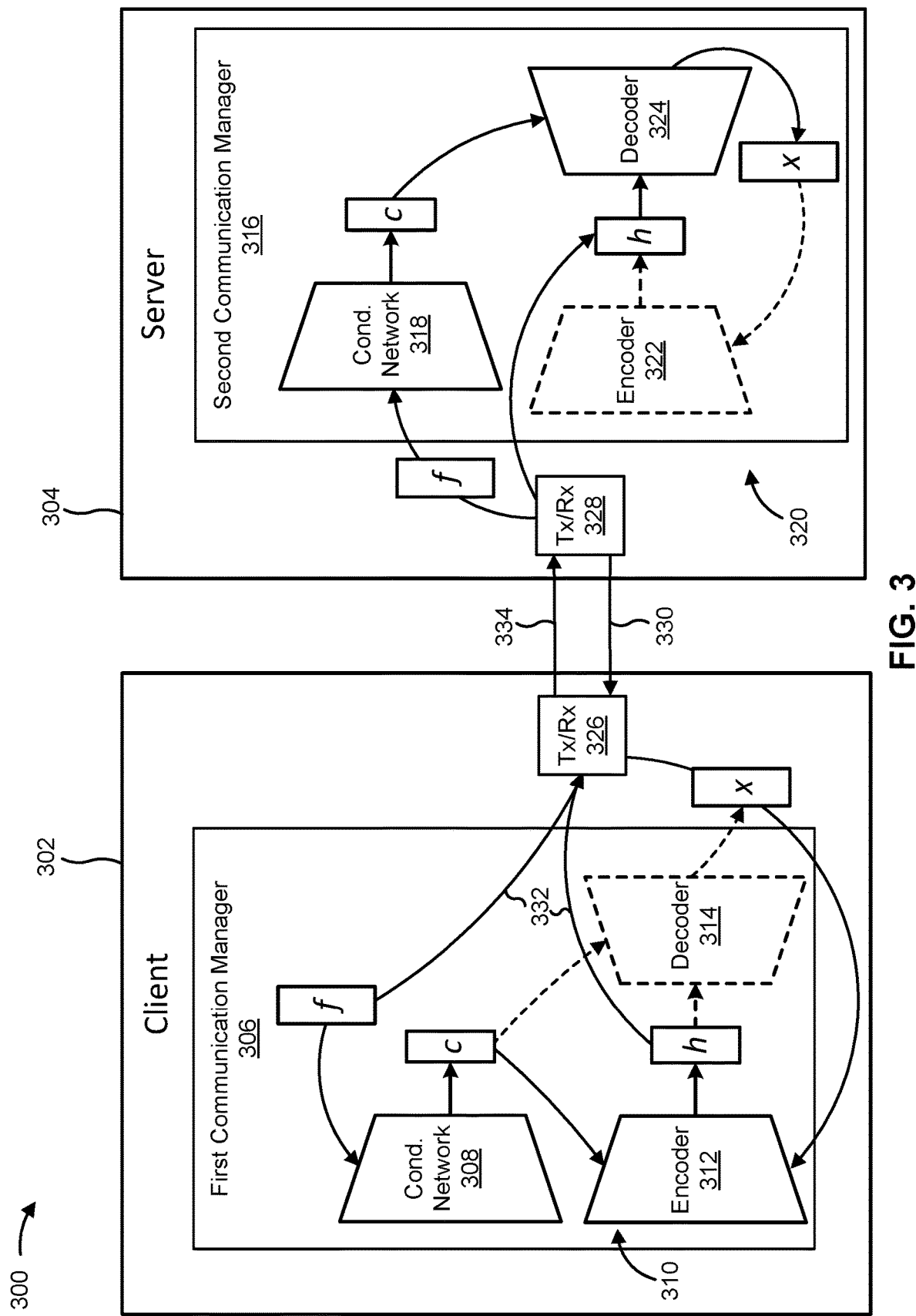
FIG. 3 is a diagram illustrating an example of wireless communication using an autoencoder and an associated conditioning network, in accordance with the present disclosure.

FIG. 3 is a diagram illustrating an example 300 of wireless communication using an autoencoder and an associated conditioning network, in accordance with the present disclosure. As shown, a client 302 and a server 304 may communication with one another. In some aspects, the client 302 and the server 304 may communicate with one another via a wireless network (e.g., the wireless network 100 shown in FIG. 1). In some aspects, more than one client 302 and/or more than one server 304 may communicate with one another.

In some aspects, the client 302 may be, be similar to, include, or be included in a wireless communication device (e.g., a UE 120, a base station 110, an integrated access and backhaul (IAB) node, and/or the like). In some aspects, the server 304 may be, be similar to, include, or be included in a wireless communication device (e.g., a UE 120, a base station 110, an IAB node, and/or the like). For example, in some aspects, the client 302 may be a UE 120 and the server 304 may be a base station, and the client 302 and the server 304 may communicate via an access link. In some aspects, the client 302 and the server 304 may be UEs 120 that communicate via a sidelink.

As shown, the client 302 may include a first communication manager 306 (e.g., the first communication manager 140 shown in FIG. 1) that may be configured to utilize a client conditioning network (shown as "Cond. Network") 308 and a client autoencoder 310 to perform one or more wireless communication tasks. In some aspects, the client conditioning network 308 may be, be similar to, include, or be included in, the conditioning network 510 shown in FIG. 5 and described below. In some aspects, the client autoencoder 310 may be, be similar to, include, or be included in, the autoencoder 520 shown in FIG. 5 and described below.

A client conditioning network is a conditioning network that is implemented at a client and a server conditioning network is a conditioning network that is implemented at a server. A client conditioning network may be referred to herein as "a conditioning network" where it is clear from context that the conditioning network is implemented at a client. A server conditioning network may be referred to herein as "a conditioning network" where it is clear from context that the conditioning network is implemented at a server. A client autoencoder is an autoencoder that is implemented at a client and a server autoencoder is an autoencoder that is implemented at a server. A client autoencoder may be referred to herein as "an autoencoder" where it is clear from context that the autoencoder is implemented at a client. A server autoencoder may be referred to herein as "an autoencoder" where it is clear from context that the autoencoder is implemented at a server.

As shown, the client conditioning network 308 may be configured to receive an observed environmental vector, f, as input and to provide a conditioning vector, c, as output. The conditioning vector c may include a set of client-specific encoder parameters, a set of client-specific decoder parameters, and/or the like. In some aspects, the client conditioning network 308 may include a first sub-network configured to determine the set of client-specific encoder parameters, a second sub-network configured to determine the set of client-specific decoder parameters, and/or the like.

As shown, the client autoencoder 310 may include an encoder 312 configured to receive an observed wireless communication vector, x, as input and to provide a latent vector, h, as output. The encoder may include at least one encoder layer configured to use the set of client-specific encoder parameters determined by the client conditioning network 308. The client 302 may determine the latent vector by mapping the observed wireless communication vector x to the latent vector h using the at least one encoder layer. The at least one encoder layer may include a first set of layers that uses a first subset of the set of client-specific encoder parameters, a second set of layers that uses a first subset of a set of shared encoder parameters, a third set of layers that uses a second subset of the set of client-specific encoder parameters and a second subset of the set of shared encoder parameters, and/or the like.

The client autoencoder 310 also may include a decoder 314 configured to receive the latent vector h as input and to provide the observed wireless communication vector x as output. The decoder may include at least one decoder layer configured to use a set of client-specific decoder parameters. The client 302 may determine the observed wireless communication vector x by mapping the latent vector h to the observed wireless communication vector x using the at least one decoder layer. The client 302 may map the latent vector h to the observed wireless communication vector x using a set of decoder parameters. The set of decoder parameters may include the set of client-specific decoder parameters and a set of shared decoder parameters. The at least one decoder layer may include a first set of layers that uses a first subset of the set of client-specific decoder parameters, a second set of layers that uses a first subset of the set of shared decoder parameters, a third set of layers that uses a second subset of the set of client-specific decoder parameters and a second subset of the set of shared decoder parameters, and/or the like.

As shown in FIG. 3, the server 304 may include a second communication manager 316 (e.g., the second communication manager 150) that may be configured to utilize a server conditioning network (shown as "Cond. Network") 318 to perform one or more wireless communication tasks. For example, in some aspects, the server conditioning network 318 may correspond to the client conditioning network 308. In some aspects, the server conditioning network 318 may be a copy of the client conditioning network 308. In some aspects, the server conditioning network 318 may be, be similar to, include, or be included in, the conditioning network 510 shown in FIG. 5 and described below.

As shown, the server conditioning network 318 may be configured to receive an observed environmental vector, f, as input and to provide a conditioning vector, c, as output. The conditioning vector c may include a set of client-specific encoder parameters, a set of client-specific decoder parameters, and/or the like. In some aspects, the server conditioning network 318 may include a first sub-network configured to determine the set of client-specific encoder parameters, a second sub-network configured to determine the set of client-specific decoder parameters, and/or the like.

In some aspects, the server 304 may include a server autoencoder 320. The server autoencoder 320 may include an encoder 322 configured to receive the observed wireless communication vector x as input and to provide the latent vector h as output. The server autoencoder 320 also may include a decoder 324 configured to receive the latent vector h as input and to provide the observed wireless communication vector x as output. The encoder 322 may include at least one encoder layer configured to use the set of client-specific encoder parameters. The decoder 324 may include at least one decoder layer configured to use a set of client-specific decoder parameters.

The decoder 324 is configured to determine the observed wireless communication vector x by mapping the latent vector h to the observed wireless communication vector x using the at least one decoder layer. The server 304 may map the latent vector h to the observed wireless communication vector x using a set of decoder parameters. The set of decoder parameters may include a set of client-specific decoder parameters and a set of shared decoder parameters. The at least one decoder layer may include a first set of layers that uses a first subset of the set of client-specific decoder parameters, a second set of layers that uses a first subset of the set of shared decoder parameters, a third set of layers that uses a second subset of the set of client-specific decoder parameters and a second subset of the set of shared decoder parameters, and/or the like.

As shown in FIG. 3, the client 302 may include a transceiver (shown as "Tx/Rx") 326 that may facilitate wireless communications with a transceiver 328 of the server 304. As shown by reference number 330, for example, the server 304 may transmit, using the transceiver 328, a wireless communication to the client 302. In some aspects, the wireless communication may include a reference signal such as a channel state information reference signal (CSI-RS). The transceiver 326 of the client 302 may receive the wireless communication. The first communication manager 306 may determine an observed wireless communication vector, x, based at least in part on the wireless communication. For example, in aspects in which the wireless communication is a CSI-RS, the observed wireless communication vector x may include channel state information (CSI).

As shown, the first communication manager 306 may obtain an observed environmental vector, f, and provide the observed environmental vector, f, to the client conditioning network 308. The first communication manager 306 may obtain the observed environmental vector f from memory, from one or more sensors, and/or the like. As shown, the client conditioning network may determine, based at least in part on the observed environmental vector f a conditioning vector, c. The first communication manager 306 may load client-specific autoencoder parameters from the conditioning vector c into the client autoencoder 310. The first communication manager 306 may provide the observed wireless communication vector x as input to the encoder 312 of the client autoencoder 310. The encoder 312 of the client autoencoder 310 may determine a latent vector, h, based at least in part on the observed wireless communication vector x.

As shown by reference number 332, the first communication manager 306 may provide the observed environmental vector f and the latent vector h to the transceiver 326 for transmission. As shown by reference number 334, the transceiver 326 may transmit, and the transceiver 328 of the server 304 may receive, the observed environmental vector f and the latent vector h. As shown, the second communication manager 316 of the server 304 may provide the observed environmental vector f as input to the server conditioning network 318, which may determine a conditioning vector c. The second communication manager 316 may load client-specific decoder parameters from the conditioning vector c into one or more layers of the decoder 324 of the server autoencoder 320.

The second communication manager 316 may provide the latent vector h as input to the decoder 324 of the server autoencoder 320. The decoder 324 may determine (e.g., reconstruct) the observed wireless communication vector x based at least in part on the latent vector h. In some aspects, the server 304 may perform a wireless communication action based at least in part on the observed wireless communication vector x. For example, in aspects in which the observed wireless communication vector x comprises CSI, the second communication manager 316 of the server 304 may use the CSI for communication grouping, beamforming, and/or the like.

As indicated above, FIG. 3 is provided merely as an example. Other examples may differ from what is described with regard to FIG. 3.

Figure 4:
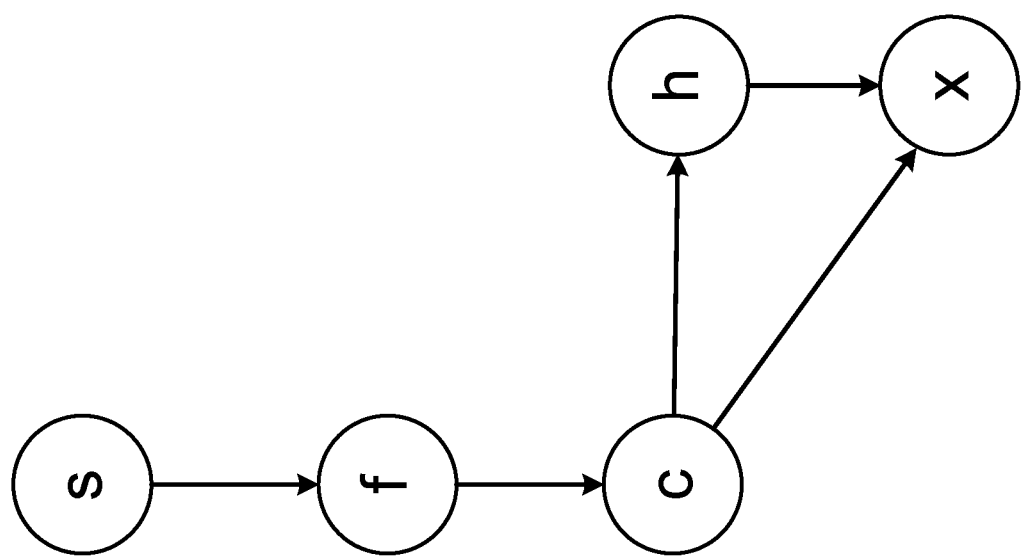
FIG. 4 is a diagram illustrating an example of a directed graphical model corresponding to an autoencoder and an associated conditioning network, in accordance with the present disclosure.

FIG. 4 is a diagram illustrating an example 400 of a directed graphical model corresponding to an autoencoder and an associated conditioning network, in accordance with the present disclosure. In some aspects, for example, the directed graphical model may correspond to the client conditioning network 308 and the client autoencoder 310 shown in FIG. 3, the server conditioning network 318 and the server autoencoder 320 shown in FIG. 3, and/or the like.

In some aspects, a data distribution at a client s may be represented by the directed graphical model shown in FIG. 4. The model provides an example of a representation of a relationship between the client s, an observed wireless communication vector, x; a latent vector, h; an observed environmental vector, f, and a conditioning vector, c.

In some aspects, the observed wireless communication vector x and the latent vector h may be associated with a wireless communication task. The observed wireless communication vector x may include an array of observed values associated with one or more measurements obtained in connection with a wireless communication. In some aspects, the wireless communication task may include determining channel state feedback (CSF), determining positioning information associated with the client, determining a modulation associated with a wireless communication, determining a waveform associated with a wireless communication, and/or the like. The latent vector h is the output of an encoder of an autoencoder that takes the observed wireless communication vector x as input. The latent vector h may include an array of hidden values associated with one or more aspects of the observed communication vector x.

For example, in some aspects, autoencoders may be used for compressing CSF for feeding back CSI to a server. In some aspects, the observed wireless communication vector x may comprise a propagation channel that the client (e.g., a UE 120) estimates based at least in part on a received CSI-RS. The latent vector h may comprise compressed CSF to be fed back to a server (e.g., a base station 110).

In some aspects, the observed environmental vector f may include one or more variables that may be observed to facilitate learning the environment of the client s. In some aspects, the conditioning vector c may be determined based at least in part on the observed environmental vector f so that the conditioning vector c may be used to customize an output of an encoder and/or decoder of an autoencoder with respect to an environment associated with a client.

In some aspects, the observed environmental vector f may include any number of different types of information that a client (e.g., client 302 shown in FIG. 3) may obtain about an environment of the client. Information about the environment of the client may include information about the client (e.g., device information, configuration information, capability information, and/or the like), information about a state associated with the client (e.g., an operation state, a power state, an activation state, and/or the like), information about the location of the client (e.g., positioning information, orientation information, geographical information, motion information, and/or the like), information about an environment surrounding the client (e.g., weather information, information about obstacles to wireless signals surrounding the client, information about materials in the vicinity of the client, and/or the like), and/or the like. The observed environmental vector f may be formed by concatenating one or more information indications such as those listed above.

In some aspects, for example, the observed environmental vector f may include a client identifier (ID), a client antenna configuration, a large scale channel characteristic, a CSI-RS configuration, an image obtained by an imaging device, a portion of an estimated propagation channel, and/or the like. In some aspects, for example, the large scale channel characteristic may indicate a delay spread associated with a channel, a power delay profile associated with a channel, a Doppler measurement associated with a channel, a Doppler spectrum associated with a channel, a signal to noise ratio (SNR) associated with a channel, a signal to interference plus noise ratio (SINR) associated with a channel, a reference signal received power (RSRP), a received signal strength indicator (RSSI), and/or the like.

In some aspects, the graphical model shown in FIG. 4 may be used to derive a probabilistic expression related to using a conditioning network in association with an autoencoder in accordance with aspects discussed herein. For example, in some aspects, the graphical model may indicate the following probability density function:

$$p(x,h,c,f|s)=p(x|h,c) \cdot p(h|c) \cdot p(c|f) \cdot p(f|s),$$

where p is a probability density function, x is an observed wireless communication vector, f is an observed environmental vector, h is a latent vector, c is a conditioning vector based at least in part on f, and s is the client. In some aspects, the probability density function indicated by the directed graphical model may be used to configure training of autoencoders.

As indicated above, FIG. 4 is provided merely as an example. Other examples may differ from what is described with regard to FIG. 4.

Figure 5:
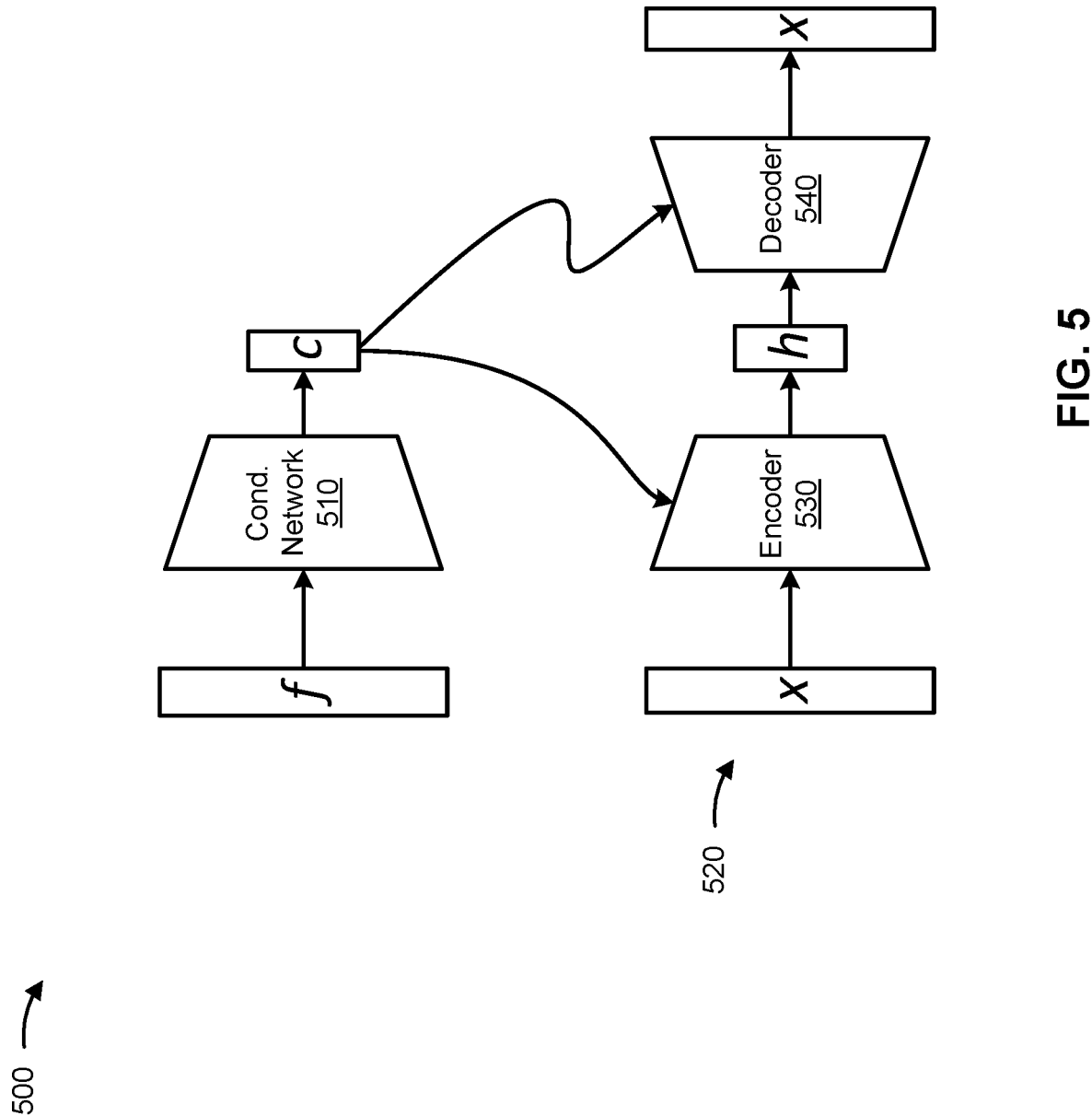
FIG. 5 is a diagram illustrating an example of an autoencoder and an associated conditioning network, in accordance with the present disclosure.

FIG. 5 is a diagram illustrating an example 500 of an autoencoder and an associated conditioning network, in accordance with the present disclosure. Aspects of the example 500 may be implemented by a client (e.g., the client 302 shown in FIG. 3), a server (e.g., the server 304 shown in FIG. 3), and/or the like. The autoencoder and associated conditioning network in FIG. 5 may be used to implement aspects associated with the directed graphical model shown in FIG. 4.

As shown, a conditioning network (shown as "Cond. Network") 510 may be configured to receive an observed environmental vector, f, as input and to provide a conditioning vector, c, as output. In some aspects, the conditioning network 510 may be or include a neural network or a plurality of neural networks. The conditioning vector c may include client-specific parameters that may be loaded into one or more layers of an autoencoder 520. In some aspects, the autoencoder 520 may be or include a neural network or a plurality of neural networks. The autoencoder 520 may be a regular autoencoder or a variational autoencoder. The autoencoder 520 may include an encoder 530 configured to receive an observed wireless communication vector, x, as input and to provide a latent vector, h, as output. The autoencoder 520 also may include a decoder 540 configured to receive the latent vector h as input and to provide (e.g., recover) the observed wireless communication vector x as output.

According to various aspects, the conditioning network 510 and the autoencoder 520 may be trained before being used for inference. In some aspects, training the conditioning network 510 and/or the autoencoder 520 may include determining a set of neural network parameters, w, θ, and φ, that maximize a variational lower bound function (which may be referred to, interchangeably, as an evidence lower bound (ELBO) function) corresponding to the conditioning network 510 and the autoencoder 520.

In some aspects, to find the ELBO on the evidence function, $\log p_{w,\theta}(x, f|s)$, a variational distribution $q_{\phi,w}(h, c|x,f) = q_\phi(h|x,c)p_w(c|f)$ may be introduced, and the ELBO may be written as:

$$\mathcal{L}_{w,\theta,\phi} = \sum_{h,c} q_{\phi,w}(h, c|x, f) \log\left(\frac{p_\theta(x|h, c) \cdot p_\theta(h|c) \cdot p_w(c|f) \cdot p(f|s)}{q_{\phi,w}(h, c|x, f)}\right),$$

where φ represents the shared parameters for the encoder 530, θ represents the shared parameters for the decoder 540, and w represents the shared parameters for the conditioning network. The ELBO $\mathcal{L}_{w,\theta,\phi}$ may be used in the training to optimize the neural network parameters w, θ, and φ. The ELBO $\mathcal{L}_{w,\theta,\phi}$ may be simplified to:

$$\mathcal{L}_{w,\theta,\phi} = E_{c \sim p_w(c|f)}[E_{h \sim q_\phi(h|x,c)}\{\log p_\theta(x|h,c)\} - KL(q_\phi(h|x,c)\|p_\theta(h|c))] + \log p(f|s).$$

The last term, log p (f|s), may be immaterial in terms of neural network optimization. Accordingly, the ELBO $\mathcal{L}_{w,\theta,\phi}$ may be rewritten as:

$$\mathcal{L}_{w,\theta,\phi} = E_{c \sim p_w(c|f)}\{\bar{\mathcal{L}}_{\theta,\phi}(c)\},$$

where $\bar{\mathcal{L}}_{\theta,\phi}(c) = E_{h \sim q_\phi(h|x,c)}\{\log p_\theta(x|h,c)\} - KL(q_\phi(h|x,c)\|p_\theta(h|c)),$ and where $p_w(c|f)$ is parameterized by the conditioning network 510, $q_\phi(h|x,c)$ is parameterized by the encoder 530 of the autoencoder 520, $p_\theta(x|h,c)$ is parameterized by the decoder 540 of the autoencoder 520, $p_\theta(h|c)$ is parameterized by a prior network to train the autoencoder 520, $E_{h \sim q_\phi(h|x,c)}\{\log p_\theta(x|h,c)\}$ is the reconstruction loss for the autoencoder 520, and KL $(q_\phi(h|x,c)\|p_\theta(h|c))$ is the regularization term for the autoencoder 520.

In some aspects, training the conditioning network 510 and the autoencoder 520 may include finding the neural network parameters w, θ, and φ that maximize the ELBO, $\mathcal{L}_{w,\theta,\phi}$. In some aspects, a negative variational lower bound function may correspond to a loss function associated with the autoencoder 520. Here, the negative ELBO given by $\mathcal{F}_{w,\theta,\phi} := -\mathcal{L}_{w,\theta,\phi}$ (also known as variational free energy) may be used as a loss function in the training, and a stochastic gradient descent (SGD) algorithm may be used to optimize the shared neural network parameters w, θ and φ. The conditioning variable c can be viewed as the client-specific parameters for the autoencoder 520. Thus, $(-\bar{\mathcal{L}}_{\theta,\phi}(c))$ can be viewed as a loss function for the autoencoder 520 when the conditioning network 510 provides the client-specific parameters of the autoencoder 520.

In some aspects, the conditioning vector c from the conditioning network 510 may condition the autoencoder 520 to perform well in the observed environment. The conditioning vector c may include the client-specific parameters for the encoder $\phi_c$ and the client-specific parameters for the decoder $\theta_c$. Thus, a set of encoder parameters may include the shared parameters φ and the client-specific parameters $\phi_c$. The set of decoder parameters may include the shared parameters θ and the client-specific parameters $\theta_c$. A set of neural network parameters may include parameters for the encoder, the decoder, and the conditioning network.

In some aspects, the conditioning network 510 and/or the autoencoder 520 may be trained using an unsupervised learning procedure. The conditioning network 510 and/or the autoencoder 520 may be trained using a federated learning procedure (e.g., as shown in FIGS. 8-13).

As indicated above, FIG. 5 is provided merely as an example. Other examples may differ from what is described with regard to FIG. 5.

Figure 6:
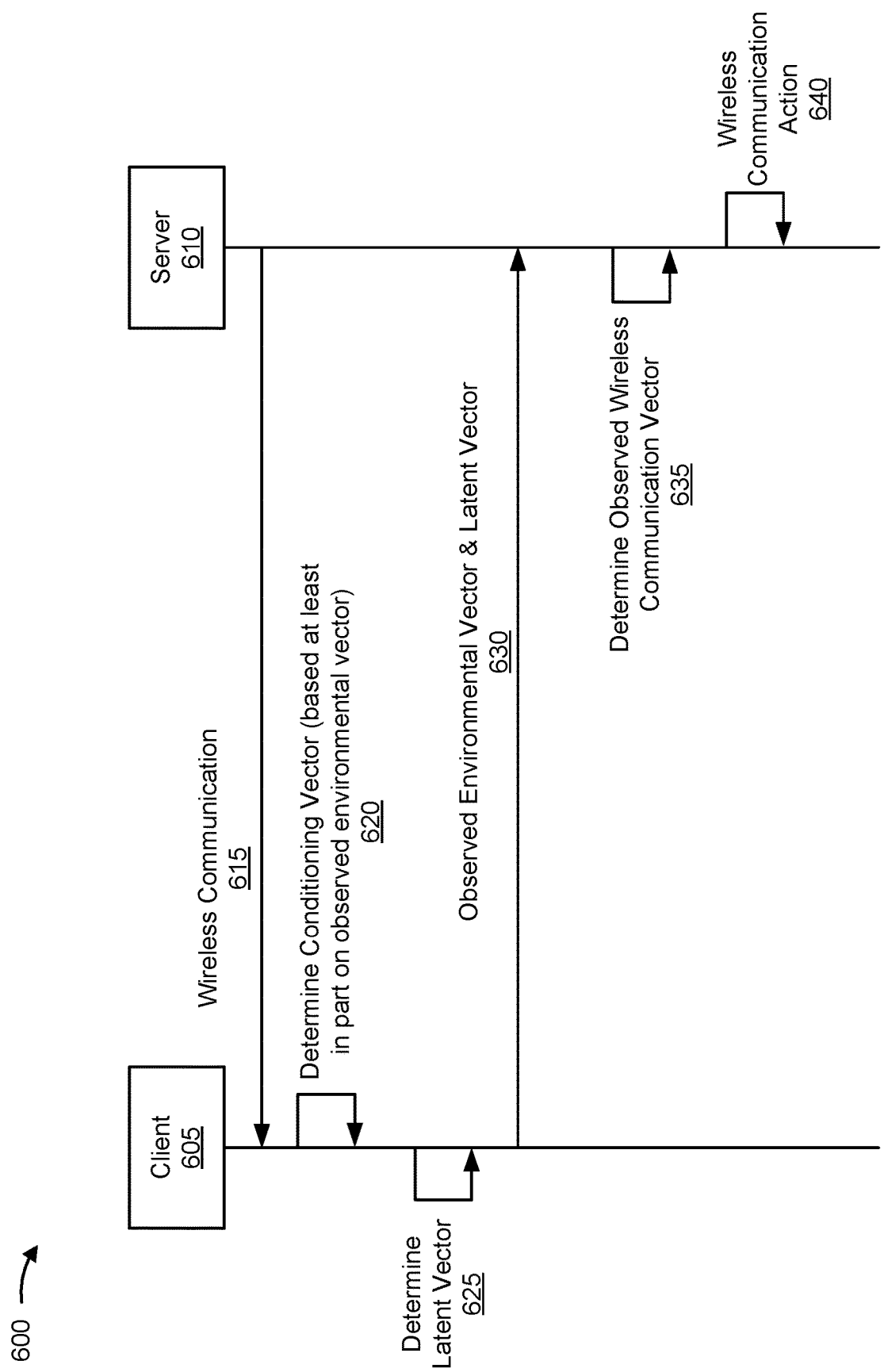
FIG. 6 is a diagram illustrating an example of wireless communication using an autoencoder and an associated conditioning network, in accordance with the present disclosure.

FIG. 6 is a diagram illustrating an example 600 of wireless communication using an autoencoder and an associated conditioning network, in accordance with the present disclosure. As shown, a client 605 and a server 610 may communicate with one another. In some aspects, the client 605 may be, be similar to, include, or be included in the client 302 shown in FIG. 3. In some aspects, the server 610 may be, be similar to, include, or be included in the server 304 shown in FIG. 3.

As shown by reference number 615, the server 610 may transmit, and the client 605 may receive, a wireless communication. In some aspects, the wireless communication may include a reference signal (e.g., a CSI-RS, and/or the like), a data communication, a control communication, and/or the like. In some aspects, the wireless communication may be carried using a physical downlink control channel (PDCCH), a physical downlink shared channel (PDSCH), a physical sidelink control channel (PSCCH), a physical sidelink shared channel (PSSCH), and/or the like.

As shown by reference number 620, the client 605 may determine a conditioning vector associated with one or more features associated with an environment of the client 605. The client 605 may determine the conditioning vector based at least in part on an observed environmental vector. In some aspects, the client 605 may determine the conditioning vector using a conditioning network (e.g., the conditioning network 510 shown in FIG. 5, the client conditioning network 308 shown in FIG. 3, and/or the like). As shown by reference number 625, the client 605 may determine a latent vector. For example, in some aspects, the client may determine the latent vector using an autoencoder (e.g., the autoencoder 520 shown in FIG. 5, the client autoencoder 310 shown in FIG. 3, and/or the like).

As shown by reference number 630, the client 605 may transmit, and the server 610 may receive, the observed environmental vector and the latent vector. In some aspects, the observed environmental vector and the latent vector may be carried in a physical uplink control channel (PUCCH), a physical uplink shared channel (PUSCH), and/or the like. As shown by reference number 635, the server 610 may determine an observed wireless communication vector. In some aspects, the server 610 may determine the observed wireless communication vector based at least in part on the latent vector and a conditioning vector.

For example, in some aspects, the server 610 may use a server conditioning network (e.g., the conditioning network 510 shown in FIG. 5, the server conditioning network 318 shown in FIG. 3, and/or the like) to determine a conditioning vector based at least in part on the observed environmental vector. The conditioning vector may include client-specific decoder parameters that the server 610 may load into one or more layers of a decoder of a server autoencoder (e.g., the autoencoder 520 shown in FIG. 5, the server autoencoder 320 shown in FIG. 3, and/or the like). The server 610 may use the decoder to determine the observed wireless communication vector. As shown by reference number 640, the server may perform a wireless communication action based at least in part on determining the observed wireless communication vector.

As indicated above, FIG. 6 is provided merely as an example. Other examples may differ from what is described with regard to FIG. 6.

Figure 7:
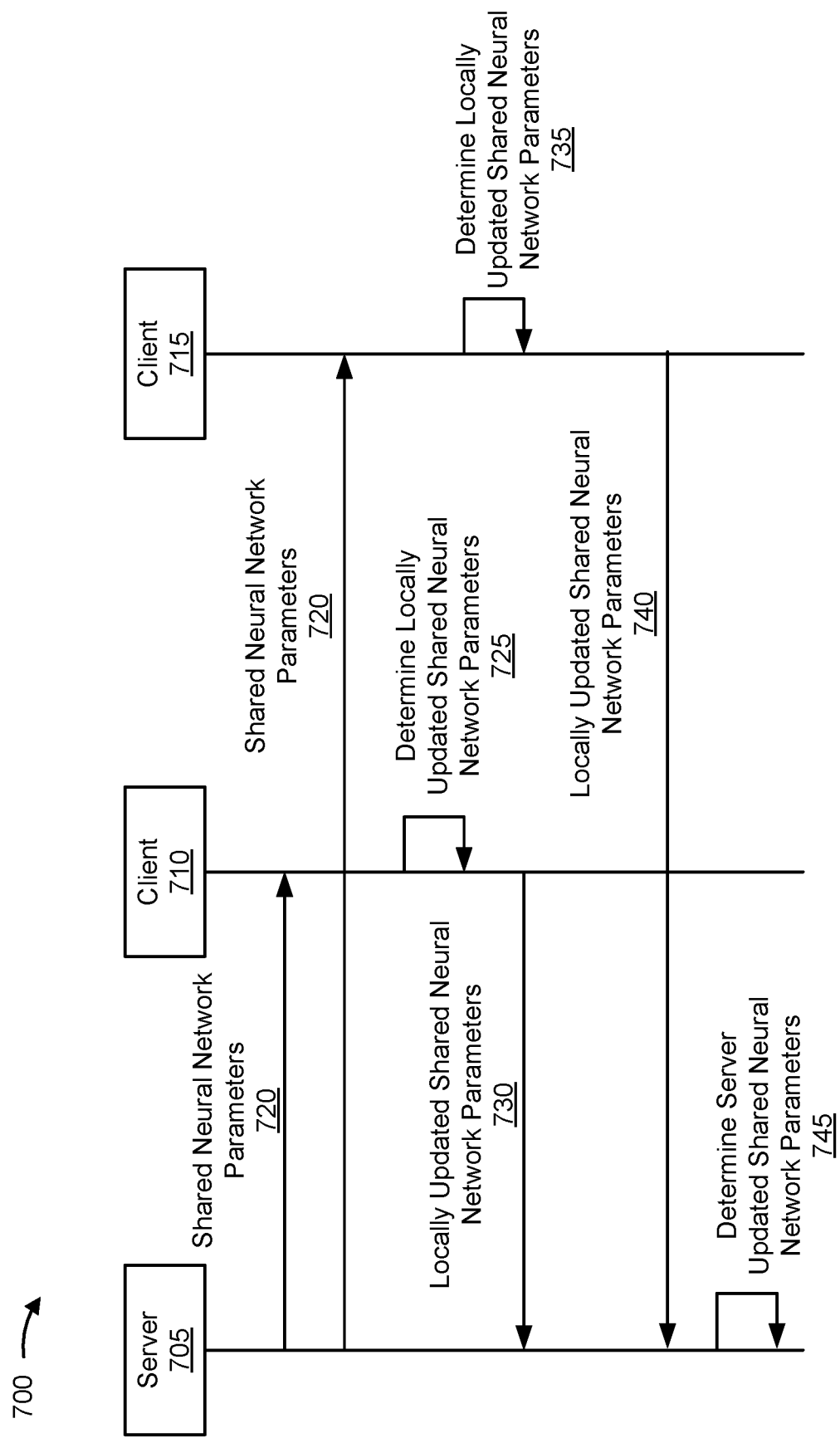
FIG. 7 is a diagram illustrating an example of federated learning for an autoencoder and an associated conditioning network, in accordance with the present disclosure.

FIG. 7 is a diagram illustrating an example 700 of federated learning for an autoencoder and an associated conditioning network, in accordance with the present disclosure. As shown, a server 705, a first client 710, and a second client 715 may communicate with one another. In some aspects, the server 705 may be, be similar to, include, or be included in the server 610 shown in FIG. 6, the server 304 shown in FIG. 3, and/or the like. In some aspects, the client 710 and/or the client 715 may be, be similar to, include, or be included in the client 605 shown in FIG. 6, the client 302 shown in FIG. 3, and/or the like. In some aspects, any number of additional clients may communicate with the server 705.

In some aspects, federated learning may include jointly training a conditioning network (e.g., the conditioning network 510 shown in FIG. 5) and an autoencoder (e.g., the autoencoder 520 shown in FIG. 5). In federated learning, the conditioning network and the autoencoder may be trained by clients. In some aspects, federated learning may include alternating between training a conditioning network and training an autoencoder. In some aspects, a mapping to a conditioning vector, c, may change slowly since the client features chosen for the observed vector f may be relatively static or change slowly. As a result, in some aspects, alternating between training the conditioning vector and training the autoencoder may include performing a first plurality of training iterations associated with the conditioning vector according to a first training frequency; and performing a second plurality of training iterations associated with the autoencoder according to a second training frequency that is higher than the first training frequency.

As shown by reference numbers 720, the server 705 may transmit, to a set of clients (e.g., the client 710 and the client 715), a set of shared neural network parameters (e.g., the parameters w, $\theta$, and $\phi$, described above, in connection with FIG. 5). The neural network parameter, w, may correspond to a conditioning network, and the neural network parameters $\theta$ and $\phi$ may correspond to an autoencoder. As shown by reference number 725, the first client 710 may determine a set of locally updated shared neural network parameters. As shown by reference number 730, the first client 710 may transmit, and the server 705 may receive, the set of locally updated shared neural network parameters.

As shown by reference number 735, the second client 715 also may determine a set of locally updated shared neural network parameters. As shown by reference number 740, the second client 715 may transmit, and the server 705 may receive, the set of locally updated shared neural network parameters. As shown by reference number 745, the server 705 may determine a set of server updated shared neural network parameters. The server 705 may determine the set of server updated shared neural network parameters by averaging the locally updated shared neural network parameters received from the clients 710 and 715. The server 705 may use the set of server updated shared neural network parameters to update a server conditioning network and a server autoencoder.

As indicated above, FIG. 7 is provided merely as an example. Other examples may differ from what is described with regard to FIG. 7.

Figure 8:
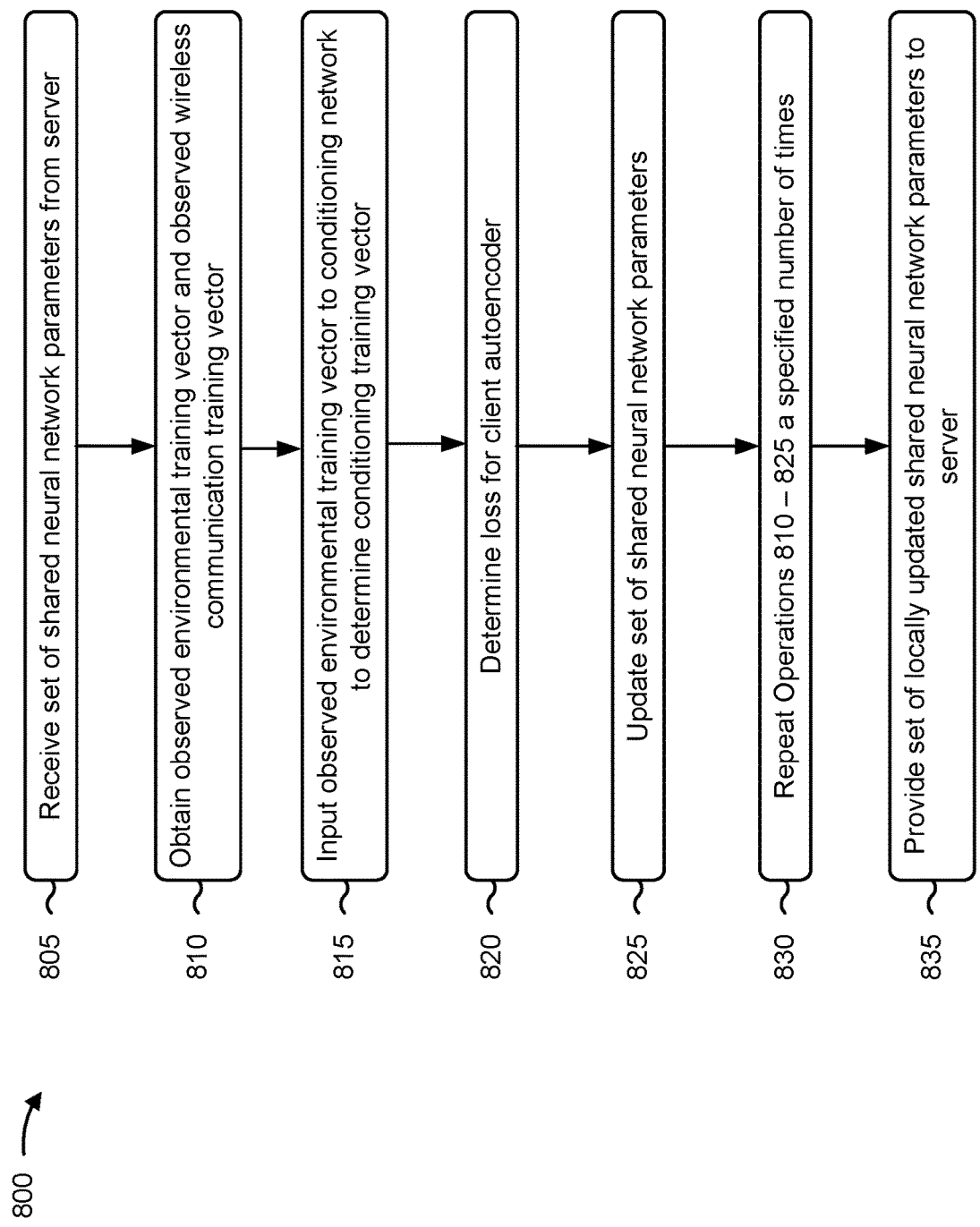
FIGS. 8-13 are diagrams illustrating examples of federated learning for autoencoders and associated conditioning networks, in accordance with the present disclosure.

FIG. 8 is a diagram illustrating an example process 800 of federated learning for autoencoders and associated conditioning networks, in accordance with the present disclosure. The process 800 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 800 may include receiving a set of shared neural network parameters from a server (block 805). In some aspects, the set of shared neural network parameters may include a set of shared conditioning network parameters, w, and a set of shared autoencoder parameters, ($\phi$, $\theta$). The process may further include obtaining an observed environmental training vector, f, and an observed wireless communication training vector, x (block 810). The process may include inputting the observed environmental training vector to the conditioning network to determine a conditioning training vector (block 815). The conditioning training vector may include a set of client-specific encoder training parameters and a set of client-specific decoder training parameters.

As shown, the process 800 may include determining a loss for the client autoencoder (block 820). For example, in some aspects, the client may determine a first loss corresponding to the autoencoder by inputting the observed wireless communication training vector x to an encoder of the autoencoder to determine a latent training vector, h. The client may input the latent training vector h to a decoder of the autoencoder to determine a training output of the autoencoder. The training output may include a reconstruction of the observed wireless communication training vector x. The client may determine a loss associated with the autoencoder based at least in part on the training output. In some aspects, the client may load at least one layer of an encoder of the autoencoder with a set of client-specific encoder training parameters from the conditioning vector, loading at least one layer of a decoder of the autoencoder with the set of client-specific decoder training parameters from the conditioning parameter, and/or the like. The loss may be associated with the set of shared neural network parameters. In some aspects, the client may determine a regularization term corresponding to the autoencoder. The client may determine the loss based at least in part on the second regularization term.

The process 800 may further include updating the set of shared neural network parameters (block 825). In some aspects, the client may update the set of shared neural network parameters by determining a plurality of gradients of the loss with respect to the set of shared neural network parameters and update the set of shared neural network parameters based at least in part on the plurality of gradients.

In some aspects, the process 800 may further include repeating operations 810-825 a specified number of times (block 830). For example, the client may update the set of shared neural network parameters a specified number of times to determine a set of locally updated shared neural network parameters. The process 800 may include providing the set of locally updated shared neural network parameters to the server (block 835). For example, the client may transmit the set of locally updated shared neural network parameters to the server.

As indicated above, FIG. 8 is provided merely as an example. Other examples may differ from what is described with regard to FIG. 8.

Figure 9:
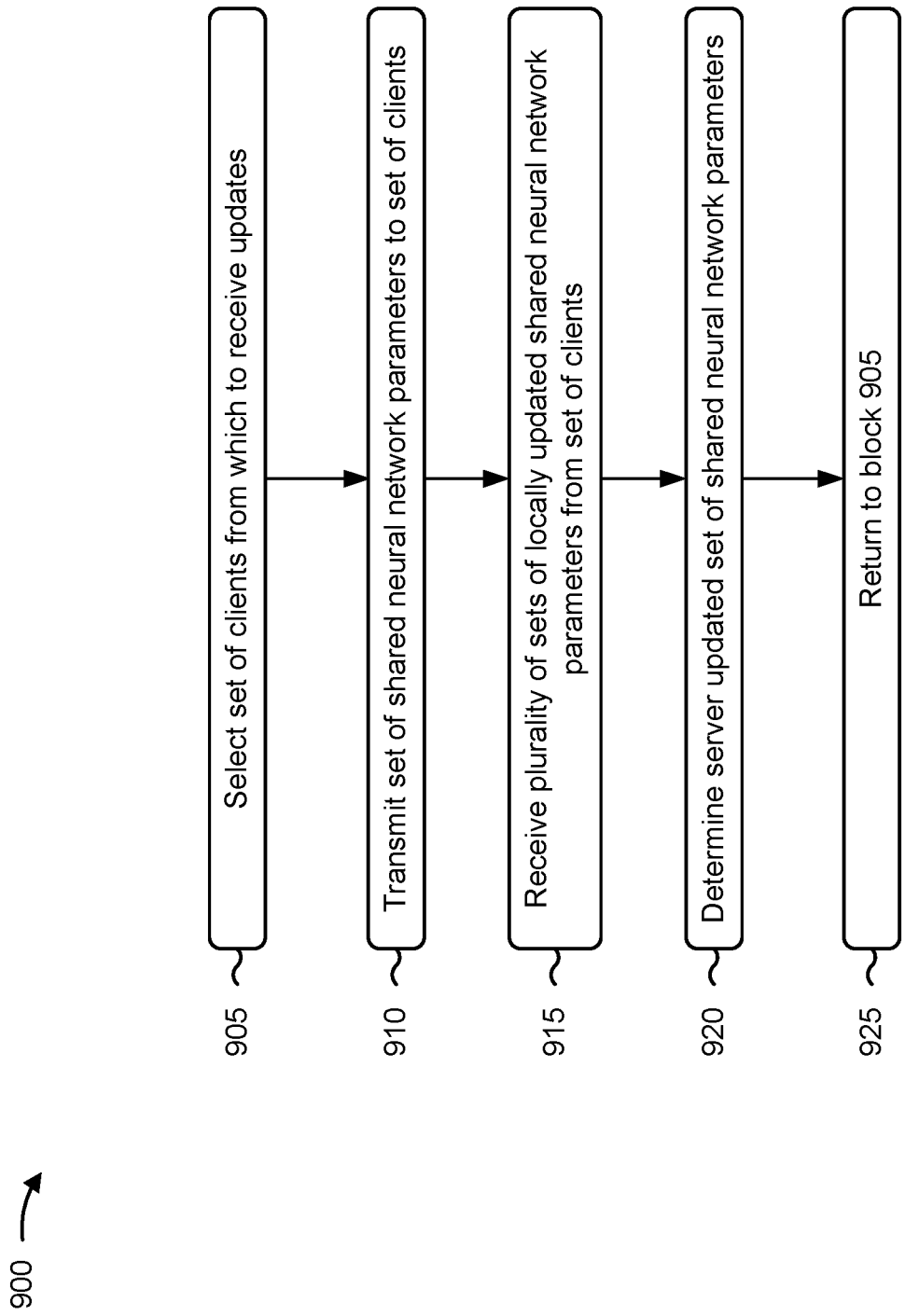

FIG. 9 is a diagram illustrating an example process 900 of federated learning for autoencoders and associated conditioning networks, in accordance with the present disclosure. The example process 900 is an aspect of a federated learning process that may be performed, for example, by a server (e.g., server 705 shown in FIG. 7, server 610 shown in FIG. 6, server 304 shown in FIG. 3, and/or the like).

The process 900 may include selecting a set of clients from which to receive updates (block 905). For example, the server may select a set of clients from which to receive updates associated with a conditioning network and an autoencoder. The process 900 may include transmitting a set of shared neural network parameters to the set of clients (block 910). For example, the server may transmit a set of shared neural network parameters, (w, ϕ, θ), to the set of clients.

The process 900 may include receiving a plurality of sets of locally updated shared neural network parameters from the set of clients (block 915). For example, the server may receive sets of locally updated shared neural network parameters, (w, ϕ, θ), associated with the conditioning network and the autoencoder. The process 900 may further include determining a server updated set of shared updated neural network parameters (block 920). For example, the server may determine, based at least in part on the plurality of sets of locally updated shared neural network parameters, a server updated set of shared updated neural network parameters. As shown, the process 900 may include returning to block 905 (block 925) and repeating the process 900 with an additional set or sets of clients.

As indicated above, FIG. 9 is provided merely as an example. Other examples may differ from what is described with regard to FIG. 9.

Figure 10:
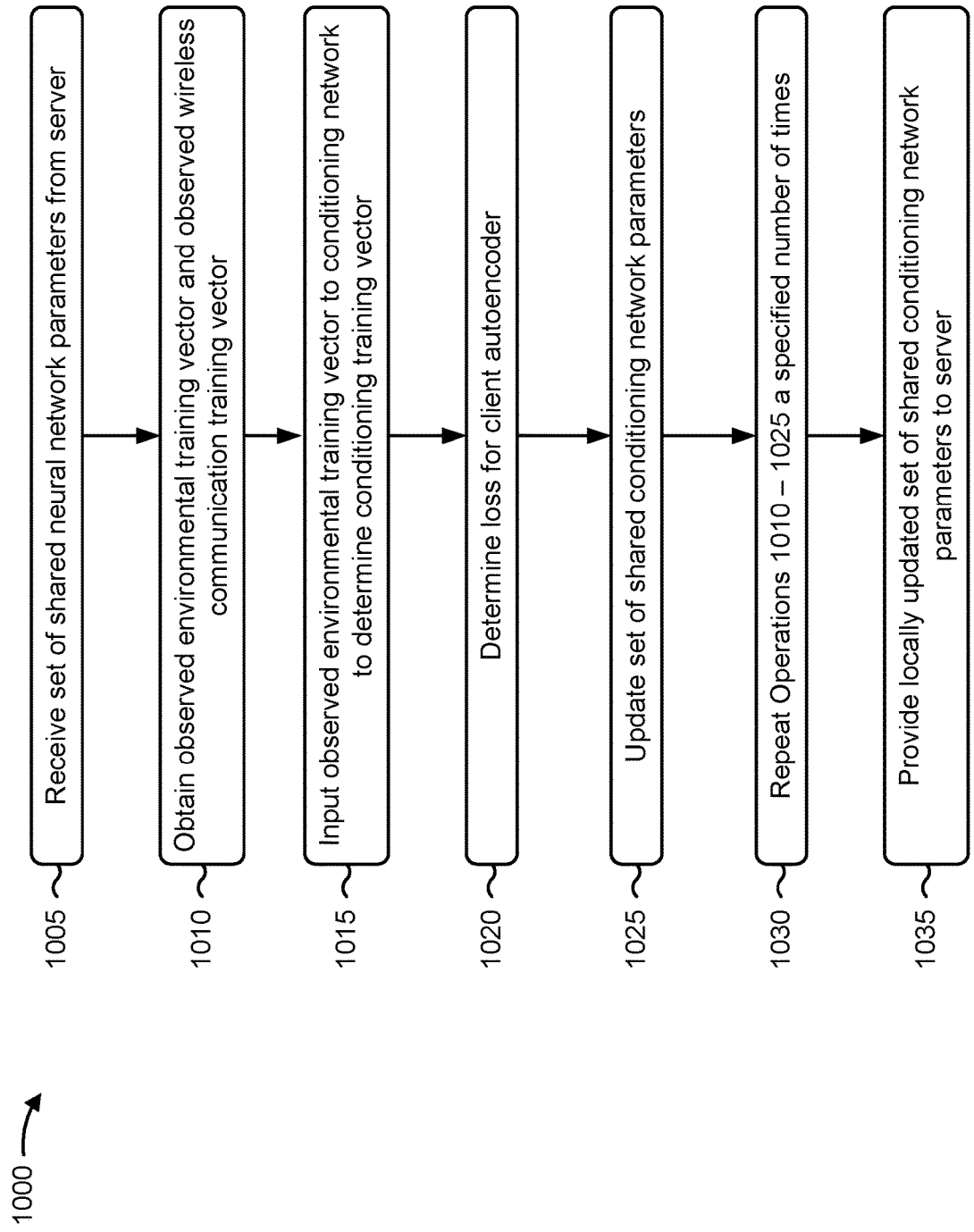

FIG. 10 is a diagram illustrating an example process 1000 of federated learning for autoencoders and associated conditioning networks, in accordance with the present disclosure. The process 1000 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 1000 may include receiving a set of shared neural network parameters from a server (block 1005). In some aspects, the set of shared neural network parameters may include a set of shared neural network parameters, (w, ϕ, θ), associated with the conditioning network and the autoencoder. The process may further include obtaining an observed environmental training vector f and an observed wireless communication training vector x (block 1010). The process may include inputting the observed environmental training vector to the conditioning network to determine a conditioning training vector (block 1015). The conditioning training vector may include a set of client-specific encoder training parameters and a set of client-specific decoder training parameters.

As shown, the process 1000 may include determining a loss for the client autoencoder (block 1020). For example, in some aspects, the client may determine a first loss corresponding to the client autoencoder by inputting the observed wireless communication training vector x to an encoder of the client autoencoder to determine a latent training vector h. The client may input the latent training vector h to a decoder of the client autoencoder to determine a training output of the client autoencoder. The training output may include a reconstruction of the observed wireless communication training vector x. The client may determine a loss associated with the client autoencoder based at least in part on the training output. In some aspects, the client may load at least one layer of an encoder of the client autoencoder with a set of client-specific encoder training parameters from the conditioning vector, loading at least one layer of a decoder of the client autoencoder with the set of client-specific decoder training parameters from the conditioning parameter, and/or the like. The loss may be associated with the set of shared neural network parameters. In some aspects, the client may determine a regularization term corresponding to the client autoencoder. The client may determine the loss based at least in part on the second regularization term.

The process 1000 may further include updating a set of shared conditioning network parameters (block 1025). In some aspects, the client may update the shared conditioning network parameters by determining a plurality of gradients of the loss with respect to the set of shared conditioning network parameters and update the set of shared conditioning network parameters based at least in part on the plurality of gradients.

In some aspects, the process 1000 may further include repeating operations 1010-1025 a specified number of times (block 1030). For example, the client may update the set of shared conditioning network parameters a specified number of times to determine a set of locally updated shared conditioning network parameters. The process 1000 may include providing the set of locally updated shared conditioning network parameters to the server (block 1035). For example, the client may transmit the set of locally updated shared conditioning network parameters to the server.

As indicated above, FIG. 10 is provided merely as an example. Other examples may differ from what is described with regard to FIG. 10.

Figure 11:
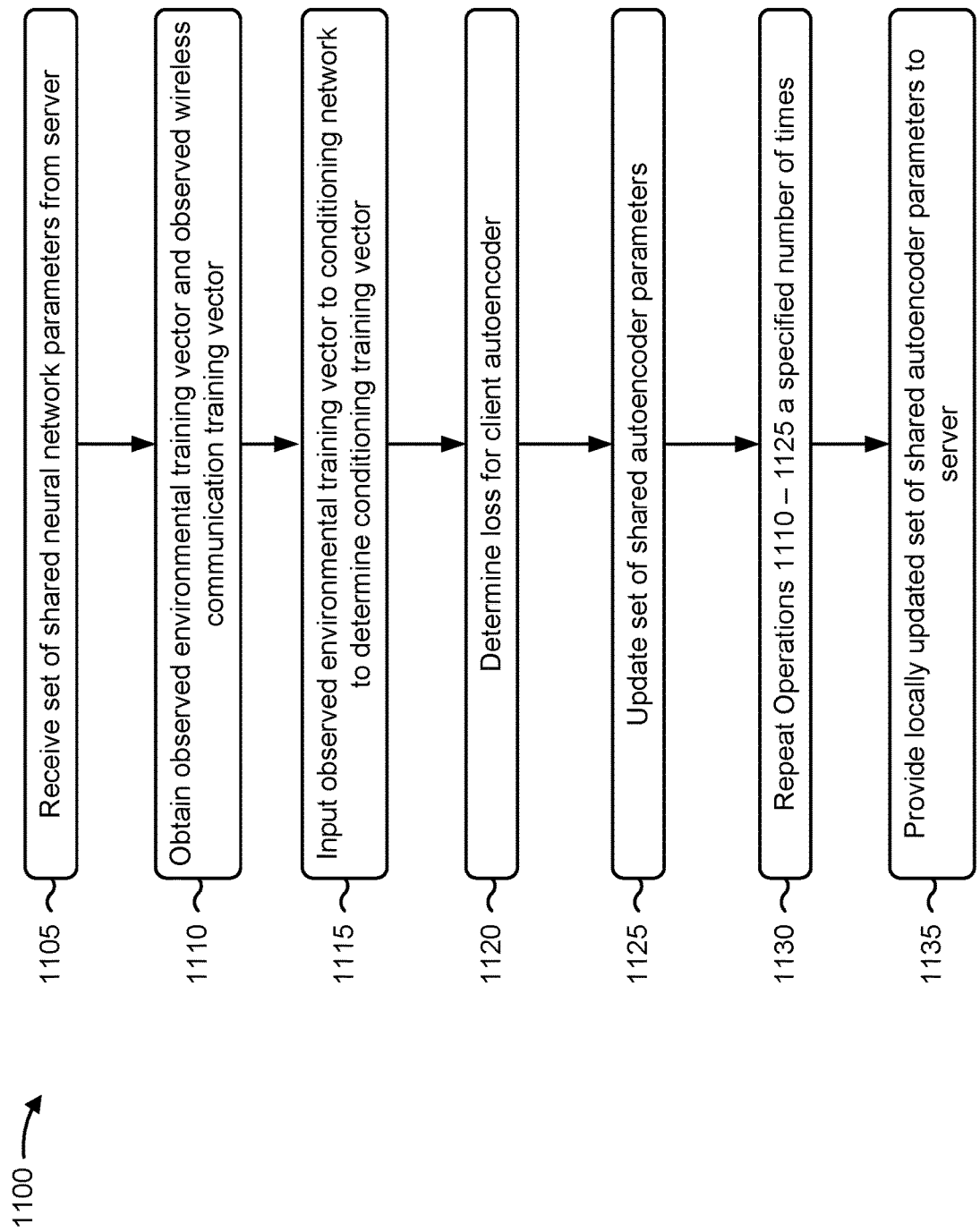

FIG. 11 is a diagram illustrating an example process 1100 of federated learning for autoencoders and associated conditioning networks, in accordance with the present disclosure. The process 1100 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 1100 may include receiving a set of shared neural network parameters from a server (block 1105). In some aspects, the set of shared neural network parameters may include a set of shared neural network parameters, (w, ϕ, θ), associated with the conditioning network and the autoencoder. The process may further include obtaining an observed environmental training vector, f, and an observed wireless communication training vector, x (block 1110). The process may include inputting the observed environmental training vector to the conditioning network to determine a conditioning training vector (block 1115). The conditioning training vector may include a set of client-specific encoder training parameters and a set of client-specific decoder training parameters.

As shown, the process 1100 may include determining a loss for the client autoencoder (block 1120). For example, in some aspects, the client may determine a first loss corresponding to the client autoencoder by inputting the observed wireless communication training vector x to an encoder of the client autoencoder to determine a latent training vector, h. The client may input the latent training vector h to a decoder of the client autoencoder to determine a training output of the client autoencoder. The training output may include a reconstruction of the observed wireless communication training vector x. The client may determine a loss associated with the client autoencoder based at least in part on the training output. In some aspects, the client may load at least one layer of an encoder of the client autoencoder with a set of client-specific encoder training parameters from the conditioning vector, loading at least one layer of a decoder of the client autoencoder with the set of client-specific decoder training parameters from the conditioning parameter, and/or the like. The loss may be associated with the set of shared neural network parameters. In some aspects, the client may determine a regularization term corresponding to the client autoencoder. The client may determine the loss based at least in part on the second regularization term.

The process 1100 may further include updating a set of shared autoencoder parameters (block 1125). In some aspects, the client may update the shared autoencoder parameters by determining a plurality of gradients of the loss with respect to the set of shared autoencoder parameters and update the set of shared autoencoder parameters based at least in part on the plurality of gradients.

In some aspects, the process 1100 may further include repeating operations 1110-1125 a specified number of times (block 1130). For example, the client may update the set of shared autoencoder parameters a specified number of times to determine a set of locally updated shared autoencoder parameters. The process 1000 may include providing the set of locally updated shared autoencoder parameters to the server (block 1135). For example, the client may transmit the set of locally updated shared autoencoder parameters to the server.

As indicated above, FIG. 11 is provided merely as an example. Other examples may differ from what is described with regard to FIG. 11.

Figure 12:
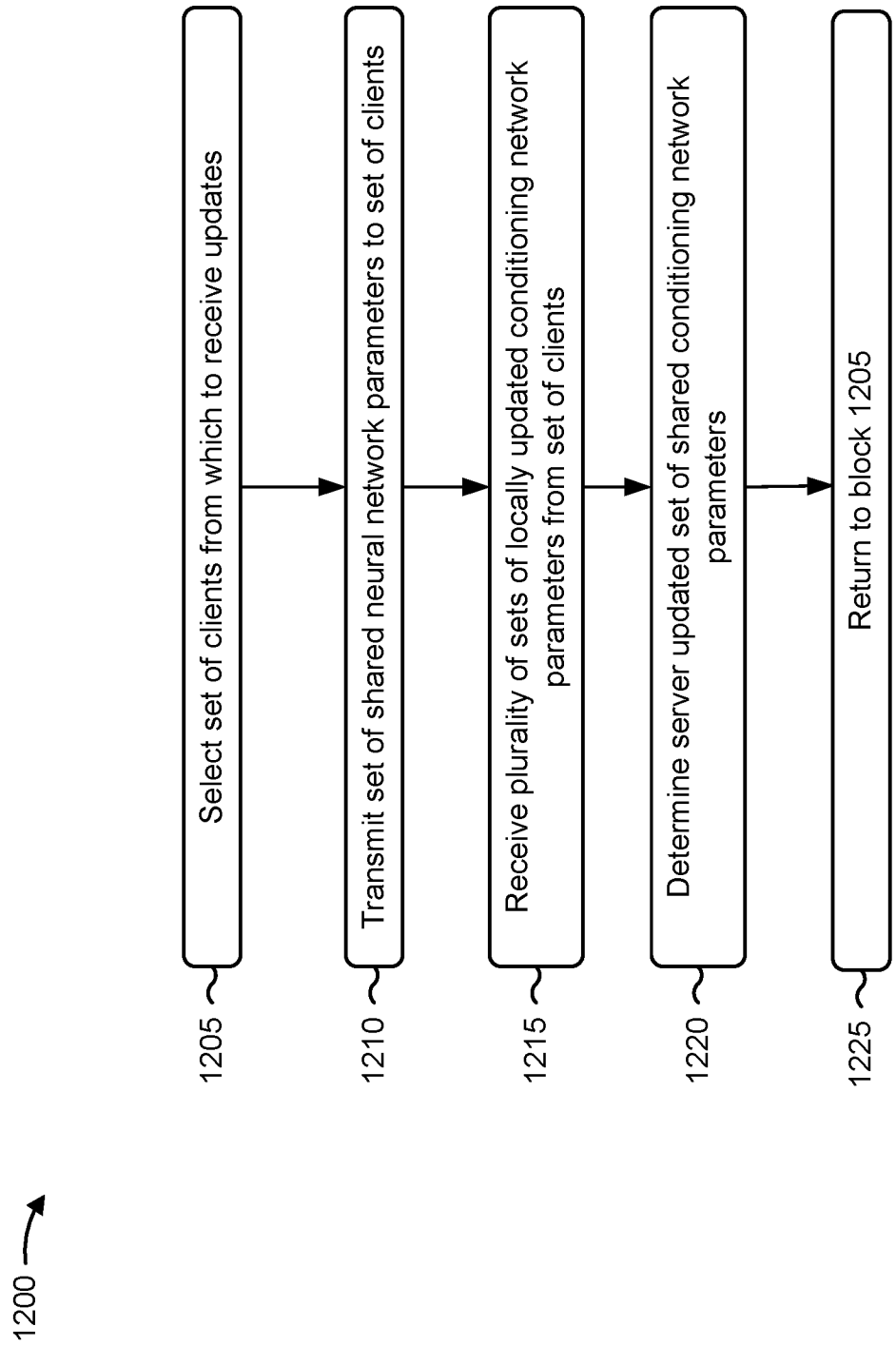

FIG. 12 is a diagram illustrating an example process 1200 of federated learning for autoencoders and associated conditioning networks, in accordance with the present disclosure. The example process 1200 is an aspect of a federated learning process that may be performed, for example, by a server (e.g., server 705 shown in FIG. 7, server 610 shown in FIG. 6, server 304 shown in FIG. 3, and/or the like).

The process 1200 may include selecting a set of clients from which to receive updates (block 1205). For example, the server may select a set of clients from which to receive updates associated with a conditioning network and an autoencoder. The process 1200 may include transmitting a set of shared neural network parameters to the set of clients (block 1210). For example, the server may transmit a set of shared neural network parameters, (w, φ, θ), to the set of clients.

The process 1200 may include receiving a plurality of sets of locally updated shared neural network parameters from the set of clients (block 1215). For example, the server may receive sets of locally updated shared neural network parameters, (w, φ, θ), associated with the conditioning network and the autoencoder. The process 1200 may further include determining a server updated set of shared updated conditioning network parameters (block 1220). For example, the server may determine, based at least in part on the plurality of sets of locally updated shared conditioning network parameters, a server updated set of shared updated conditioning network parameters. As shown, the process 1200 may include returning to block 1205 (block 1225) and repeating the process 1200 with an additional set or sets of clients.

As indicated above, FIG. 12 is provided merely as an example. Other examples may differ from what is described with regard to FIG. 12.

Figure 13:
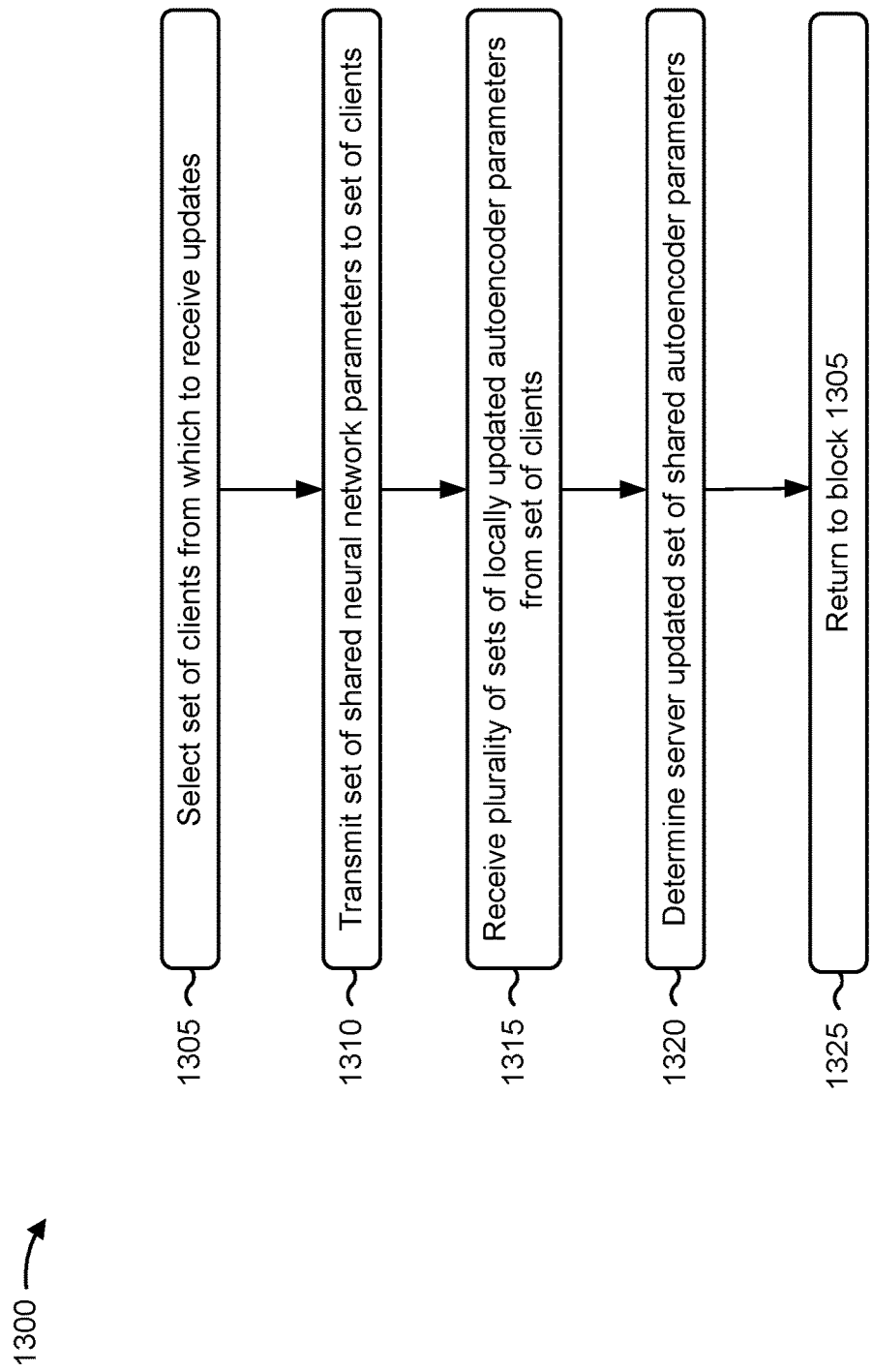

FIG. 13 is a diagram illustrating an example process 1300 of federated learning for autoencoders and associated conditioning networks, in accordance with the present disclosure. The example process 1300 is an aspect of a federated learning process that may be performed, for example, by a server (e.g., server 705 shown in FIG. 7, server 610 shown in FIG. 6, server 304 shown in FIG. 3, and/or the like).

The process 1300 may include selecting a set of clients from which to receive updates (block 1305). For example, the server may select a set of clients from which to receive updates associated with a conditioning network and an autoencoder. The process 1300 may include transmitting a set of shared neural network parameters to the set of clients (block 1310). For example, the server may transmit a set of shared neural network parameters, (w, φ, θ), to the set of clients.

The process 1300 may include receiving a plurality of sets of locally updated shared neural network parameters from the set of clients (block 1315). For example, the server may receive sets of locally updated shared neural network parameters, (w, φ, θ), associated with the conditioning network and the autoencoder. The process 1300 may further include determining a server updated set of shared updated autoencoder parameters (block 1320). For example, the server may determine, based at least in part on the plurality of sets of locally updated shared autoencoder network parameters, a server updated set of shared updated autoencoder parameters. As shown, the process 1300 may include returning to block 1305 (block 1325) and repeating the process 1300 with an additional set or sets of clients.

As indicated above, FIG. 13 is provided merely as an example. Other examples may differ from what is described with regard to FIG. 13.

Figure 14:
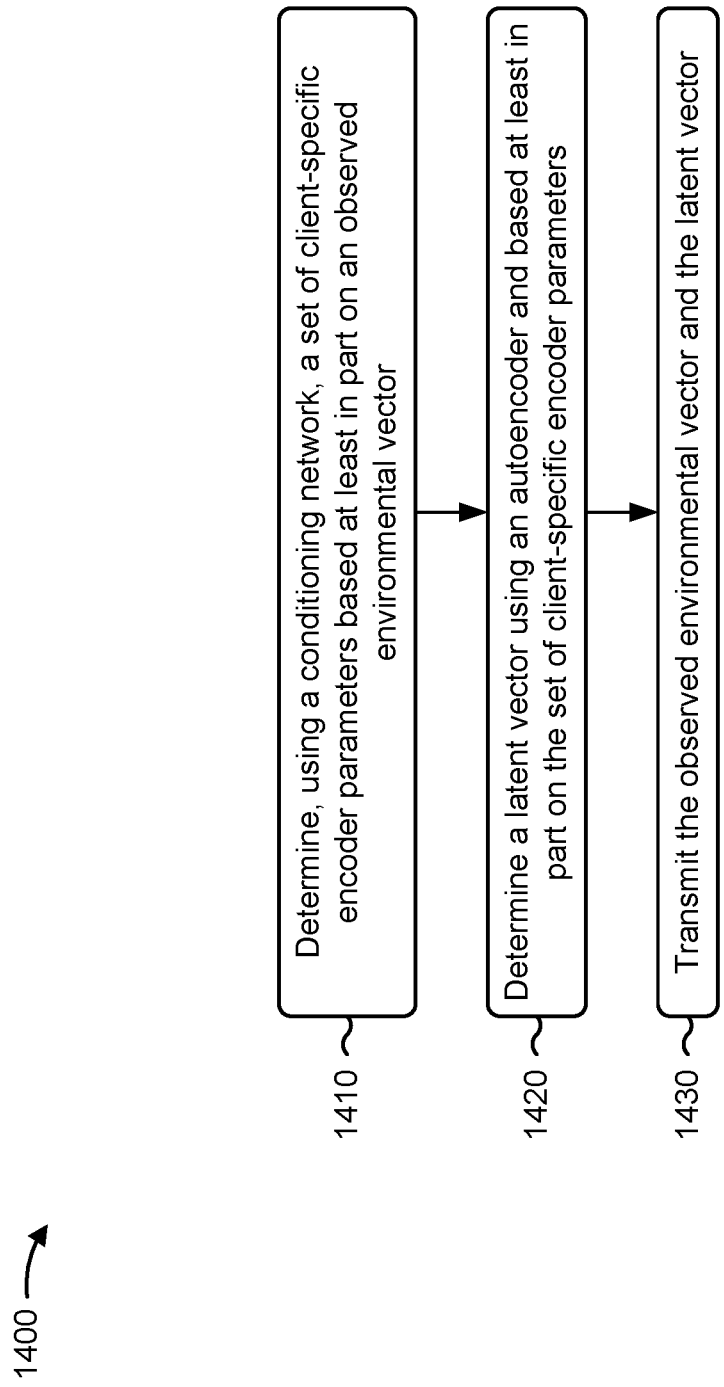
FIGS. 14 and 15 are diagrams illustrating example processes associated with federated learning for autoencoders and associated conditioning networks, in accordance with the present disclosure.

FIG. 14 is a diagram illustrating an example process 1400 performed, for example, by a client, in accordance with the present disclosure. Example process 1400 is an example where the client (e.g., client 710 shown in FIG. 7, client 715 shown in FIG. 7, client 605 shown in FIG. 6, client 302 shown in FIG. 3, and/or the like) performs operations associated with federated learning for client-specific neural network parameter generation for wireless communication.

As shown in FIG. 14, in some aspects, process 1400 may include determining, using a conditioning network, a set of client-specific encoder parameters based at least in part on an observed environmental vector (block 1410). For example, the client (e.g., using communication manager 1604, depicted in FIG. 16) may determine, using a conditioning network, a set of client-specific encoder parameters based at least in part on an observed environmental vector, as described above.

As further shown in FIG. 14, in some aspects, process 1400 may include determining a latent vector using an autoencoder and based at least in part on the set of client-specific encoder parameters (block 1420). For example, the client (e.g., using communication manager 1604, depicted in FIG. 16) may determine a latent vector using an autoencoder and based at least in part on the set of client-specific encoder parameters, as described above.

As further shown in FIG. 14, in some aspects, process 1400 may include transmitting the observed environmental vector and the latent vector (block 1430). For example, the client (e.g., using transmission component 1606, depicted in FIG. 16) may transmit the observed environmental vector and the latent vector, as described above.

Process 1400 may include additional aspects, such as any single aspect or any combination of aspects described below and/or in connection with one or more other processes described elsewhere herein.

In a first aspect, the conditioning network is configured to receive the observed environmental vector as input and to provide a conditioning vector as output, wherein the conditioning vector comprises the set of client-specific encoder parameters and a set of client-specific decoder parameters.

In a second aspect, alone or in combination with the first aspect, the conditioning network comprises a first sub-network configured to determine the set of client-specific encoder parameters and a second sub-network configured to determine the set of client-specific decoder parameters.

In a third aspect, alone or in combination with one or more of the first and second aspects, the autoencoder comprises an encoder configured to receive an observed wireless communication vector as input and to provide the latent vector as output, and a decoder configured to receive the latent vector as input and to provide the observed wireless communication vector as output.

In a fourth aspect, alone or in combination with one or more of the first through third aspects, the encoder comprises at least one encoder layer configured to use the set of client-specific encoder parameters, and determining the latent vector comprises mapping the observed wireless communication vector to the latent vector using the at least one encoder layer.

In a fifth aspect, alone or in combination with one or more of the first through fourth aspects, mapping the observed wireless communication vector to the latent vector comprises mapping the observed wireless communication vector to the latent vector using a set of encoder parameters, wherein the set of encoder parameters comprises the set of client-specific encoder parameters, and a set of shared encoder parameters.

In a sixth aspect, alone or in combination with one or more of the first through fifth aspects, the at least one encoder layer comprises a first set of layers that uses a first subset of the set of client-specific encoder parameters, a second set of layers that uses a first subset of the set of shared encoder parameters, and a third set of layers that uses a second subset of the set of client-specific encoder parameters and a second subset of the set of shared encoder parameters.

In a seventh aspect, alone or in combination with one or more of the first through sixth aspects, the decoder comprises at least one decoder layer configured to use a set of client-specific decoder parameters, wherein the decoder is configured to determine the observed wireless communication vector by mapping the latent vector to the observed wireless communication vector using the at least one decoder layer.

In an eighth aspect, alone or in combination with one or more of the first through seventh aspects, mapping the latent vector to the observed wireless communication vector comprises mapping the latent vector to the observed wireless communication vector using a set of decoder parameters, wherein the set of decoder parameters comprises the set of client-specific decoder parameters, and a set of shared decoder parameters.

In a ninth aspect, alone or in combination with one or more of the first through eighth aspects, the at least one decoder layer comprises a first set of layers that uses a first subset of the set of client-specific decoder parameters, a second set of layers that uses a first subset of the set of shared decoder parameters, and a third set of layers that uses a second subset of the set of client-specific decoder parameters and a second subset of the set of shared decoder parameters.

In a tenth aspect, alone or in combination with one or more of the first through ninth aspects, the observed environmental vector comprises one or more feature components, wherein the one or more feature components indicate a client vendor identifier, a client antenna configuration, a large scale channel characteristic, a CSI-RS configuration, an image obtained by an imaging device, a portion of an estimated propagation channel, or a combination thereof.

In an eleventh aspect, alone or in combination with one or more of the first through tenth aspects, the large scale channel characteristic indicates a delay spread associated with a channel, a power delay profile associated with a channel, a Doppler measurement associated with a channel, a Doppler spectrum associated with a channel, an SNR associated with a channel, an SINR associated with a channel, an RSRP, an RSSI, and/or the like.

In a twelfth aspect, alone or in combination with one or more of the first through eleventh aspects, the latent vector is associated with a wireless communication task.

In a thirteenth aspect, alone or in combination with one or more of the first through twelfth aspects, the wireless communication task comprises determining CSF, determining positioning information associated with the client, determining a modulation associated with a wireless communication, determining a waveform associated with a wireless communication, or a combination thereof.

In a fourteenth aspect, alone or in combination with one or more of the first through thirteenth aspects, the wireless communication task comprises determining the CSF, and process 1400 includes receiving a CSI-RS, determining CSI based at least in part on the CSI-RS, and providing the CSI as input to the autoencoder.

In a fifteenth aspect, alone or in combination with one or more of the first through fourteenth aspects, the latent vector comprises compressed channel state feedback.

In a sixteenth aspect, alone or in combination with one or more of the first through fifteenth aspects, transmitting the observed environmental vector and the latent vector comprises transmitting the observed environmental vector and the latent vector using a physical uplink control channel, a physical uplink shared channel, or a combination thereof.

In a seventeenth aspect, alone or in combination with one or more of the first through sixteenth aspects, the autoencoder comprises a variational autoencoder.

In an eighteenth aspect, alone or in combination with one or more of the first through seventeenth aspects, process 1400 includes training at least one of the conditioning network or the autoencoder.

In a nineteenth aspect, alone or in combination with one or more of the first through eighteenth aspects, training the at least one of the conditioning network or the autoencoder comprises using an unsupervised learning procedure.

In a twentieth aspect, alone or in combination with one or more of the first through nineteenth aspects, process 1400 includes collaboratively training the conditioning network and the autoencoder using a federated learning procedure.

In a twenty-first aspect, alone or in combination with one or more of the first through twentieth aspects, collaboratively training the conditioning network and the autoencoder comprises determining a set of shared neural network parameters that maximize a variational lower bound function corresponding to the conditioning network and the autoencoder.

In a twenty-second aspect, alone or in combination with one or more of the first through twenty-first aspects, a negative variational lower bound function corresponds to a loss function.

In a twenty-third aspect, alone or in combination with one or more of the first through twenty-second aspects, the loss function comprises a reconstruction loss for the autoencoder.

In a twenty-fourth aspect, alone or in combination with one or more of the first through twenty-third aspects, the loss function comprises a regularization term for the autoencoder.

In a twenty-fifth aspect, alone or in combination with one or more of the first through twenty-fourth aspects, the autoencoder is a regular autoencoder, and wherein the negative variational lower bound function does not include a regularization term.

In a twenty-sixth aspect, alone or in combination with one or more of the first through twenty-fifth aspects, performing the federated learning procedure comprises jointly training the conditioning network and the autoencoder.

In a twenty-seventh aspect, alone or in combination with one or more of the first through twenty-sixth aspects, performing the federated learning procedure comprises alternating between training the conditioning network and training the autoencoder.

In a twenty-eighth aspect, alone or in combination with one or more of the first through twenty-seventh aspects, alternating between training the conditioning network and training the autoencoder comprises performing a first plurality of training iterations associated with the conditioning network according to a first training frequency, and performing a second plurality of training iterations associated with the autoencoder according to a second training frequency that is different than the first training frequency.

In a twenty-ninth aspect, alone or in combination with one or more of the first through twenty-eighth aspects, performing the federated learning procedure comprises receiving, from a server, a set of shared neural network parameters corresponding to the conditioning network and the autoencoder, obtaining an observed environmental training vector, inputting the observed environmental training vector to the conditioning network to determine a conditioning training vector that includes a set of client-specific encoder training parameters and a set of client-specific decoder training parameters, loading at least one layer of an encoder of the autoencoder with the set of client-specific encoder training parameters, loading at least one layer of a decoder of the autoencoder with the set of client-specific decoder training parameters, obtaining an observed wireless communication training vector, inputting the observed wireless communication training vector to the encoder to determine a training latent vector, inputting the training latent vector to the decoder to determine a training output of the autoencoder, wherein the training output comprises a reconstruction of the observed wireless communication training vector, and determining a loss associated with the autoencoder based at least in part on the training output.

In a thirtieth aspect, alone or in combination with one or more of the first through twenty-ninth aspects, process 1400 includes determining a regularization term corresponding to the autoencoder, wherein determining the loss comprises determining the loss based at least in part on the regularization term.

In a thirty-first aspect, alone or in combination with one or more of the first through thirtieth aspects, process 1400 includes determining a plurality of gradients of the loss with respect to the set of shared neural network parameters, and updating the set of shared neural network parameters based at least in part on the plurality of gradients.

In a thirty-second aspect, alone or in combination with one or more of the first through thirty-first aspects, process 1400 includes updating the set of shared neural network parameters a specified number of times to determine a locally updated set of shared neural network parameters.

In a thirty-third aspect, alone or in combination with one or more of the first through thirty-second aspects, process 1400 includes transmitting the locally updated set of shared neural network parameters to the server.

In a thirty-fourth aspect, alone or in combination with one or more of the first through thirty-third aspects, process 1400 includes determining a plurality of gradients of the loss with respect to a subset of the set of shared neural network parameters, wherein the subset comprises a set of shared conditioning network parameters, and updating the set of shared conditioning network parameters based at least in part on the plurality of gradients.

In a thirty-fifth aspect, alone or in combination with one or more of the first through thirty-fourth aspects, process 1400 includes updating the set of shared conditioning network parameters a specified number of times to determine a locally updated set of shared conditioning network parameters.

In a thirty-sixth aspect, alone or in combination with one or more of the first through thirty-fifth aspects, process 1400 includes transmitting the locally updated set of shared conditioning network parameters to the server.

In a thirty-seventh aspect, alone or in combination with one or more of the first through thirty-sixth aspects, process 1400 includes determining a plurality of gradients of the loss with respect to a subset of the set of shared neural network parameters, wherein the subset comprises a set of shared autoencoder parameters, and updating the set of shared autoencoder parameters based at least in part on the plurality of gradients.

In a thirty-eighth aspect, alone or in combination with one or more of the first through thirty-seventh aspects, process 1400 includes updating the set of shared autoencoder parameters a specified number of times to determine a locally updated set of shared autoencoder parameters.

In a thirty-ninth aspect, alone or in combination with one or more of the first through thirty-eighth aspects, process 1400 includes transmitting the locally updated set of shared autoencoder parameters to the server.

In a fortieth aspect, alone or in combination with one or more of the first through thirty-ninth aspects, the conditioning network corresponds to a server conditioning network that is implemented at a server.

In a forty-first aspect, alone or in combination with one or more of the first through fortieth aspects, the conditioning network is a client implemented copy of the server conditioning network.

In a forty-second aspect, alone or in combination with one or more of the first through forty-first aspects, the autoencoder corresponds to a server autoencoder that is implemented at a server.

In a forty-third aspect, alone or in combination with one or more of the first through forty-second aspects, the autoencoder is a client implemented copy of the server autoencoder.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
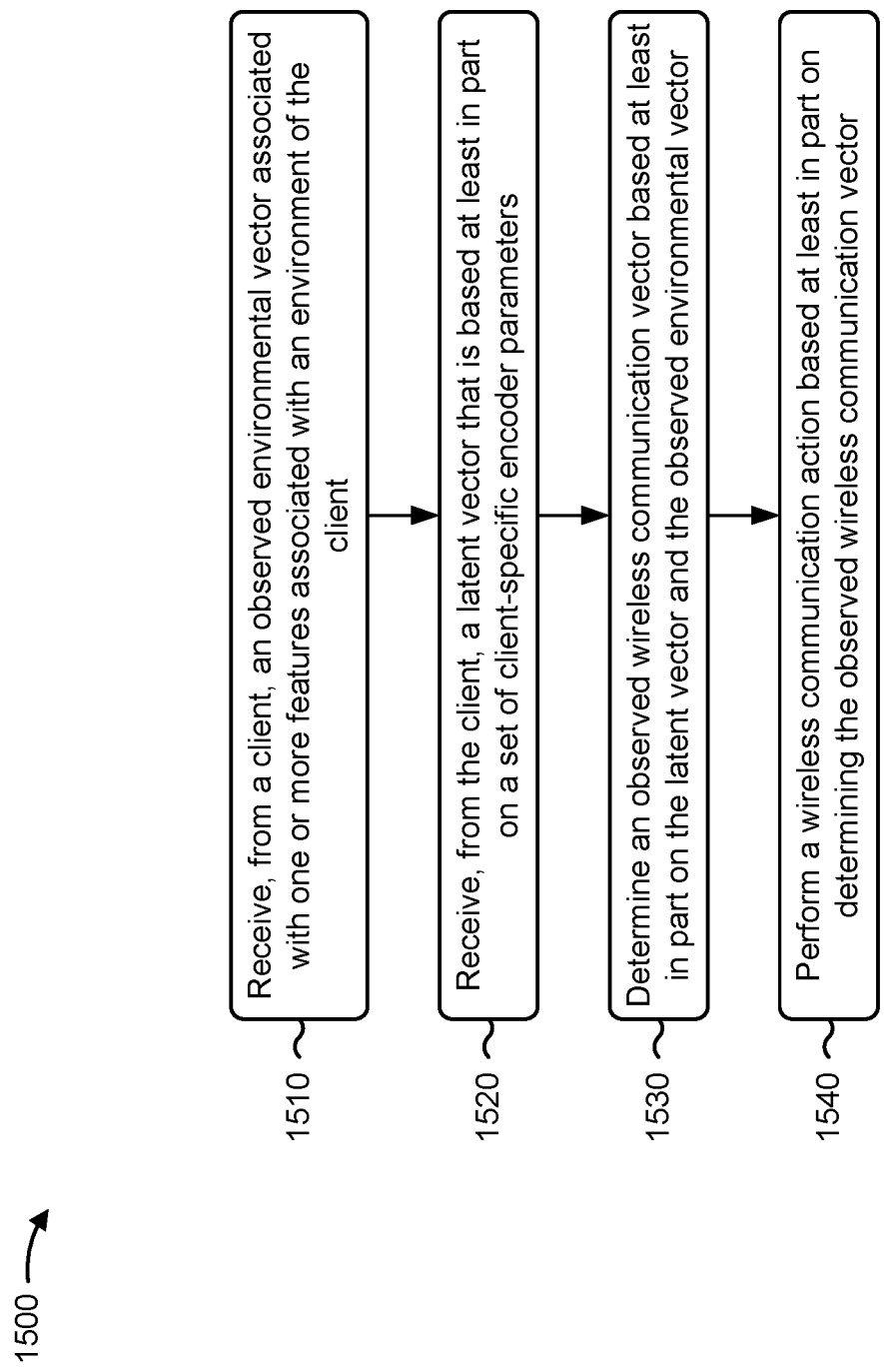

FIG. 15 is a diagram illustrating an example process 1500 performed, for example, by a server, in accordance with the present disclosure. Example process 1500 is an example where the server (e.g., server 705 shown in FIG. 7, server 610 shown in FIG. 6, server 304 shown in FIG. 3, and/or the like) performs operations associated with federated learning for client-specific neural network parameter generation for wireless communication.

As shown in FIG. 15, in some aspects, process 1500 may include receiving, from a client, an observed environmental vector associated with one or more features associated with an environment of the client (block 1510). For example, the server (e.g., using reception component 1802, depicted in FIG. 18) may receive, from a client, an observed environmental vector associated with one or more features associated with an environment of the client, as described above.

As further shown in FIG. 15, in some aspects, process 1500 may include receiving, from the client, a latent vector that is based at least in part on a set of client-specific encoder parameters (block 1520). For example, the server (e.g., using reception component 1802, depicted in FIG. 18) may receive, from the client, a latent vector that is based at least in part on a set of client-specific encoder parameters, as described above.

As further shown in FIG. 15, in some aspects, process 1500 may include determining an observed wireless communication vector based at least in part on the latent vector and the observed environmental vector (block 1530). For example, the server (e.g., using communication manager 1804, depicted in FIG. 18) may determine an observed wireless communication vector based at least in part on the latent vector and the observed environmental vector, as described above.

As further shown in FIG. 15, in some aspects, process 1500 may include performing a wireless communication action based at least in part on determining the observed wireless communication vector (block 1540). For example, the server (e.g., using communication manager 1804, depicted in FIG. 18) may perform a wireless communication action based at least in part on determining the observed wireless communication vector, as described above.

Process 1500 may include additional aspects, such as any single aspect or any combination of aspects described below and/or in connection with one or more other processes described elsewhere herein.

In a first aspect, the observed environmental vector comprises one or more feature components, wherein the one or more feature components indicate a client vendor identifier, a client antenna configuration, a large scale channel characteristic, a CSI-RS configuration, an image obtained by an imaging device, a portion of an estimated propagation channel, or a combination thereof.

In a second aspect, alone or in combination with the first aspect, the large scale channel characteristic indicates a delay spread associated with a channel, a power delay profile associated with a channel, a Doppler measurement associated with a channel, a Doppler spectrum associated with a channel, an SNR associated with a channel, an SINR associated with a channel, an RSRP, an RSSI, and/or the like.

In a third aspect, alone or in combination with one or more of the first and second aspects, the latent vector is associated with a wireless communication task.

In a fourth aspect, alone or in combination with one or more of the first through third aspects, the wireless communication task comprises receiving CSF, receiving positioning information associated with the client, receiving a modulation associated with a wireless communication, receiving a waveform associated with a wireless communication, or a combination thereof.

In a fifth aspect, alone or in combination with one or more of the first through fourth aspects, the wireless communication task comprises receiving the CSF, and process 1500 includes transmitting a CSI-RS, wherein the CSF corresponds to the CSI-RS.

In a sixth aspect, alone or in combination with one or more of the first through fifth aspects, the latent vector comprises compressed CSF.

In a seventh aspect, alone or in combination with one or more of the first through sixth aspects, the observed environmental vector and the latent vector are carried in a PUCCH, a PUSCH, or a combination thereof.

In an eighth aspect, alone or in combination with one or more of the first through seventh aspects, determining the observed wireless communication vector comprises inputting the observed environmental vector to a server conditioning network to determine a conditioning vector that includes a set of client-specific decoder parameters, loading at least one layer of a decoder of a server autoencoder with the set of client-specific decoder parameters, and inputting the latent vector to the decoder to determine the observed wireless communication vector.

In a ninth aspect, alone or in combination with one or more of the first through eighth aspects, the server autoencoder comprises a regular autoencoder or a variational autoencoder.

In a tenth aspect, alone or in combination with one or more of the first through ninth aspects, the server conditioning network is configured to receive the observed environmental vector as input and to provide a conditioning vector as output, wherein the conditioning vector comprises the set of client-specific decoder parameters and a set of client-specific encoder parameters.

In an eleventh aspect, alone or in combination with one or more of the first through tenth aspects, the server conditioning network comprises a first sub-network configured to determine the set of client-specific encoder parameters, and a second sub-network configured to determine the set of client-specific decoder parameters.

In a twelfth aspect, alone or in combination with one or more of the first through eleventh aspects, the server autoencoder comprises an encoder configured to receive the observed wireless communication vector as input and to provide the latent vector as output, and a decoder configured to receive the latent vector as input and to provide the observed wireless communication vector as output.

In a thirteenth aspect, alone or in combination with one or more of the first through twelfth aspects, the encoder comprises at least one encoder layer configured to use the set of client-specific encoder parameters.

In a fourteenth aspect, alone or in combination with one or more of the first through thirteenth aspects, the decoder comprises the at least one decoder layer configured to use the set of client-specific decoder parameters, wherein the decoder is configured to determine the observed wireless communication vector by mapping the latent vector to the observed wireless communication vector using the at least one decoder layer.

In a fifteenth aspect, alone or in combination with one or more of the first through fourteenth aspects, mapping the latent vector to the observed wireless communication vector comprises mapping the latent vector to the observed wireless communication vector using a set of decoder parameters, wherein the set of decoder parameters comprises the set of client-specific decoder parameters, and a set of shared decoder parameters.

In a sixteenth aspect, alone or in combination with one or more of the first through fifteenth aspects, the at least one decoder layer comprises a first set of layers that uses a first subset of the set of client-specific decoder parameters, a second set of layers that uses a first subset of the set of shared decoder parameters, and a third set of layers that uses a second subset of the set of client-specific decoder parameters and a second subset of the set of shared decoder parameters.

In a seventeenth aspect, alone or in combination with one or more of the first through sixteenth aspects, the server conditioning network corresponds to a conditioning network that is implemented at the client.

In an eighteenth aspect, alone or in combination with one or more of the first through seventeenth aspects, the server conditioning network is a server implemented copy of the conditioning network.

In a nineteenth aspect, alone or in combination with one or more of the first through eighteenth aspects, the server autoencoder corresponds to an autoencoder that is implemented at the client.

In a twentieth aspect, alone or in combination with one or more of the first through nineteenth aspects, the server autoencoder is a server implemented copy of the autoencoder.

In a twenty-first aspect, alone or in combination with one or more of the first through twentieth aspects, the server autoencoder comprises a variational autoencoder.

In a twenty-second aspect, alone or in combination with one or more of the first through twenty-first aspects, process 1500 includes updating at least one of the server conditioning network or the server autoencoder.

In a twenty-third aspect, alone or in combination with one or more of the first through twenty-second aspects, process 1500 includes collaboratively updating the server conditioning network and the server autoencoder using a federated learning procedure.

In a twenty-fourth aspect, alone or in combination with one or more of the first through twenty-third aspects, using the federated learning procedure comprises jointly updating the server conditioning network and the server autoencoder.

In a twenty-fifth aspect, alone or in combination with one or more of the first through twenty-fourth aspects, using the federated learning procedure comprises alternating between updating the server conditioning network and updating the server autoencoder.

In a twenty-sixth aspect, alone or in combination with one or more of the first through twenty-fifth aspects, alternating between updating the server conditioning network and updating the server autoencoder comprises performing a first plurality of updating iterations associated with the server conditioning network according to a first updating frequency, and performing a second plurality of updating iterations associated with the server autoencoder according to a second updating frequency that is different than the first updating frequency.

In a twenty-seventh aspect, alone or in combination with one or more of the first through twenty-sixth aspects, collaboratively updating the server conditioning network and the server autoencoder comprises selecting a set of clients from which to receive updates associated with the server conditioning network and the server autoencoder, wherein the set of clients includes the client and at least one additional client, transmitting, to the set of clients, a set of shared neural network parameters corresponding to the server conditioning network and the server autoencoder, receiving, from the set of clients, a plurality of sets of locally updated shared neural network parameters, and determining, based at least in part on the plurality of sets of locally updated shared neural network parameters, a set of server updated shared neural network parameters.

In a twenty-eighth aspect, alone or in combination with one or more of the first through twenty-seventh aspects, process 1500 includes transmitting, to the set of clients, the set of server updated shared neural network parameters.

In a twenty-ninth aspect, alone or in combination with one or more of the first through twenty-eighth aspects, determining the set of server updated shared neural network parameters comprises averaging the plurality of sets of locally updated shared neural network parameters.

In a thirtieth aspect, alone or in combination with one or more of the first through twenty-ninth aspects, collaboratively updating the server conditioning network and the server autoencoder comprises selecting a set of clients from which to receive updates associated with the server conditioning network, wherein the set of clients includes the client and at least one additional client, transmitting, to the set of clients, a set of shared neural network parameters corresponding to the server conditioning network and the server autoencoder, receiving, from the set of clients, a plurality of sets of locally updated shared conditioning network parameters, and determining, based at least in part on the plurality of sets of locally updated shared conditioning network parameters, a set of server updated shared conditioning network parameters.

In a thirty-first aspect, alone or in combination with one or more of the first through thirtieth aspects, process 1500 includes transmitting, to the set of clients, the set of server updated shared conditioning network parameters.

In a thirty-second aspect, alone or in combination with one or more of the first through thirty-first aspects, determining the set of server updated shared conditioning network parameters comprises averaging the plurality of sets of locally updated shared conditioning network parameters.

In a thirty-third aspect, alone or in combination with one or more of the first through thirty-second aspects, collaboratively updating the server conditioning network and the server autoencoder comprises selecting a set of clients from which to receive updates associated with the server autoencoder, wherein the set of clients includes the client and at least one additional client, transmitting, to the set of clients, a set of shared neural network parameters corresponding to the server conditioning network and the server autoencoder, receiving, from the set of clients, a plurality of sets of locally updated shared autoencoder parameters, and determining, based at least in part on the plurality of sets of locally updated shared autoencoder parameters, a set of server updated shared autoencoder parameters.

In a thirty-fourth aspect, alone or in combination with one or more of the first through thirty-third aspects, process 1500 includes transmitting, to the set of clients, the set of server updated shared autoencoder parameters.

In a thirty-fifth aspect, alone or in combination with one or more of the first through thirty-fourth aspects, determining the set of server updated shared autoencoder parameters comprises averaging the plurality of sets of locally updated shared autoencoder parameters.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
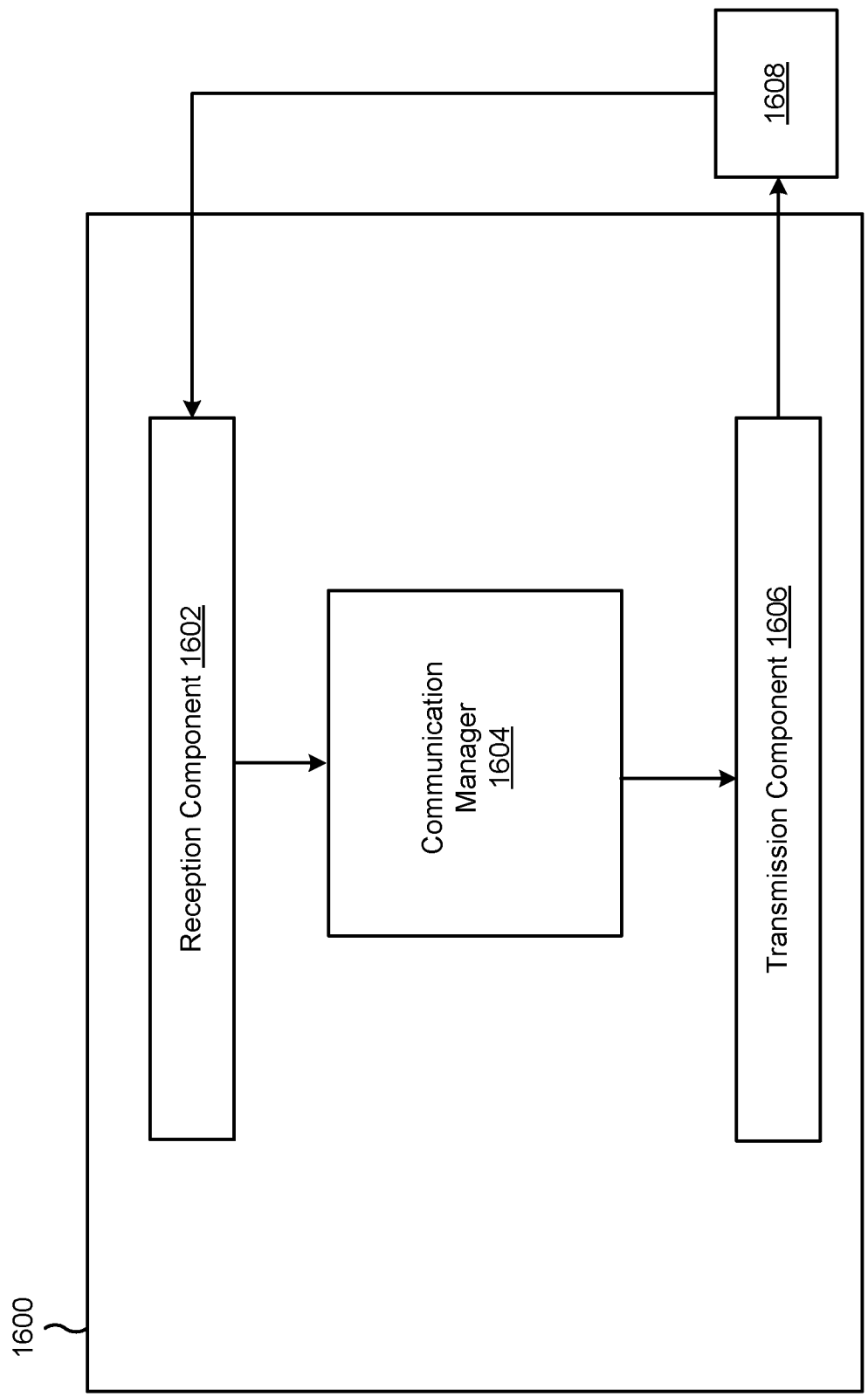
FIGS. 16 and 17 are examples of apparatuses for wireless communication, in accordance with the present disclosure.

FIG. 16 is a block diagram of an example apparatus 1600 for wireless communication in accordance with the present disclosure. The apparatus 1600 may be, be similar to, include, or be included in a client (e.g., client 710 shown in FIG. 7, client 715 shown in FIG. 7, client 605 shown in FIG. 6, client 302 shown in FIG. 3, and/or the like). In some aspects, the apparatus 1600 includes a reception component 1602, a communication manager 1604, and a transmission component 1606, which may be in communication with one another (for example, via one or more buses). As shown, the apparatus 1600 may communicate with another apparatus 1608 (such as a client, a server, a UE, a base station, or another wireless communication device) using the reception component 1602 and the transmission component 1606.

In some aspects, the apparatus 1600 may be configured to perform one or more operations described herein in connection with FIGS. 3-7. Additionally or alternatively, the apparatus 1600 may be configured to perform one or more processes described herein, such as process 800 of FIG. 8, process 1000 of FIG. 10, process 1100 of FIG. 11, process 1400 of FIG. 14, or a combination thereof. In some aspects, the apparatus 1600 may include one or more components of the first UE described above in connection with FIG. 2.

The reception component 1602 may provide means for receiving communications, such as reference signals, control information, data communications, or a combination thereof, from the apparatus 1608. The reception component 1602 may provide received communications to one or more other components of the apparatus 1600, such as the communication manager 1604. In some aspects, the reception component 1602 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a demodulator, a MIMO detector, a receive processor, a controller/processor, a memory, or a combination thereof, of the first UE described above in connection with FIG. 2.

The transmission component 1606 may provide means for transmitting communications, such as reference signals, control information, data communications, or a combination thereof, to the apparatus 1608. In some aspects, the communication manager 1604 may generate communications and may transmit the generated communications to the transmission component 1606 for transmission to the apparatus 1608. In some aspects, the transmission component 1606 may provide means for performing signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1606 may include one or more antennas, a modulator, a transmit MIMO processor, a transmit processor, a controller/processor, a memory, or a combination thereof, of the first UE described above in connection with FIG. 2. In some aspects, the transmission component 1606 may be co-located with the reception component 1602 in a transceiver.

In some aspects, the communication manager 1604 may provide means for determining, using a conditioning network, a set of client-specific encoder parameters based at least in part on an observed environmental vector; means for determining a latent vector using an autoencoder and based at least in part on the set of client-specific encoder parameters; and means for transmitting the observed environmental vector and the latent vector. In some aspects, the communication manager 1604 may include a controller/processor, a memory, or a combination thereof, of the first UE described above in connection with FIG. 2. In some aspects, the communication manager 1604 may include the reception component 1602, the transmission component 1606, and/or the like. In some aspects, the means provided by the communication manager 1604 may include, or be included within means provided by the reception component 1602, the transmission component 1606, and/or the like.

In some aspects, the communication manager 1604 and/or one or more components of the communication manager 1604 may include or may be implemented within hardware (e.g., one or more of the circuitry described in connection with FIG. 20). In some aspects, the communication manager 1604 and/or one or more components thereof may include or may be implemented within a controller/processor, a memory, or a combination thereof, of the UE 120 described above in connection with FIG. 2.

In some aspects, the communication manager 1604 and/or one or more components of the set of components may be implemented in code (e.g., as software or firmware stored in a memory), such as the code described in connection with FIG. 20. For example, the communication manager 1604 and/or a component (or a portion of a component) may be implemented as instructions or code stored in a non-transitory computer-readable medium and executable by a controller or a processor to perform the functions or operations of the communication manager 1604 and/or the component. If implemented in code, the functions of the communication manager 1604 and/or a component may be executed by a controller/processor, a memory, a scheduler, a communication unit, or a combination thereof, of the UE 120 described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
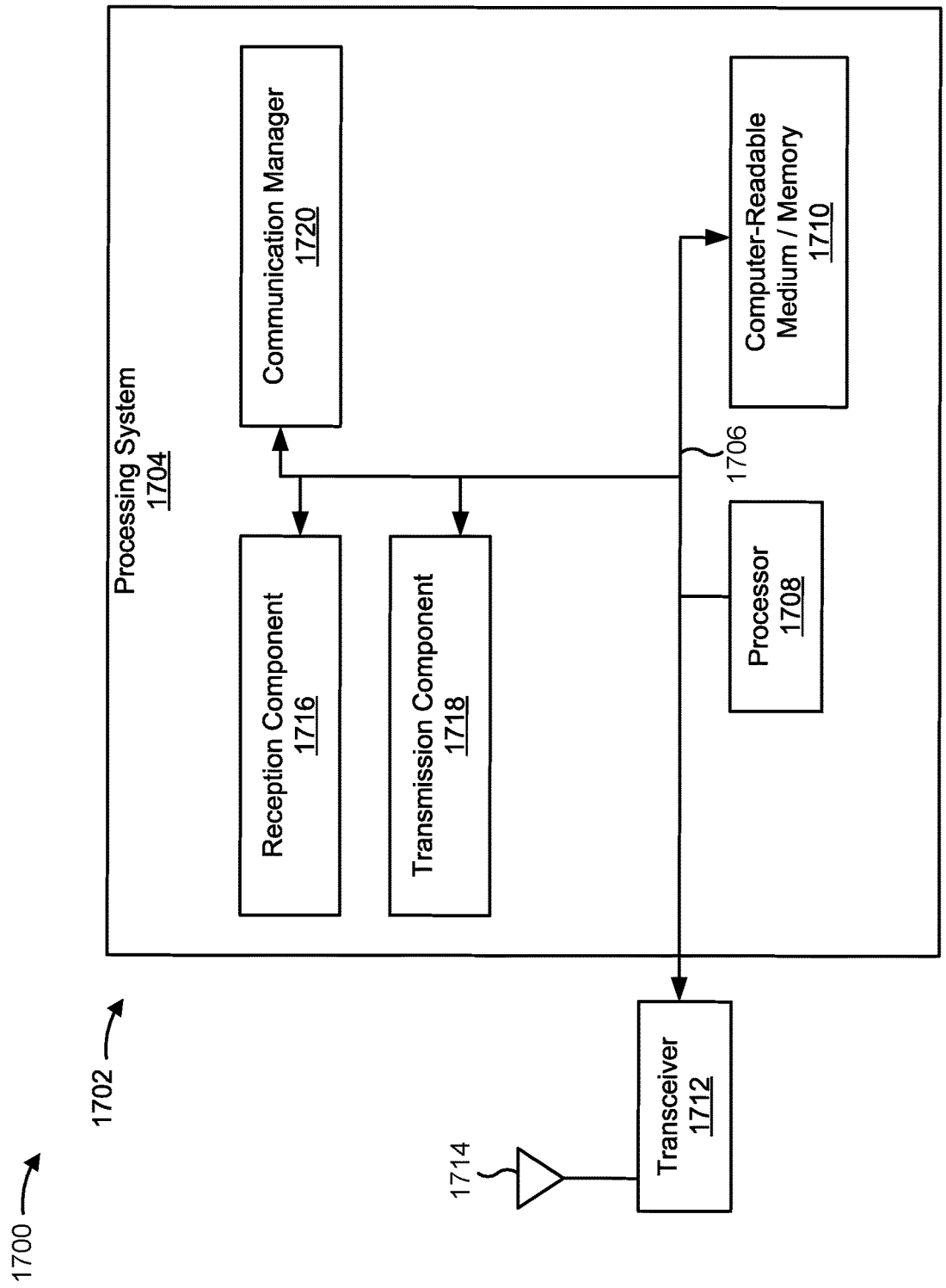

FIG. 17 is a diagram illustrating an example 1700 of a hardware implementation for an apparatus 1702 employing a processing system 1704. The apparatus 1702 may be, be similar to, include, or be included in the apparatus 1600 shown in FIG. 16. In some aspects, the apparatus 1702 may be, be similar to, include, or be included in a client (e.g., client 710 shown in FIG. 7, client 715 shown in FIG. 7, client 605 shown in FIG. 6, client 302 shown in FIG. 3, and/or the like).

The processing system 1704 may be implemented with a bus architecture, represented generally by the bus 1706. The bus 1706 may include any number of interconnecting buses and bridges depending on the specific application of the processing system 1704 and the overall design constraints. The bus 1706 links together various circuits including one or more processors and/or hardware components, represented by a processor 1708, the illustrated components, and the computer-readable medium/memory 1710. The bus 1706 may also link various other circuits, such as timing sources, peripherals, voltage regulators, power management circuits, and/or the like.

The processing system 1704 may be coupled to a transceiver 1712. The transceiver 1712 is coupled to one or more antennas 1714. The transceiver 1712 provides a means for communicating with various other apparatuses over a transmission medium. The transceiver 1712 receives a signal from the one or more antennas 1714, extracts information from the received signal, and provides the extracted information to the processing system 1704, specifically a reception component 1716. In addition, the transceiver 1712 receives information from the processing system 1704, specifically a transmission component 1718, and generates a signal to be applied to the one or more antennas 1714 based at least in part on the received information.

The processor 1708 is coupled to the computer-readable medium/memory 1710. The processor 1708 is responsible for general processing, including the execution of software stored on the computer-readable medium/memory 1710. The software, when executed by the processor 1708, causes the processing system 1704 to perform the various functions described herein in connection with a client. The computer-readable medium/memory 1710 may also be used for storing data that is manipulated by the processor 1708 when executing software. The processing system 1704 may include a communication manager 1720 that may be, or be similar to, the communication manager 1604 shown in FIG. 16 and/or the first communication manager 140 shown in FIGS. 1 and 2. The processing system 1704 may include any number of additional components not illustrated in FIG. 17. The components illustrated and/or not illustrated may be software modules running in the processor 1708, resident/stored in the computer readable medium/memory 1710, one or more hardware modules coupled to the processor 1708, or some combination thereof.

In some aspects, the processing system 1704 may be a component of the UE 120 and may include the memory 282 and/or at least one of the TX MIMO processor 266, the RX processor 258, and/or the controller/processor 280. In some aspects, the apparatus 1702 for wireless communication provides means for determining, using a conditioning network, a set of client-specific encoder parameters based at least in part on an observed environmental vector, means for determining a latent vector using an autoencoder and based at least in part on the set of client-specific encoder parameters, means for transmitting the observed environmental vector and the latent vector, and/or the like. The aforementioned means may be one or more of the aforementioned components of the processing system 1704 of the apparatus 1702 configured to perform the functions recited by the aforementioned means. As described elsewhere herein, the processing system 1704 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 17 is provided as an example. Other examples may differ from what is described in connection with FIG. 17.

Figure 18:
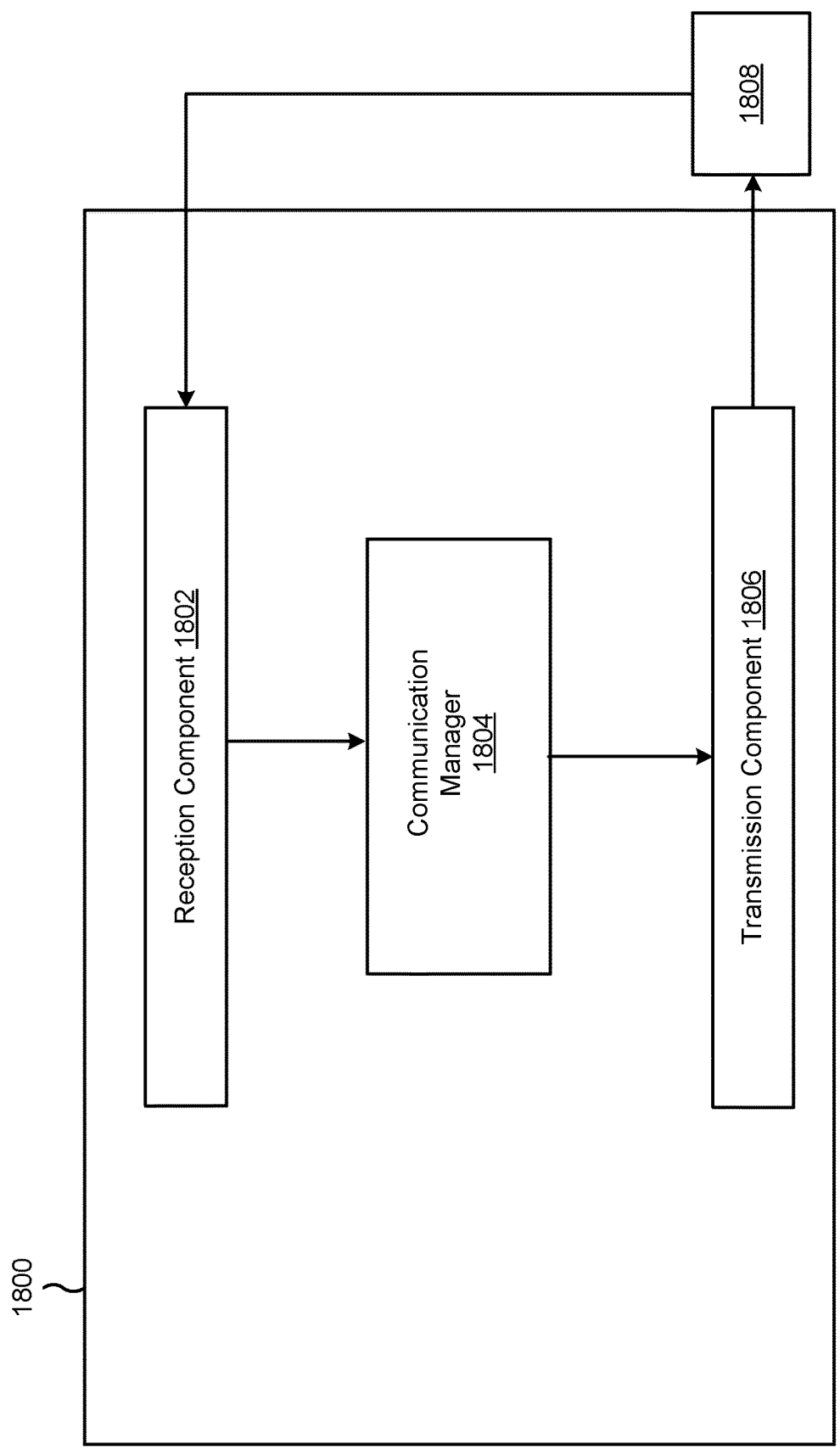
FIGS. 18 and 19 are diagrams illustrating examples of a hardware implementation for an apparatus employing a processing system, in accordance with the present disclosure.

FIG. 18 is a block diagram of an example apparatus 1800 for wireless communication in accordance with the present disclosure. The apparatus 1800 may be, be similar to, include, or be included in a server (e.g., server 705 shown in FIG. 7, server 610 shown in FIG. 6, server 304 shown in FIG. 3, and/or the like). In some aspects, the apparatus 1800 includes a reception component 1802, a communication manager 1804, and a transmission component 1806, which may be in communication with one another (for example, via one or more buses). As shown, the apparatus 1800 may communicate with another apparatus 1808 (such as a client, a server, a UE, a base station, or another wireless communication device) using the reception component 1802 and the transmission component 1806.

In some aspects, the apparatus 1800 may be configured to perform one or more operations described herein in connection with FIGS. 3-7. Additionally or alternatively, the apparatus 1800 may be configured to perform one or more processes described herein, such as process 900 of FIG. 9, process 1200 of FIG. 12, process 1300 of FIG. 13, process 1500 of FIG. 15, and/or the like. In some aspects, the apparatus 1800 may include one or more components of the base station described above in connection with FIG. 2.

The reception component 1802 may provide means for receiving communications, such as reference signals, control information, data communications, or a combination thereof, from the apparatus 1808. The reception component 1802 may provide received communications to one or more other components of the apparatus 1800, such as the communication manager 1804. In some aspects, the reception component 1802 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1802 may include one or more antennas, a demodulator, a MIMO detector, a receive processor, a controller/processor, a memory, or a combination thereof, of the base station described above in connection with FIG. 2.

The transmission component 1806 may provide means for transmitting communications, such as reference signals, control information, data communications, or a combination thereof, to the apparatus 1808. In some aspects, the communication manager 1804 may generate communications and may transmit the generated communications to the transmission component 1806 for transmission to the apparatus 1808. In some aspects, the transmission component 1806 may provide means for performing signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1806 may include one or more antennas, a modulator, a transmit MIMO processor, a transmit processor, a controller/processor, a memory, or a combination thereof, of the base station described above in connection with FIG. 2. In some aspects, the transmission component 1806 may be co-located with the reception component 1802 in a transceiver.

The communication manager 1804 may provide means for receiving, from a client, an observed environmental vector associated with one or more features associated with an environment of the client; means for receiving, from the client, a latent vector that is based at least in part on a set of client-specific encoder parameters; means for determining an observed wireless communication vector based at least in part on the latent vector and the observed environmental vector; means for performing a wireless communication action based at least in part on determining the observed wireless communication vector; and/or the like. In some aspects, the communication manager 1804 may include a controller/processor, a memory, a scheduler, a communication unit, or a combination thereof, of the base station described above in connection with FIG. 2. In some aspects, the communication manager 1804 may include the reception component 1802, the transmission component 1806, and/or the like. In some aspects, the means provided by the communication manager 1804 may include, or be included within means provided by the reception component 1802, the transmission component 1806, and/or the like.

In some aspects, the communication manager 1804 and/or one or more components thereof may include or may be implemented within hardware (e.g., one or more of the circuitry described in connection with FIG. 21). In some aspects, the communication manager 1804 and/or one or more components thereof may include or may be implemented within a controller/processor, a memory, or a combination thereof, of the BS 110 described above in connection with FIG. 2.

In some aspects, the communication manager 1804 and/or one or more components thereof may be implemented in code (e.g., as software or firmware stored in a memory), such as the code described in connection with FIG. 21. For example, the communication manager 1804 and/or a component (or a portion of a component) may be implemented as instructions or code stored in a non-transitory computer-readable medium and executable by a controller or a processor to perform the functions or operations of the communication manager 1804 and/or the component. If implemented in code, the functions of the communication manager 1804 and/or a component may be executed by a controller/processor, a memory, a scheduler, a communication unit, or a combination thereof, of the BS 110 described above in connection with FIG. 2.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

Figure 19:
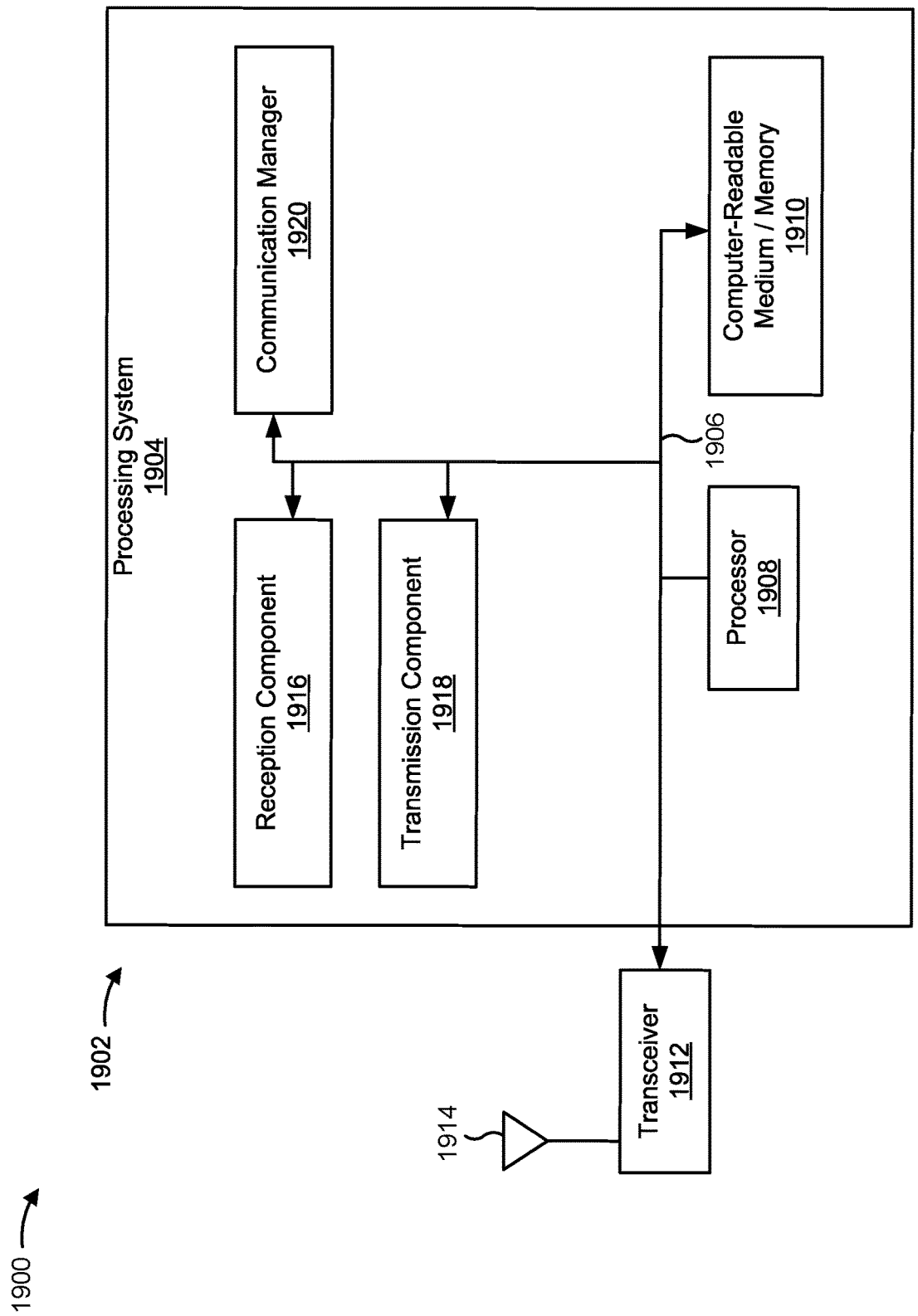

FIG. 19 is a diagram illustrating an example 1900 of a hardware implementation for an apparatus 1902 employing a processing system 1904. The apparatus 1902 may be, be similar to, include, or be included in the apparatus 1800 shown in FIG. 18. In some aspects, the apparatus 1902 may be, be similar to, include, or be included in a server (e.g., server 705 shown in FIG. 7, server 610 shown in FIG. 6, server 304 shown in FIG. 3, and/or the like).

The processing system 1904 may be implemented with a bus architecture, represented generally by the bus 1906. The bus 1906 may include any number of interconnecting buses and bridges depending on the specific application of the processing system 1904 and the overall design constraints. The bus 1906 links together various circuits including one or more processors and/or hardware components, represented by a processor 1908, the illustrated components, and the computer-readable medium/memory 1910. The bus 1906 may also link various other circuits, such as timing sources, peripherals, voltage regulators, power management circuits, and/or the like.

The processing system 1904 may be coupled to a transceiver 1912. The transceiver 1912 is coupled to one or more antennas 1914. The transceiver 1912 provides a means for communicating with various other apparatuses over a transmission medium. The transceiver 1912 receives a signal from the one or more antennas 1914, extracts information from the received signal, and provides the extracted information to the processing system 1904, specifically a reception component 1916. In addition, the transceiver 1912 receives information from the processing system 1904, specifically a transmission component 1918, and generates a signal to be applied to the one or more antennas 1914 based at least in part on the received information.

The processor 1908 is coupled to the computer-readable medium/memory 1910. The processor 1908 is responsible for general processing, including the execution of software stored on the computer-readable medium/memory 1910. The software, when executed by the processor 1908, causes the processing system 1904 to perform the various functions described herein in connection with a server. The computer-readable medium/memory 1910 may also be used for storing data that is manipulated by the processor 1908 when executing software. The processing system 1904 may include a communication manager 1920 that may be, or be similar to, the communication manager 1804 shown in FIG. 18 and/or the first communication manager 150 shown in FIGS. 1 and 2. The processing system 1904 may include any number of additional components not illustrated in FIG. 19. The components illustrated and/or not illustrated may be software modules running in the processor 1908, resident/stored in the computer readable medium/memory 1910, one or more hardware modules coupled to the processor 1908, or some combination thereof.

In some aspects, the processing system 1904 may be a component of the UE 120 and may include the memory 282 and/or at least one of the TX MIMO processor 266, the RX processor 258, and/or the controller/processor 280. In some aspects, the apparatus 1902 for wireless communication provides means for receiving, from a client, an observed environmental vector associated with one or more features associated with an environment of the client; means for receiving, from the client, a latent vector that is based at least in part on a set of client-specific encoder parameters; means for determining an observed wireless communication vector based at least in part on the latent vector and the observed environmental vector; means for performing a wireless communication action based at least in part on determining the observed wireless communication vector; and/or the like. The aforementioned means may be one or more of the aforementioned components of the processing system 1904 of the apparatus 1902 configured to perform the functions recited by the aforementioned means. As described elsewhere herein, the processing system 1904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 19 is provided as an example. Other examples may differ from what is described in connection with FIG. 19.

Figure 20:
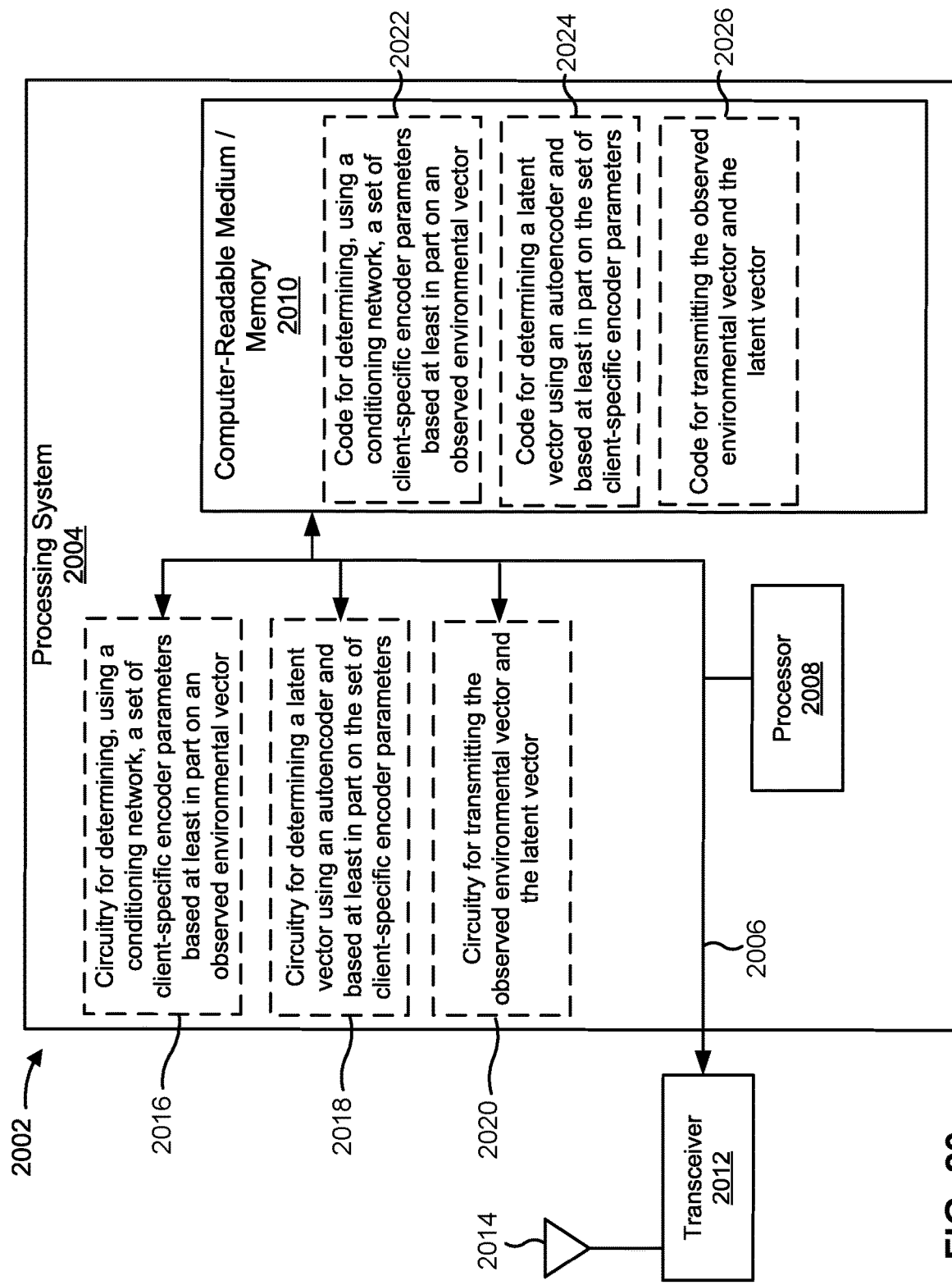
FIGS. 20 and 21 are diagrams illustrating examples of implementations of code and circuitry for an apparatus for wireless communication, in accordance with the present disclosure.

FIG. 20 is a diagram illustrating an example 2000 of an implementation of code and circuitry for an apparatus 2002 for wireless communication. The apparatus 2002 may be, be similar to, include, or be included in the apparatus 1702 shown in FIG. 17, the apparatus 1600 shown in FIG. 16, and/or the like. In some aspects, the apparatus 2002 may be, be similar to, include, or be included in a client (e.g., client 710 shown in FIG. 7, client 715 shown in FIG. 7, client 605 shown in FIG. 6, client 302 shown in FIG. 3, and/or the like). The apparatus 2002 may include a processing system 2004, which may include a bus 2006 coupling one or more components such as, for example, a processor 2008, computer-readable medium/memory 2010, a transceiver 2012, and/or the like. As shown, the transceiver 2012 may be coupled to one or more antenna 2014.

As further shown in FIG. 20, the apparatus 2002 may include circuitry for determining, using a conditioning network, a set of client-specific encoder parameters based at least in part on an observed environmental vector (circuitry 2016). For example, the apparatus 2002 may include circuitry 2016 to enable the apparatus 2002 to determine, using a conditioning network, a set of client-specific encoder parameters based at least in part on an observed environmental vector.

As further shown in FIG. 20, the apparatus 2002 may include circuitry for determining a latent vector using an autoencoder and based at least in part on the set of client-specific encoder parameters (circuitry 2018). For example, the apparatus 2002 may include circuitry 2018 to determine a latent vector using an autoencoder and based at least in part on the set of client-specific encoder parameters.

As further shown in FIG. 20, the apparatus 2002 may include circuitry for transmitting the observed environmental vector and the latent vector (circuitry 2020). For example, the apparatus 2002 may include circuitry 2020 to enable the apparatus to transmit the observed environmental vector and the latent vector.

As further shown in FIG. 20, the apparatus 2002 may include, stored in computer-readable medium 2010, code for determining, using a conditioning network, a set of client-specific encoder parameters based at least in part on an observed environmental vector (code 2022). For example, the apparatus 2002 may include code 2022 that, when executed by the processor 2008, may cause the processor 2008 to determine, using a conditioning network, a set of client-specific encoder parameters based at least in part on an observed environmental vector.

As further shown in FIG. 20, the apparatus 2002 may include, stored in computer-readable medium 2010, code for determining a latent vector using an autoencoder and based at least in part on the set of client-specific encoder parameters (code 2024). For example, the apparatus 2002 may include code 2024 that, when executed by the processor 2008, may cause the processor 2008 to determine a latent vector using an autoencoder and based at least in part on the set of client-specific encoder parameters.

As further shown in FIG. 20, the apparatus 2002 may include, stored in computer-readable medium 2010, code for transmitting the observed environmental vector and the latent vector (code 2026). For example, the apparatus 2002 may include code 2026 that, when executed by the processor 2008, may cause the transceiver 2012 to transmit the observed environmental vector and the latent vector.

FIG. 20 is provided as an example. Other examples may differ from what is described in connection with FIG. 20.

Figure 21:
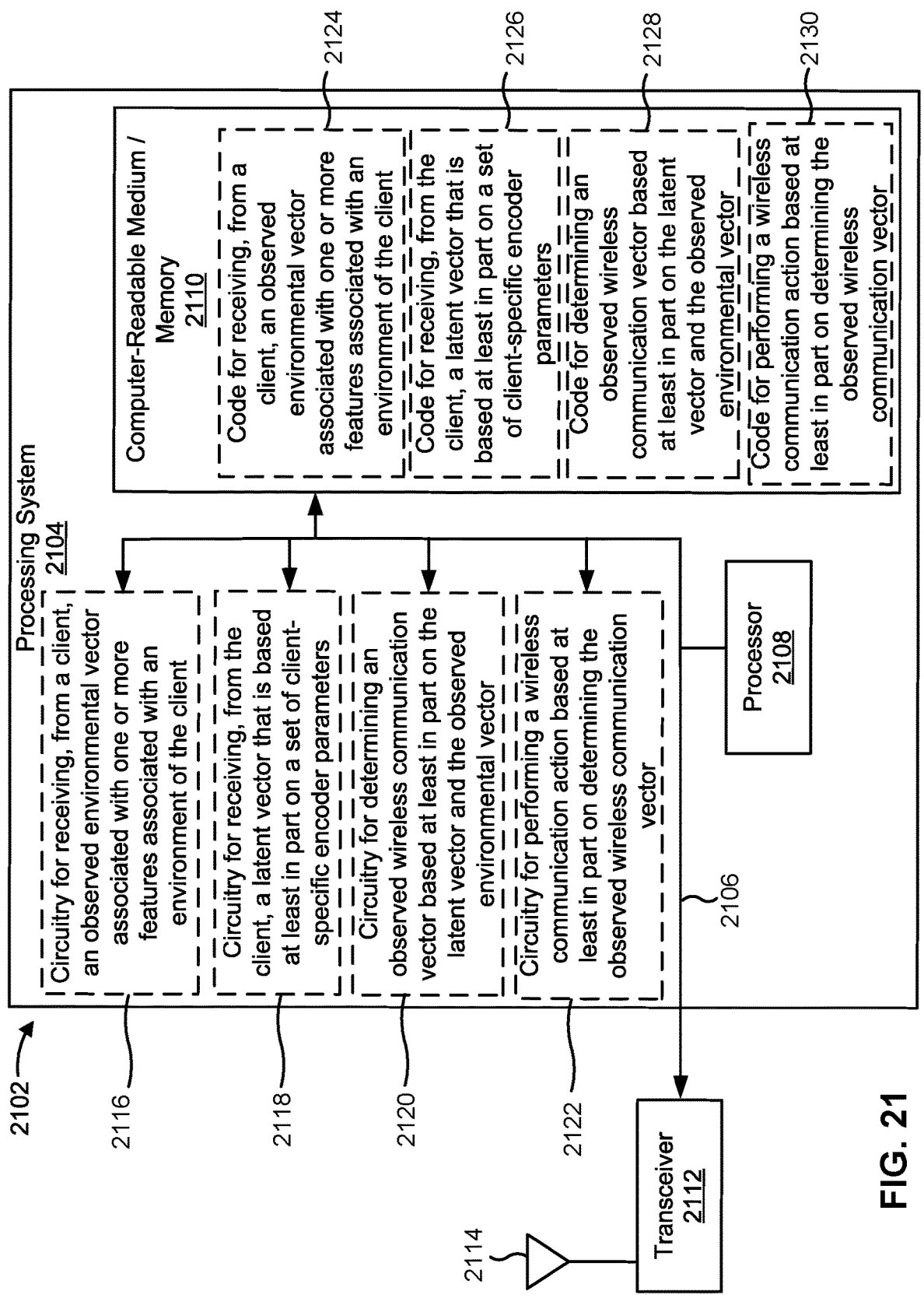

FIG. 21 is a diagram illustrating an example 2100 of an implementation of code and circuitry for an apparatus 2102 for wireless communication. The apparatus 2102 may be, be similar to, include, or be included in the apparatus 1902 shown in FIG. 19, the apparatus 1800 shown in FIG. 18, and/or the like. In some aspects, the apparatus 2102 may be, be similar to, include, or be included in a server (e.g., server 705 shown in FIG. 7, server 610 shown in FIG. 6, server 304 shown in FIG. 3, and/or the like). The apparatus 2102 may include a processing system 2104, which may include a bus 2106 coupling one or more components such as, for example, a processor 2108, computer-readable medium/memory 2110, a transceiver 2112, and/or the like. As shown, the transceiver 2112 may be coupled to one or more antenna 2114.

As further shown in FIG. 21, the apparatus 2102 may include circuitry for receiving, from a client, an observed environmental vector associated with one or more features associated with an environment of the client (circuitry 2116). For example, the apparatus 2102 may include circuitry 2116 to enable the apparatus 2102 to receive, from a client, an observed environmental vector associated with one or more features associated with an environment of the client.

As further shown in FIG. 21, the apparatus 2102 may include circuitry for receiving, from the client, a latent vector that is based at least in part on a set of client-specific encoder parameters (circuitry 2118). For example, the apparatus 2102 may include circuitry 2118 to enable the apparatus 2102 to receive, from the client, a latent vector that is based at least in part on a set of client-specific encoder parameters.

As further shown in FIG. 21, the apparatus 2102 may include circuitry for determining an observed wireless communication vector based at least in part on the latent vector and the observed environmental vector (circuitry 2120). For example, the apparatus 2102 may include circuitry 2120 to enable the apparatus 2102 to determine an observed wireless communication vector based at least in part on the latent vector and the observed environmental vector.

As further shown in FIG. 21, the apparatus 2102 may include circuitry for performing a wireless communication action based at least in part on determining the observed wireless communication vector (circuitry 2122). For example, the apparatus 2102 may include circuitry 2120 to enable the apparatus 2102 to perform a wireless communication action based at least in part on determining the observed wireless communication vector.

As further shown in FIG. 21, the apparatus 2102 may include, stored in computer-readable medium 2110, code for receiving, from a client, an observed environmental vector associated with one or more features associated with an environment of the client (code 2124). For example, the apparatus 2102 may include code 2124 that, when executed by the processor 2108, may cause the transceiver 2112 to receive, from a client, an observed environmental vector associated with one or more features associated with an environment of the client.

As further shown in FIG. 21, the apparatus 2102 may include, stored in computer-readable medium 2110, code for receiving, from the client, a latent vector that is based at least in part on a set of client-specific encoder parameters (code 2126). For example, the apparatus 2102 may include code 2126 that, when executed by the processor 2108, may cause the transceiver 2112 to receive, from the client, a latent vector that is based at least in part on a set of client-specific encoder parameters.

As further shown in FIG. 21, the apparatus 2102 may include, stored in computer-readable medium 2110, code for determining an observed wireless communication vector based at least in part on the latent vector and the observed environmental vector (code 2128). For example, the apparatus 2102 may include code 2128 that, when executed by the processor 2108, may cause the processor 2108 to determine an observed wireless communication vector based at least in part on the latent vector and the observed environmental vector.

As further shown in FIG. 21, the apparatus 2102 may include, stored in computer-readable medium 2110, code for performing a wireless communication action based at least in part on determining the observed wireless communication vector (code 2130). For example, the apparatus 2102 may include code 2130 that, when executed by the processor 2108, may cause the processor 2108 to perform a wireless communication action based at least in part on determining the observed wireless communication vector.

FIG. 21 is provided as an example. Other examples may differ from what is described in connection with FIG. 21.

The following provides an overview of some Aspects of the present disclosure:

Aspect 1: A method of wireless communication performed by a client, comprising: determining, using a conditioning network, a set of client-specific encoder parameters based at least in part on an observed environmental vector; determining a latent vector using an autoencoder and based at least in part on the set of client-specific encoder parameters; and transmitting the observed environmental vector and the latent vector.

Aspect 2: The method of Aspect 1, wherein the conditioning network is configured to receive the observed environmental vector as input and to provide a conditioning vector as output, wherein the conditioning vector comprises: the set of client-specific encoder parameters, and a set of client-specific decoder parameters.

Aspect 3: The method of Aspect 2, wherein the conditioning network comprises: a first sub-network configured to determine the set of client-specific encoder parameters; and a second sub-network configured to determine the set of client-specific decoder parameters.

Aspect 4: The method of any of Aspects 1-3, wherein the autoencoder comprises: an encoder configured to receive an observed wireless communication vector as input and to provide the latent vector as output; and a decoder configured to receive the latent vector as input and to provide the observed wireless communication vector as output.

Aspect 5: The method of Aspect 4, wherein the encoder comprises at least one encoder layer configured to use the set of client-specific encoder parameters, and wherein determining the latent vector comprises mapping the observed wireless communication vector to the latent vector using the at least one encoder layer.

Aspect 6: The method of Aspect 5, wherein mapping the observed wireless communication vector to the latent vector comprises mapping the observed wireless communication vector to the latent vector using a set of encoder parameters, wherein the set of encoder parameters comprises: the set of client-specific encoder parameters, and a set of shared encoder parameters.

Aspect 7: The method of Aspect 6, wherein the at least one encoder layer comprises: a first set of layers that uses a first subset of the set of client-specific encoder parameters; a second set of layers that uses a first subset of the set of shared encoder parameters; and a third set of layers that uses a second subset of the set of client-specific encoder parameters and a second subset of the set of shared encoder parameters.

Aspect 8: The method of any of Aspects 4-7, wherein the decoder comprises at least one decoder layer configured to use a set of client-specific decoder parameters, wherein the decoder is configured to determine the observed wireless communication vector by mapping the latent vector to the observed wireless communication vector using the at least one decoder layer.

Aspect 9: The method of Aspect 8, wherein mapping the latent vector to the observed wireless communication vector comprises mapping the latent vector to the observed wireless communication vector using a set of decoder parameters, wherein the set of decoder parameters comprises: the set of client-specific decoder parameters, and a set of shared decoder parameters.

Aspect 10: The method of Aspect 9, wherein the at least one decoder layer comprises: a first set of layers that uses a first subset of the set of client-specific decoder parameters; a second set of layers that uses a first subset of the set of shared decoder parameters; and a third set of layers that uses a second subset of the set of client-specific decoder parameters and a second subset of the set of shared decoder parameters.

Aspect 11: The method of any of Aspects 1-10, wherein the observed environmental vector comprises one or more feature components, wherein the one or more feature components indicate: a client vendor identifier, a client antenna configuration, a large scale channel characteristic, a channel state information reference signal configuration, an image obtained by an imaging device, a portion of an estimated propagation channel, or a combination thereof.

Aspect 12: The method of Aspect 11, wherein the large scale channel characteristic indicates: a delay spread associated with a channel, a power delay profile associated with a channel, a Doppler measurement associated with a channel, a Doppler spectrum associated with a channel, a signal to noise ratio associated with a channel a signal to noise plus interference ratio associated with a channel, a reference signal received power, a received signal strength indicator, or a combination thereof.

Aspect 13: The method of any of Aspects 1-12, wherein the latent vector is associated with a wireless communication task.

Aspect 14: The method of Aspect 13, wherein the wireless communication task comprises: determining channel state feedback (CSF), determining positioning information associated with the client, determining a modulation associated with a wireless communication, determining a waveform associated with a wireless communication, or a combination thereof.

Aspect 15: The method of Aspect 14, wherein the wireless communication task comprises determining the CSF, and wherein the method further comprises: receiving a channel state information (CSI) reference signal (CSI-RS); determining CSI based at least in part on the CSI-RS; and providing the CSI as input to the autoencoder.

Aspect 16: The method of Aspect 15, wherein the latent vector comprises compressed channel state feedback.

Aspect 17: The method of any of Aspects 1-16, wherein transmitting the observed environmental vector and the latent vector comprises transmitting the observed environmental vector and the latent vector using: a physical uplink control channel, a physical uplink shared channel, or a combination thereof.

Aspect 18: The method of any of Aspects 1-17, wherein the autoencoder comprises a variational autoencoder.

Aspect 19: The method of any of Aspects 1-18, further comprising training at least one of the conditioning network or the autoencoder.

Aspect 20: The method of Aspect 19, wherein training the at least one of the conditioning network or the autoencoder comprises using an unsupervised learning procedure.

Aspect 21: The method of any of Aspects 1-20, further comprising collaboratively training the conditioning network and the autoencoder using a federated learning procedure.

Aspect 22: The method of Aspect 21, wherein collaboratively training the conditioning network and the autoencoder comprises determining a set of shared neural network parameters that maximize a variational lower bound function corresponding to the conditioning network and the autoencoder.

Aspect 23: The method of Aspect 22, wherein a negative variational lower bound function corresponds to a loss function.

Aspect 24: The method of Aspect 23, wherein the loss function comprises a reconstruction loss for the autoencoder.

Aspect 25: The method of either of Aspects 23 or 24, wherein the loss function comprises a regularization term for the autoencoder.

Aspect 26: The method of any of Aspects 23-25, wherein the autoencoder is a regular autoencoder, and wherein the negative variational lower bound function does not include a regularization term.

Aspect 27: The method of any of Aspects 21-26, wherein collaboratively training the conditioning network and the autoencoder comprises jointly training the conditioning network and the autoencoder.

Aspect 28: The method of any of Aspects 21-26, wherein collaboratively training the conditioning network and the autoencoder comprises alternating between training the conditioning network and training the autoencoder.

Aspect 29: The method of Aspect 28, wherein alternating between training the conditioning network and training the autoencoder comprises: performing a first plurality of training iterations associated with the conditioning network according to a first training frequency; and performing a second plurality of training iterations associated with the autoencoder according to a second training frequency that is different than the first training frequency.

Aspect 30: The method of any of Aspects 21-29, wherein collaboratively training the conditioning network and the autoencoder comprises: receiving, from a server, a set of shared neural network parameters corresponding to the conditioning network and the autoencoder; obtaining an observed environmental training vector; inputting the observed environmental training vector to the conditioning network to determine a conditioning training vector that includes a set of client-specific encoder training parameters and a set of client-specific decoder training parameters; loading at least one layer of an encoder of the autoencoder with the set of client-specific encoder training parameters; loading at least one layer of a decoder of the autoencoder with the set of client-specific decoder training parameters; obtaining an observed wireless communication training vector; inputting the observed wireless communication training vector to the encoder to determine a training latent vector; inputting the training latent vector to the decoder to determine a training output of the autoencoder, wherein the training output comprises a reconstruction of the observed wireless communication training vector; and determining a loss associated with the autoencoder based at least in part on the training output.

Aspect 31: The method of Aspect 30, further comprising determining a regularization term corresponding to the autoencoder, wherein determining the loss comprises determining the loss based at least in part on the regularization term.

Aspect 32: The method of either of Aspects 30 or 31, further comprising: determining a plurality of gradients of the loss with respect to the set of shared neural network parameters; and updating the set of shared neural network parameters based at least in part on the plurality of gradients.

Aspect 33: The method of Aspect 32, further comprising updating the set of shared neural network parameters a specified number of times to determine a locally updated set of shared neural network parameters.

Aspect 34: The method of Aspect 33, further comprising transmitting the locally updated set of shared neural network parameters to the server.

Aspect 35: The method of any of Aspects 30-34, further comprising: determining a plurality of gradients of the loss with respect to a subset of the set of shared neural network parameters, wherein the subset comprises a set of shared conditioning network parameters; and updating the set of shared conditioning network parameters based at least in part on the plurality of gradients.

Aspect 36: The method of Aspect 35, further comprising updating the set of shared conditioning network parameters a specified number of times to determine a locally updated set of shared conditioning network parameters.

Aspect 37: The method of Aspect 36, further comprising transmitting the locally updated set of shared conditioning network parameters to the server.

Aspect 38: The method of any of Aspects 30-37, further comprising: determining a plurality of gradients of the loss with respect to a subset of the set of shared neural network parameters, wherein the subset comprises a set of shared autoencoder parameters; and updating the set of shared autoencoder parameters based at least in part on the plurality of gradients.

Aspect 39: The method of Aspect 38, further comprising updating the set of shared autoencoder parameters a specified number of times to determine a locally updated set of shared autoencoder parameters.

Aspect 40: The method of Aspect 39, further comprising transmitting the locally updated set of shared autoencoder parameters to the server.

Aspect 41: The method of any of Aspects 1-40, wherein the conditioning network corresponds to a server conditioning network that is implemented at a server.

Aspect 42: The method of Aspect 41, wherein the conditioning network is a client implemented copy of the server conditioning network.

Aspect 43: The method of any of Aspects 1-42, wherein the autoencoder corresponds to a server autoencoder that is implemented at a server.

Aspect 44: The method of Aspect 43, wherein the autoencoder is a client implemented copy of the server autoencoder.

Aspect 45: A method of wireless communication performed by a server, comprising: receiving, from a client, an observed environmental vector associated with one or more features associated with an environment of the client; receiving, from the client, a latent vector that is based at least in part on a set of client-specific encoder parameters; determining an observed wireless communication vector based at least in part on the latent vector and the observed environmental vector; and performing a wireless communication action based at least in part on determining the observed wireless communication vector.

Aspect 46: The method of Aspect 45, wherein the observed environmental vector comprises one or more feature components, wherein the one or more feature components indicate: a client vendor identifier, a client antenna configuration, a large scale channel characteristic, a channel state information reference signal configuration, an image obtained by an imaging device, a portion of an estimated propagation channel, or a combination thereof.

Aspect 47: The method of Aspect 46, wherein the large scale channel characteristic indicates: a delay spread associated with a channel, a power delay profile associated with a channel, a Doppler measurement associated with a channel, a Doppler spectrum associated with a channel, a signal to noise ratio associated with a channel a signal to noise plus interference ratio associated with a channel, a reference signal received power, a received signal strength indicator, or a combination thereof.

Aspect 48: The method of any of Aspects 45-47, wherein the latent vector is associated with a wireless communication task.

Aspect 49: The method of Aspect 48, wherein the wireless communication task comprises: receiving channel state feedback (CSF), receiving positioning information associated with the client, receiving a modulation associated with a wireless communication, receiving a waveform associated with a wireless communication, or a combination thereof.

Aspect 50: The method of Aspect 49, wherein the wireless communication task comprises receiving the CSF, and wherein the method further comprises transmitting a channel state information reference signal (CSI-RS), wherein the CSF corresponds to the CSI-RS.

Aspect 51: The method of any of Aspects 45-50, wherein the latent vector comprises compressed CSF.

Aspect 52: The method of any of Aspects 45-51, wherein the observed environmental vector and the latent vector are carried in: a physical uplink control channel, a physical uplink shared channel, or a combination thereof.

Aspect 53: The method of any of Aspects 45-52, wherein determining the observed wireless communication vector comprises: inputting the observed environmental vector to a server conditioning network to determine a conditioning vector that includes a set of client-specific decoder parameters; loading at least one layer of a decoder of a server autoencoder with the set of client-specific decoder parameters; and inputting the latent vector to the decoder to determine the observed wireless communication vector.

Aspect 54: The method of Aspect 53, wherein the server autoencoder comprises a regular autoencoder or a variational autoencoder.

Aspect 55: The method of either of Aspects 53 or 54, wherein the server conditioning network is configured to receive the observed environmental vector as input and to provide a conditioning vector as output, wherein the conditioning vector comprises: the set of client-specific decoder parameters, and a set of client-specific encoder parameters.

Aspect 56: The method of Aspect 55, wherein the server conditioning network comprises: a first sub-network configured to determine the set of client-specific encoder parameters; and a second sub-network configured to determine the set of client-specific decoder parameters.

Aspect 57: The method of any of Aspects 53-56, wherein the server autoencoder comprises: an encoder configured to receive the observed wireless communication vector as input and to provide the latent vector as output; and a decoder configured to receive the latent vector as input and to provide the observed wireless communication vector as output.

Aspect 58: The method of Aspect 57, wherein the encoder comprises at least one encoder layer configured to use the set of client-specific encoder parameters.

Aspect 59: The method of either of Aspects 57 or 58, wherein the decoder comprises the at least one decoder layer configured to use the set of client-specific decoder parameters, wherein the decoder is configured to determine the observed wireless communication vector by mapping the latent vector to the observed wireless communication vector using the at least one decoder layer.

Aspect 60: The method of Aspect 59, wherein mapping the latent vector to the observed wireless communication vector comprises mapping the latent vector to the observed wireless communication vector using a set of decoder parameters, wherein the set of decoder parameters comprises: the set of client-specific decoder parameters, and a set of shared decoder parameters.

Aspect 61: The method of Aspect 60, wherein the at least one decoder layer comprises: a first set of layers that uses a first subset of the set of client-specific decoder parameters; a second set of layers that uses a first subset of the set of shared decoder parameters; and a third set of layers that uses a second subset of the set of client-specific decoder parameters and a second subset of the set of shared decoder parameters.

Aspect 62: The method of any of Aspects 53-61, wherein the server conditioning network corresponds to a conditioning network that is implemented at the client.

Aspect 63: The method of Aspect 62, wherein the server conditioning network is a server implemented copy of the conditioning network.

Aspect 64: The method of any of Aspects 53-63, wherein the server autoencoder corresponds to an autoencoder that is implemented at the client.

Aspect 65: The method of Aspect 64, wherein the server autoencoder is a server implemented copy of the autoencoder.

Aspect 66: The method of any of Aspects 53-65, wherein the server autoencoder comprises a variational autoencoder.

Aspect 67: The method of any of Aspects 53-66, further comprising updating at least one of the server conditioning network or the server autoencoder.

Aspect 68: The method of any of Aspects 53-67, further comprising collaboratively updating the server conditioning network and the server autoencoder using a federated learning procedure.

Aspect 69: The method of Aspect 68, wherein collaboratively updating the server conditioning network and the server autoencoder comprises jointly updating the server conditioning network and the server autoencoder.

Aspect 70: The method of either of Aspects 68 or 69, wherein collaboratively updating the server conditioning network and the server autoencoder comprises alternating between updating the server conditioning network and updating the server autoencoder.

Aspect 71: The method of Aspect 70, wherein alternating between updating the server conditioning network and updating the server autoencoder comprises: performing a first plurality of updating iterations associated with the server conditioning network according to a first updating frequency; and performing a second plurality of updating iterations associated with the server autoencoder according to a second updating frequency that is different than the first updating frequency.

Aspect 72: The method of any of Aspects 68-71, wherein collaboratively updating the server conditioning network and the server autoencoder comprises: selecting a set of clients from which to receive updates associated with the server conditioning network and the server autoencoder, wherein the set of clients includes the client and at least one additional client; transmitting, to the set of clients, a set of shared neural network parameters corresponding to the server conditioning network and the server autoencoder; receiving, from the set of clients, a plurality of sets of locally updated shared neural network parameters; and determining, based at least in part on the plurality of sets of locally updated shared neural network parameters, a set of server updated shared neural network parameters.

Aspect 73: The method of Aspect 72, further comprising transmitting, to the set of clients, the set of server updated shared neural network parameters.

Aspect 74: The method of either of Aspects 72 or 73, wherein determining the set of server updated shared neural network parameters comprises averaging the plurality of sets of locally updated shared neural network parameters.

Aspect 75: The method of any of Aspects 68-74, wherein collaboratively updating the server conditioning network and the server autoencoder comprises: selecting a set of clients from which to receive updates associated with the server conditioning network, wherein the set of clients includes the client and at least one additional client; transmitting, to the set of clients, a set of shared neural network parameters corresponding to the server conditioning network and the server autoencoder; receiving, from the set of clients, a plurality of sets of locally updated shared conditioning network parameters; and determining, based at least in part on the plurality of sets of locally updated shared conditioning network parameters, a set of server updated shared conditioning network parameters.

Aspect 76: The method of Aspect 75, further comprising transmitting, to the set of clients, the set of server updated shared conditioning network parameters.

Aspect 77: The method of either of Aspects 75 or 76, wherein determining the set of server updated shared conditioning network parameters comprises averaging the plurality of sets of locally updated shared conditioning network parameters.

Aspect 78: The method of any of Aspects 68-77, wherein collaboratively updating the server conditioning network and the server autoencoder comprises: selecting a set of clients from which to receive updates associated with the server autoencoder, wherein the set of clients includes the client and at least one additional client; transmitting, to the set of clients, a set of shared neural network parameters corresponding to the server conditioning network and the server autoencoder; receiving, from the set of clients, a plurality of sets of locally updated shared autoencoder parameters; and determining, based at least in part on the plurality of sets of locally updated shared autoencoder parameters, a set of server updated shared autoencoder parameters.

Aspect 79: The method of Aspect 78, further comprising transmitting, to the set of clients, the set of server updated shared autoencoder parameters.

Aspect 80: The method of either of Aspects 78 or 79, wherein determining the set of server updated shared autoencoder parameters comprises averaging the plurality of sets of locally updated shared autoencoder parameters.

Aspect 81: An apparatus for wireless communication at a device, comprising a processor; memory coupled with the processor; and instructions stored in the memory and executable by the processor to cause the apparatus to perform the method of one or more of Aspects 1-44.

Aspect 82: A device for wireless communication, comprising a memory and one or more processors coupled to the memory, the one or more processors configured to perform the method of one or more of Aspects 1-44.

Aspect 83: An apparatus for wireless communication, comprising at least one means for performing the method of one or more of Aspects 1-44.

Aspect 84: A non-transitory computer-readable medium storing code for wireless communication, the code comprising instructions executable by a processor to perform the method of one or more of Aspects 1-44.

Aspect 85: A non-transitory computer-readable medium storing a set of instructions for wireless communication, the set of instructions comprising one or more instructions that, when executed by one or more processors of a device, cause the device to perform the method of one or more of Aspects 1-44.

Aspect 86: An apparatus for wireless communication at a device, comprising a processor; memory coupled with the processor; and instructions stored in the memory and executable by the processor to cause the apparatus to perform the method of one or more of Aspects 45-80.

Aspect 87: A device for wireless communication, comprising a memory and one or more processors coupled to the memory, the one or more processors configured to perform the method of one or more of Aspects 45-80.

Aspect 88: An apparatus for wireless communication, comprising at least one means for performing the method of one or more of Aspects 45-80.

Aspect 89: A non-transitory computer-readable medium storing code for wireless communication, the code comprising instructions executable by a processor to perform the method of one or more of Aspects 45-80.

Aspect 90: A non-transitory computer-readable medium storing a set of instructions for wireless communication, the set of instructions comprising one or more instructions that, when executed by one or more processors of a device, cause the device to perform the method of one or more of Aspects 45-80.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a client, comprising:
   determining, using a conditioning network, a set of client-specific encoder parameters based at least in part on an observed environmental vector, the observed environmental vector being associated with one or more features associated with an environment of the client;
   determining a latent vector using an autoencoder and based at least in part on the set of client-specific encoder parameters and an observed wireless communication vector, the observed wireless communication vector being associated with a wireless communication task; and
   transmitting the observed environmental vector and the latent vector using a physical uplink control channel or a physical uplink shared channel.

2. The method of claim 1, wherein the conditioning network is configured to receive the observed environmental vector as input and to provide a conditioning vector as output, wherein the conditioning vector comprises:
   the set of client-specific encoder parameters, and
   a set of client-specific decoder parameters.

3. A method of wireless communication performed by a server, comprising:
   receiving, from a client, an observed environmental vector associated with one or more features associated with an environment of the client;
   receiving, from the client via a physical uplink control channel or a physical uplink shared channel, a latent vector that is based at least in part on a set of client-specific encoder parameters and an observed wireless communication vector, the observed wireless communication vector being associated with a wireless communication task;
   determining the observed wireless communication vector based at least in part on the latent vector and the observed environmental vector; and
   performing a wireless communication action based at least in part on determining the observed wireless communication vector.

4. An apparatus for wireless communication at a client, comprising:
   one or more memories; and
   one or more processors, coupled to the one or more memories, the one or more processors configured to cause the apparatus to:
      determine, using a conditioning network, a set of client-specific encoder parameters based at least in part on an observed environmental vector, the observed environmental vector being associated with one or more features associated with an environment of the client;
      determine a latent vector using an autoencoder and based at least in part on the set of client-specific encoder parameters and an observed wireless communication vector, the observed wireless communication vector being associated with a wireless communication task; and
      transmit the observed environmental vector and the latent vector using a physical uplink control channel or a physical uplink shared channel.

5. The apparatus of claim 4, wherein the conditioning network is configured to receive the observed environmental vector as input and to provide a conditioning vector as output, wherein the conditioning vector comprises:
   the set of client-specific encoder parameters, and
   a set of client-specific decoder parameters.

6. The apparatus of claim 5, wherein the conditioning network comprises:
   a first sub-network configured to determine the set of client-specific encoder parameters; and
   a second sub-network configured to determine the set of client-specific decoder parameters.

7. The apparatus of claim 4, wherein the autoencoder comprises:
   an encoder configured to receive the observed wireless communication vector as input and to provide the latent vector as output; and
   a decoder configured to receive the latent vector as input and to provide the observed wireless communication vector as output.

8. The apparatus of claim 7, wherein the encoder comprises at least one encoder layer configured to use the set of client-specific encoder parameters, and wherein, to determine the latent vector, the one or more processors are configured to cause the apparatus to:
   map the observed wireless communication vector to the latent vector using the at least one encoder layer.

9. The apparatus of claim 8, wherein, to map the observed wireless communication vector to the latent vector, the one or more processors are configured to cause the apparatus to map the observed wireless communication vector to the latent vector using a set of encoder parameters,
   wherein the set of encoder parameters comprises:

the set of client-specific encoder parameters, and
a set of shared encoder parameters.

10. The apparatus of claim 9, wherein the at least one encoder layer comprises:
a first set of layers that uses a first subset of the set of client-specific encoder parameters;
a second set of layers that uses a first subset of the set of shared encoder parameters;
and a third set of layers that uses a second subset of the set of client-specific encoder parameters and a second subset of the set of shared encoder parameters.

11. The apparatus of claim 7, wherein the decoder comprises at least one decoder layer configured to use a set of client-specific decoder parameters, wherein the decoder is configured to determine the observed wireless communication vector by mapping the latent vector to the observed wireless communication vector using the at least one decoder layer.

12. The apparatus of claim 11, wherein, to map the latent vector to the observed wireless communication vector, the one or more processors are configured to cause the apparatus to map the latent vector to the observed wireless communication vector using a set of decoder parameters,
wherein the set of decoder parameters comprises:
the set of client-specific decoder parameters, and
a set of shared decoder parameters.

13. The apparatus of claim 12, wherein the at least one decoder layer comprises:
a first set of layers that uses a first subset of the set of client-specific decoder parameters;
a second set of layers that uses a first subset of the set of shared decoder parameters; and
a third set of layers that uses a second subset of the set of client-specific decoder parameters and a second subset of the set of shared decoder parameters.

14. The apparatus of claim 4, wherein the observed environmental vector comprises one or more feature components, wherein the one or more feature components indicate:
a client vendor identifier,
a client antenna configuration,
a large scale channel characteristic,
a channel state information reference signal configuration,
an image obtained by an imaging device, or
a portion of an estimated propagation channel.

15. The apparatus of claim 14, wherein the large scale channel characteristic indicates:
a delay spread associated with a channel,
a power delay profile associated with a channel,
a Doppler measurement associated with a channel,
a Doppler spectrum associated with a channel,
a signal to noise ratio associated with a channel,
a signal to noise plus interference ratio associated with a channel,
a reference signal received power, or
a received signal strength indicator.

16. The apparatus of claim 4, wherein the latent vector is associated with the wireless communication task.

17. The apparatus of claim 16, wherein the wireless communication task comprises:
a determination of channel state feedback (CSF),
a determination of positioning information associated with the client,
a determination of a modulation associated with a wireless communication, or
a determination of a waveform associated with a wireless communication.

18. The apparatus of claim 17, wherein the wireless communication task comprises determining the CSF, and wherein the one or more processors are further configured to cause the apparatus to:
receive a channel state information (CSI) reference signal (CSI-RS);
determine CSI based at least in part on the CSI-RS; and
provide the CSI as input to the autoencoder.

19. The apparatus of claim 18, wherein the latent vector comprises compressed channel state feedback.

20. The apparatus of claim 4, wherein the autoencoder comprises a variational autoencoder.

21. The apparatus of claim 4, further comprising training at least one of the conditioning network or the autoencoder, wherein training the at least one of the conditioning network or the autoencoder comprises using an unsupervised learning procedure.

22. The apparatus of claim 4, wherein the one or more processors are further configured to cause the apparatus to collaboratively train the conditioning network and the autoencoder using a federated learning procedure.

23. The apparatus of claim 22, wherein, to collaboratively train the conditioning network and the autoencoder, the one or more processors are configured to cause the apparatus to determine a set of shared neural network parameters that maximize a variational lower bound function corresponding to the conditioning network and the autoencoder.

24. The apparatus of claim 23, wherein a negative variational lower bound function corresponds to a loss function.

25. The apparatus of claim 22, wherein, to collaboratively train the conditioning network and the autoencoder, the one or more processors are configured to cause the apparatus to jointly train the conditioning network and the autoencoder.

26. The apparatus of claim 22, wherein, to collaboratively train the conditioning network and the autoencoder, the one or more processors are configured to cause the apparatus to alternate between training the conditioning network and training the autoencoder.

27. The apparatus of claim 26, wherein, to alternate between training the conditioning network and training the autoencoder, the one or more processors are configured to cause the apparatus to:
perform a first plurality of training iterations associated with the conditioning network according to a first training frequency; and
perform a second plurality of training iterations associated with the autoencoder according to a second training frequency that is different than the first training frequency.

28. The apparatus of claim 4, wherein the conditioning network corresponds to a server conditioning network that is implemented at a server, and wherein the conditioning network is a client implemented copy of the server conditioning network.

29. The apparatus of claim 4, wherein the autoencoder corresponds to a server autoencoder that is implemented at a server, and wherein the autoencoder is a client implemented copy of the server autoencoder.

30. An apparatus for wireless communication at a server, comprising:
one or more memories; and
one or more processors, coupled to the one or more memories, the one or more processors configured to cause the apparatus to:
receive, from a client, an observed environmental vector associated with one or more features associated with an environment of the client;

receive, from the client via a physical uplink control channel or a physical uplink shared channel, a latent vector that is based at least in part on a set of client-specific encoder parameters and an observed wireless communication vector, the observed wireless communication vector being associated with a wireless communication task;

determine the observed wireless communication vector based at least in part on the latent vector and the observed environmental vector; and perform a wireless communication action based at least in part on determining the observed wireless communication vector.

\* \* \* \* \*